(12) United States Patent
Schumann, Jr. et al.

(10) Patent No.: US 10,217,169 B2
(45) Date of Patent: Feb. 26, 2019

(54) COMPUTER SYSTEM FOR DETERMINING GEOGRAPHIC-LOCATION ASSOCIATED CONDITIONS

(71) Applicant: HARTFORD FIRE INSURANCE COMPANY, Hartford, CT (US)

(72) Inventors: Douglas D. Schumann, Jr., Wethersfield, CT (US); Alex M. Carges, West Hartford, CT (US); Mark S. Coleman, Arlington, MA (US); Roza E. Kogan, West Hartford, CT (US); Ben Jade Lim, South Windsor, CT (US); David F. Peak, Avon, CT (US)

(73) Assignee: Hartford Fire Insurance Company, Hartford, CT (US)

(*) Notice: Subject to any disclaimer, the term of this patent is extended or adjusted under 35 U.S.C. 154(b) by 875 days.

(21) Appl. No.: 14/457,732

(22) Filed: Aug. 12, 2014

(65) Prior Publication Data

US 2014/0350970 A1    Nov. 27, 2014

Related U.S. Application Data

(60) Division of application No. 13/233,357, filed on Sep. 15, 2011, now Pat. No. 8,805,707, which is a continuation-in-part of application No. 13/105,059, filed on May 11, 2011, now abandoned, which is a continuation-in-part of application No. 12/754,189, filed on Apr. 5, 2010, now Pat. No. 9,558,520.

(60) Provisional application No. 61/291,501, filed on Dec. 31, 2009.

(51) Int. Cl.
*G06Q 40/08* (2012.01)
*G08G 1/0967* (2006.01)

(52) U.S. Cl.
CPC ....... *G06Q 40/08* (2013.01); *G08G 1/096775* (2013.01)

(58) Field of Classification Search
CPC .......................................... G06Q 40/00–40/08
USPC ....................................................... 705/4, 35
See application file for complete search history.

(56) References Cited

U.S. PATENT DOCUMENTS

| | | |
|---|---|---|
| 5,451,998 A | 9/1995 | Hamrick et al. |
| 5,797,134 A | 8/1998 | McMillan et al. |
| 6,064,970 A | 5/2000 | McMillan et al. |

(Continued)

FOREIGN PATENT DOCUMENTS

| | | |
|---|---|---|
| JP | 2002259708 A | 9/2002 |
| JP | 2009003503 A | 1/2009 |
| WO | 2008120971 A1 | 10/2008 |

*Primary Examiner* — Narayanswamy Subramanian
(74) *Attorney, Agent, or Firm* — Howard IP Law Group

(57) ABSTRACT

Pursuant to some embodiments, computer systems for generating safety scores relating to vehicle travel routes are provided which include a data storage device for storing, updating and providing access to loss risk score data. In some embodiments, a request for information associated with a user's location identified by user location data may be received over a communications network. A computer processing system may then be operated to generate a safety score associated with said use location data, the safety score being based on a plurality of loss risk factors associated with the user location data. A response, including the safety score, may then be transmitted to the user over the communications network.

12 Claims, 45 Drawing Sheets

(56) References Cited

U.S. PATENT DOCUMENTS

| | | | |
|---|---|---|---|
| 6,175,803 B1 | 1/2001 | Chowanic et al. | |
| 6,313,791 B1 | 11/2001 | Klanke | |
| 6,714,894 B1 | 3/2004 | Tobey et al. | |
| 6,868,386 B1 | 3/2005 | Henderson et al. | |
| 7,653,702 B2 | 1/2010 | Miner | |
| 7,668,691 B2* | 2/2010 | Counts | G01C 21/20 600/595 |
| 7,729,930 B1 | 6/2010 | Bohanek | |
| 7,739,133 B1 | 6/2010 | Hail et al. | |
| 7,778,769 B2* | 8/2010 | Boss | G01C 21/3469 701/123 |
| 7,899,823 B1 | 3/2011 | Trandal et al. | |
| 7,941,330 B1 | 5/2011 | Buentello et al. | |
| 8,041,636 B1 | 10/2011 | Hunter et al. | |
| 8,090,598 B2 | 1/2012 | Bauer et al. | |
| 8,140,358 B1* | 3/2012 | Ling | G06Q 40/08 340/439 |
| 8,255,113 B2 | 8/2012 | Boss et al. | |
| 8,284,037 B2 | 10/2012 | Rennie et al. | |
| 8,290,705 B2 | 10/2012 | Trinko et al. | |
| 8,311,858 B2 | 11/2012 | Everett et al. | |
| 8,332,242 B1 | 12/2012 | Medina, III | |
| 8,416,067 B2 | 4/2013 | Davidson et al. | |
| 8,489,433 B2 | 7/2013 | Altieri et al. | |
| 8,489,434 B1 | 7/2013 | Otis et al. | |
| 8,527,013 B2 | 9/2013 | Guba et al. | |
| 8,538,785 B2 | 9/2013 | Coleman et al. | |
| 8,566,126 B1 | 10/2013 | Hopkins, III | |
| 8,577,703 B2 | 11/2013 | McClellan et al. | |
| 8,583,333 B2 | 11/2013 | Rennie et al. | |
| 8,595,037 B1 | 11/2013 | Hyde et al. | |
| 8,606,512 B1 | 12/2013 | Bogovich et al. | |
| 8,624,727 B2 | 1/2014 | Saigh et al. | |
| 8,630,768 B2 | 1/2014 | McClellan et al. | |
| 8,655,690 B2 | 2/2014 | Tran et al. | |
| 8,718,910 B2 | 5/2014 | Guéziec et al. | |
| 8,725,396 B2 | 5/2014 | Guéziec et al. | |
| 8,775,070 B1* | 7/2014 | Bhatia | G01C 21/3461 701/425 |
| 8,849,622 B2* | 9/2014 | Melkumyan | G06F 17/18 703/2 |
| 9,081,650 B1 | 7/2015 | Brinkmann et al. | |
| 2002/0111725 A1 | 8/2002 | Burge | |
| 2002/0118118 A1 | 8/2002 | Myllymaki et al. | |
| 2002/0161469 A1* | 10/2002 | Faulkner | G05B 19/4099 700/118 |
| 2002/0173978 A1* | 11/2002 | Boies | G06Q 10/02 705/6 |
| 2003/0069761 A1 | 4/2003 | Nozaki et al. | |
| 2003/0191581 A1 | 10/2003 | Ukai et al. | |
| 2004/0128172 A1 | 7/2004 | Van Cleave et al. | |
| 2004/0153362 A1* | 8/2004 | Bauer | G06Q 40/02 705/4 |
| 2006/0033615 A1 | 2/2006 | Nou | |
| 2006/0129313 A1 | 6/2006 | Becker et al. | |
| 2006/0136273 A1 | 6/2006 | Zizzamia et al. | |
| 2006/0247852 A1* | 11/2006 | Kortge | G01C 21/3461 701/533 |
| 2006/0282342 A1 | 12/2006 | Chapman | |
| 2007/0011134 A1 | 1/2007 | Langseth et al. | |
| 2007/0038478 A1 | 2/2007 | Kay | |
| 2007/0043594 A1 | 2/2007 | Lavergne | |
| 2007/0173991 A1 | 7/2007 | Tenzer et al. | |
| 2007/0202483 A1 | 8/2007 | Castelli et al. | |
| 2007/0282638 A1 | 12/2007 | Surovy | |
| 2008/0065427 A1 | 3/2008 | Helitzer et al. | |
| 2008/0125958 A1* | 5/2008 | Boss | G01C 21/3469 701/123 |
| 2008/0126139 A1 | 5/2008 | Prendergast et al. | |
| 2008/0189142 A1 | 8/2008 | Brown et al. | |
| 2009/0024419 A1 | 1/2009 | McClellan et al. | |
| 2009/0024546 A1* | 1/2009 | Ficcaglia | G06Q 30/02 706/12 |
| 2009/0073171 A1 | 3/2009 | Straub et al. | |
| 2009/0119133 A1 | 5/2009 | Yeransian et al. | |
| 2009/0138195 A1 | 5/2009 | Pemble et al. | |
| 2009/0171822 A1 | 7/2009 | Meadow et al. | |
| 2009/0210142 A1 | 8/2009 | Couckuyt et al. | |
| 2009/0210257 A1 | 8/2009 | Chalfant et al. | |
| 2009/0233572 A1 | 9/2009 | Basir | |
| 2009/0287401 A1 | 11/2009 | Levine et al. | |
| 2009/0296605 A1 | 12/2009 | Lewis | |
| 2010/0030582 A1 | 2/2010 | Rippel et al. | |
| 2010/0030586 A1 | 2/2010 | Taylor et al. | |
| 2010/0063851 A1 | 3/2010 | Andrist et al. | |
| 2010/0070309 A1 | 3/2010 | Deede et al. | |
| 2010/0088123 A1 | 4/2010 | McCall et al. | |
| 2010/0088163 A1 | 4/2010 | Davidson et al. | |
| 2010/0131303 A1 | 5/2010 | Collopy et al. | |
| 2010/0174514 A1* | 7/2010 | Melkumyan | G06F 17/18 703/2 |
| 2010/0174564 A1 | 7/2010 | Stender et al. | |
| 2010/0174565 A1 | 7/2010 | Weiss et al. | |
| 2010/0280748 A1 | 11/2010 | Mundinger et al. | |
| 2011/0040579 A1 | 2/2011 | Havens | |
| 2011/0046920 A1 | 2/2011 | Amis | |
| 2011/0106370 A1 | 5/2011 | Duddle et al. | |
| 2011/0161100 A1 | 6/2011 | Peak et al. | |
| 2011/0161116 A1 | 6/2011 | Peak et al. | |
| 2011/0213628 A1 | 9/2011 | Peak et al. | |
| 2012/0158436 A1 | 6/2012 | Bauer et al. | |
| 2012/0209634 A1 | 8/2012 | Ling et al. | |
| 2013/0183924 A1 | 7/2013 | Saigh et al. | |

* cited by examiner

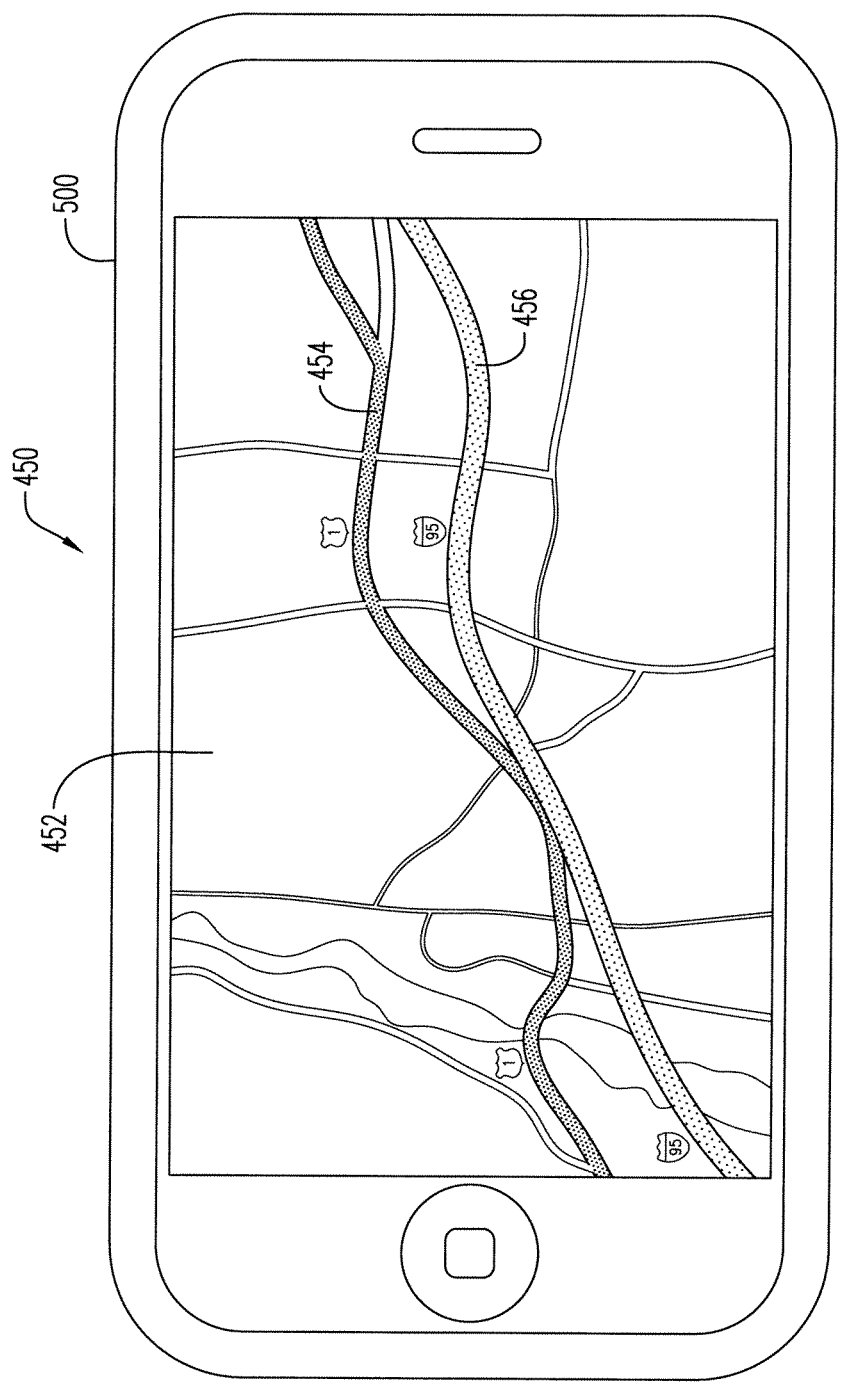

Exchange Info — Email

Select your information below that you would like to share with the other driver. The Hartford recommends you share the following information:
- Insurance Company Name & Phone Number
- Your Name
- Your Driver's License Number & State
- Your Vehicle's License Plate Number & State Go to My Profile to set your personal information. Gather the same information from the other driver.

1206

My Info

| | |
|---|---|
| First Name | John ✓ |
| Last Name | Doe ✓ |
| Address 1 | 1234 East North... |
| Address 2 | |
| City | |
| State | |
| Zip | |
| Phone Number | |
| Email | |
| Driver's License No. | |
| Driver's License State | |
| Vehicle's License Plate | |
| Vehicle's License Plate State | |

*FIG. 12C*

My Agent's Info

| First Name |
| --- |
| Last Name |
| Phone |
| Email |

My Policy Info

| Insurance Company Name | The Hartford ✓ |
| --- | --- |
| Insurance Company Phone Number | |
| First Name of Person on Policy | |
| Last Name of Person on Policy | |
| Policy Number | |
| Policy Expiration | |

Vehicles

| Chevy Tahoe | ✓ |
| --- | --- |

*FIG. 12D*

Document Accident — 1210

You can choose up to 4 photos and add a note regarding the accident. You can email this information to The Hartford or any other person.

- Photos of Accident >
- Note about Accident >

Email to The Hartford Claims Center?
YES

Enter your Hartford Claim Number

☒ Call to get your Claim Number

Policy Holder's First Name:

Policy Holder's Last Name:

Email Accident Information

Delete Accident

*FIG. 12F*

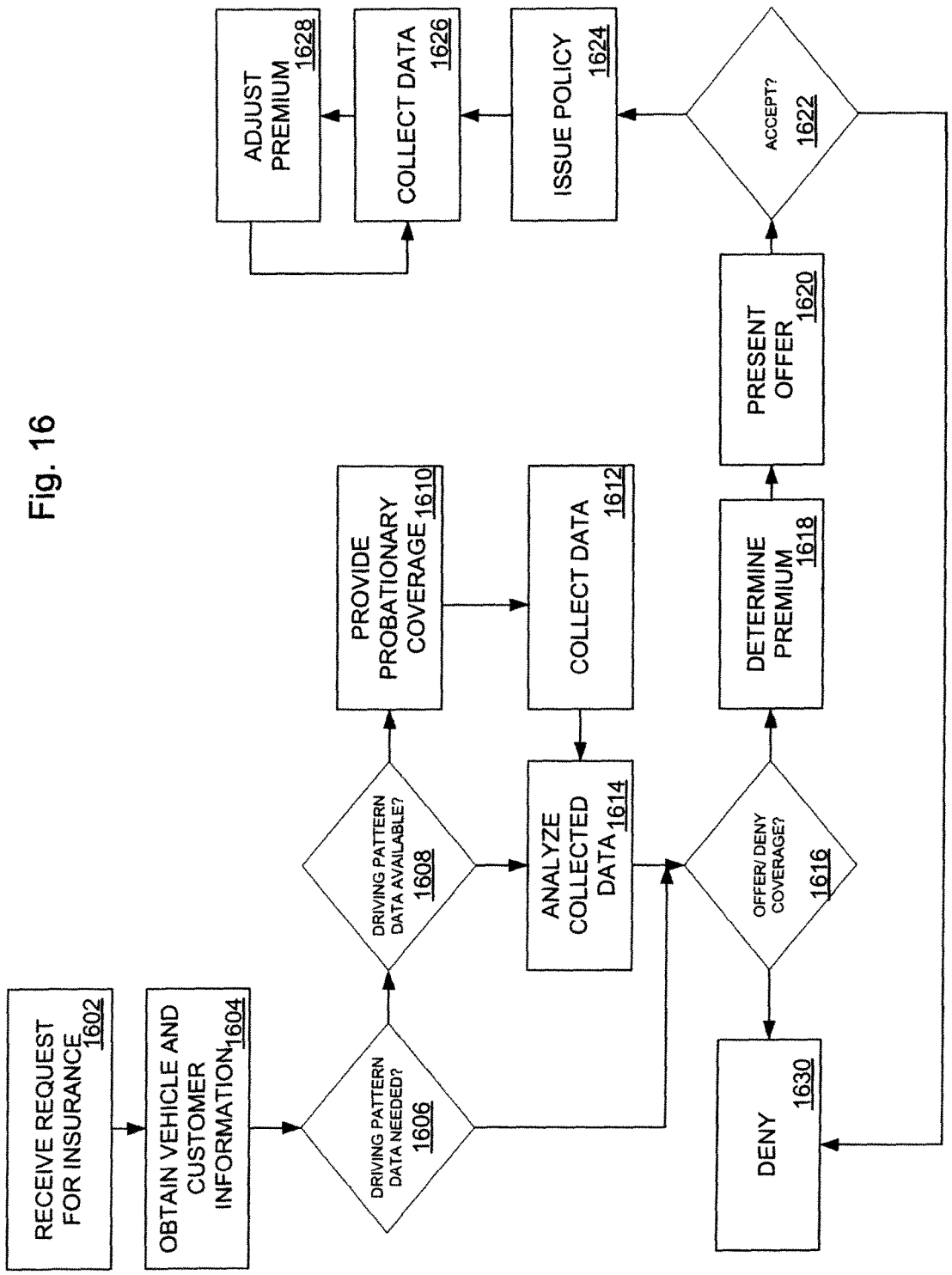

COMPUTER SYSTEM FOR DETERMINING GEOGRAPHIC-LOCATION ASSOCIATED CONDITIONS

CROSS REFERENCE TO RELATED APPLICATIONS

The present application is a divisional of copending U.S. application Ser. No. 13/233,357, entitled "Systems and Methods for Providing a Safety Score Associated with a User Location", filed Sep. 15, 2011, which is in turn a continuation-in-part of U.S. patent application Ser. No. 13/105,059 entitled "Systems and Methods for Providing a Safety Score Associated With a User Location" filed on May 11, 2011 and a continuation-in-part of U.S. patent application Ser. No. 12/754,189 entitled "System and Method for Geocoded Insurance Processing Using Mobile Devices" filed on Apr. 5, 2010 which was based on, and claimed benefit and priority of, U.S. Provisional Patent Application No. 61/291,501 filed on Dec. 31, 2009, the contents of all of which are incorporated herein in their entirety for all purposes.

FIELD

Embodiments relate to insurance processing systems and methods. More particularly, embodiments relate to the calculation, modeling and/or provision of a safety score associated with a user location.

BACKGROUND

Each year, thousands of deaths and millions of injuries result from automobile or other vehicle crashes. Billions of dollars of losses occur as a direct and indirect result of accidents, theft, and injury related to automobiles and other vehicles. It is desirable to reduce those losses and to generally improve the safety of drivers and passengers.

Many accidents, thefts, and other insurance related losses occur in high risk areas. For example, more theft losses may occur in urban areas. Accident-related deaths may occur on certain stretches of suburban roads with difficult to navigate turns or impaired sight lines. Many non-injury accidents occur in high traffic density areas, such as parking lots or shopping areas.

It would be desirable to provide information to vehicle operators to alert them of the existence and location of these higher risk areas so that they can either avoid them or take extra care when operating in those areas. It would further be desirable to provide more accurate and current data about areas which have higher loss risks, including the receipt of accurate information associated with accidents and potential claims. Further still, it would be desirable to monitor or identify driving patterns associated with certain drivers to allow those drivers to receive discounts or other benefits based on desirable driving patterns such as avoiding or reducing time spent operating in high loss risk areas.

BRIEF DESCRIPTION OF THE DRAWINGS

FIGS. 4A and 4B are block diagrams depicting user interfaces pursuant to some embodiments.

FIG. 12A-J is a series of user interface diagrams depicting mobile device interfaces pursuant to some embodiments.

FIG. 16 is a flow diagram of a process carried out by the system of FIG. 13 for processing requests for insurance.

DETAILED DESCRIPTION

Figure 1:
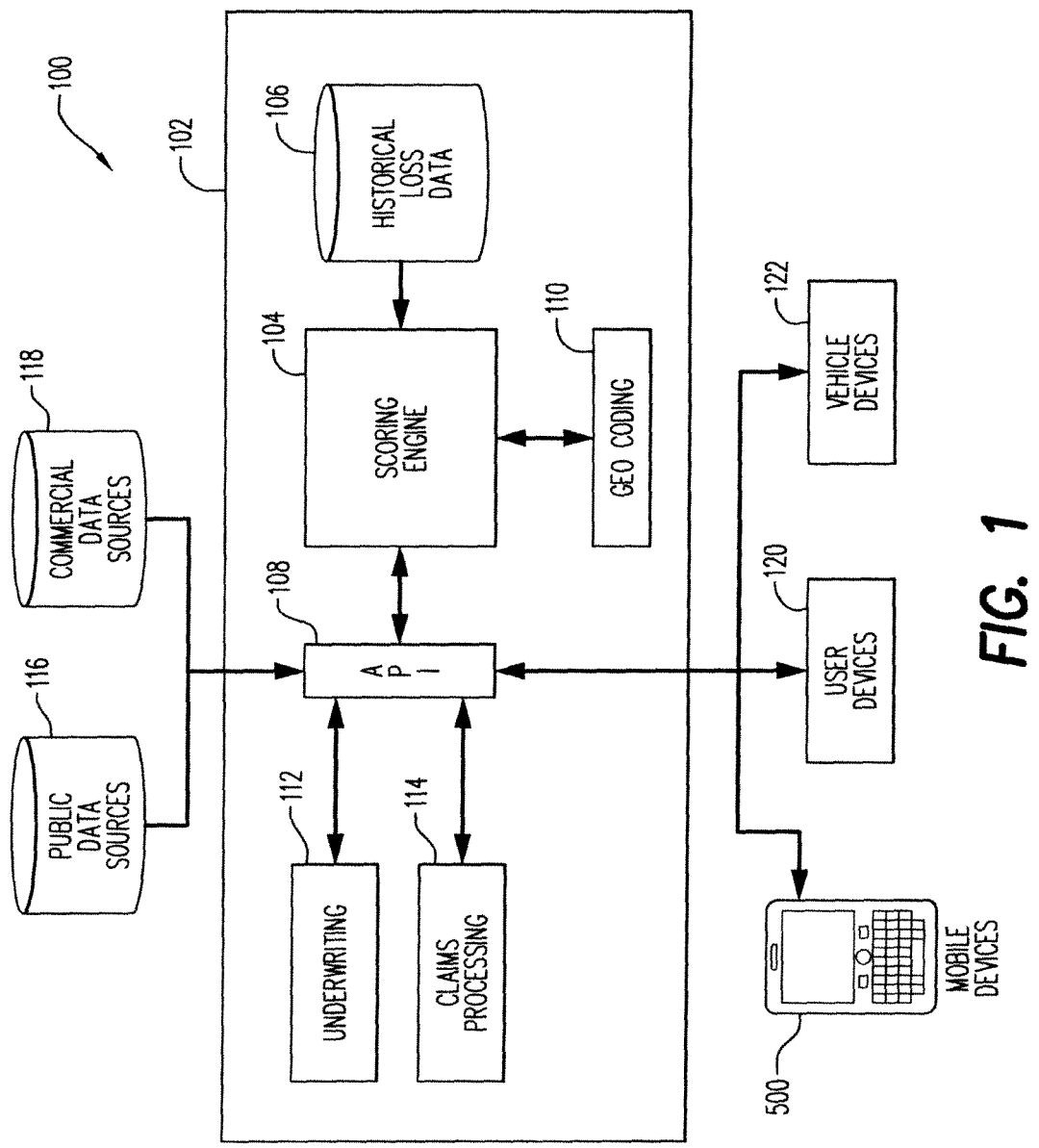
FIG. 1 illustrates a system architecture within which some embodiments may be implemented.

Embodiments of the present invention relate to systems and methods for reducing vehicle related losses, including insurance systems for underwriting policies and processing claims associated with vehicles. Applicants have recognized a need for systems and methods which allow loss data, demographic data, and data related to weather, time of day, day of week, and other data to be used to generate loss risk scores. Pursuant to some embodiments, these loss risk scores are presented to users (such as drivers, insured individuals or other interested parties) via mobile devices to allow those users to avoid or reduce their exposure to high risk areas or locations. Pursuant to some embodiments, users may provide data or other information about accidents, thefts, other losses, or safety information via their mobile devices. This data, in some embodiments, is used to update loss risk scoring data. Features of some embodiments may be used in conjunction with pricing, underwriting, updating and otherwise interacting with insurance providers. In some embodiments, features may be used in conjunction with individual or personal insurance policies as well as fleet or commercial policies. As used herein, the term "pricing" generally refers to the calculation of a premium associated with an insurance policy.

In some embodiments, mobile devices are provided with applications that allow users to easily access, view, and interact with the loss risk data. For example, in some embodiments, users are able to view maps, routes, and other user interfaces having graphical depictions of loss risks by area. The applications, in some embodiments, allow users to submit data used to enhance or update the loss risk score data (e.g., such as by submitting loss claims, reporting on third party accidents, etc.). In some embodiments, the applications further allow the efficient and accurate tracking and reporting of a user's driving or vehicle operation activity, allowing for improved pricing and analysis of insurance policies.

The result is a system and method which provides improved information that may be used to reduce losses and injuries and which provides an improved ability to insure and underwrite individuals and businesses. By providing detailed information about geographical areas which pose a high risk of loss, embodiments allow users to proactively avoid those areas. The accuracy of the information is improved by allowing mobile device users to provide updates about losses and related information while they are at or near an area at which a loss was suffered. Such updates may be used to initiate and process insurance claims associated with a loss. The information may also be used, pursuant to some embodiments, to price and underwrite certain policies, providing improved coverage and pricing for individuals based on their usage and driving patterns.

To introduce features of some embodiments, several illustrative (but not limiting) examples will now be provided. In a first illustrative example, a driver wishes to obtain a new auto insurance policy. The driver has a mobile device (such as a smart phone) that he uses on a daily basis, and the mobile device has built in GPS and wireless features. The driver downloads and installs a mobile application having features of the present invention onto his mobile device from the insurance provider he wishes to obtain coverage from. The driver interacts with the application to provide his insurance application information, including his personal information and details of the vehicle he wishes to obtain coverage for. The application information is transmitted over a wireless network to the insurance provider and an application for insurance is created for the driver. Some or all of the steps in seeking and obtaining coverage are performed using the mobile device installed on the driver's mobile device. Although the application is described as being "downloaded", those skilled in the art will appreciate that the application (and some or all of the data associated with the application) may be pre-installed or preloaded on a device.

In a second illustrative (but not limiting) example, a driver wishes to avoid driving in areas which are dangerous or that have current traffic or driving hazards. The driver downloads and installs a mobile application having features of some embodiments of the present invention onto her mobile device (the application may be the same as the one downloaded by the driver in the first illustrative example, or a different application). The mobile application (having functionality such as that described below in conjunction with FIGS. 4, and 7-10) allows the driver to view her current location (based on GPS or other location data transmitted from her mobile device to a processing system) on a map, as well as to plot out a planned route between locations. In some embodiments, the data may be provided to the user over a network, while in other embodiments, portions of the data may be provided over a network, while other portions may be stored in a storage device associated with the mobile device. Further, while a mobile device may be a mobile telephone, those skilled in the art will appreciate that other devices may receive, consume, and otherwise interact with data of the present invention (e.g., such as mobile GPS devices, vehicle navigation systems, or the like).

The map, according to some embodiments, may include markers or other indicators depicting areas, intersections, streets, or routes which have a higher than average risk of loss. The indicators are created and provided to the mobile device using a scoring engine that includes information about the relative risk of loss associated with different geographical locations or areas. For example, the driver may use the information to decide whether to take one of several possible routes. One of the possible routes may have a higher potential risk of loss or damage than the others, and the driver may elect to take the route with a lower risk of loss. The driver may also use the information to identify parking lots or areas which have lower risks of theft or property damage. Further still, the driver may use the information to identify areas that are currently suffering from higher than ordinary risk (e.g., such as a flooded street that she may want to avoid, or a road under construction, etc.). The driver may also configure the mobile application to alert her (substantially in real time) of upcoming hazards or risks along her route. For example, if the driver is approaching a particularly hazardous intersection (where the intersection has a relatively high risk score) the mobile device may alert her (using visual or audio alerts) that she is nearing a hazardous area. In this way, the driver is able to proactively take steps to reduce her risk of loss or damage. The driver may also interact with the mobile application to submit information about traffic or road conditions that she personally is witness to (for example, to submit information about a particularly dangerous road condition, etc.). This information may be aggregated and provided to other users of the mobile application to provide substantially real time updates to traffic and driving conditions. In some embodiments, additional information may be provided associated with alternative route choices, such as the additional amount of time or distance that one route may require over another.

In a third illustrative (but not limiting) example, a driver wishes to qualify for a discount or reduction in his insurance premium, and agrees to download and install a mobile application that collects data about the driver's driving patterns in order to possibly qualify for a discount or reduction. The driver interacts with the mobile device to allow it to track his driving patterns by allowing the mobile device to collect data about his daily mileage, speed, route, and other information. The data is collected by the mobile device and wirelessly transmitted to an insurance processing system for analysis. The insurance processing system may use the information to determine a relative risk score associated with the driver's driving patterns (e.g., using a scoring engine such as the engine to be described below in conjunction with FIG. 1). The insurance processing system may look at the driver's driving history over a short period of time, or over a longer period of time (e.g., such as for a week, month, or even year) and may adjust the driver's policy pricing based (at least in part) on the driver's driving patterns and the relative risk of the driver's routes, and driving characteristics. The pricing may be adjusted on a going forward basis (e.g., as a reduction to a renewal) or as a discount. In this manner, policies may be priced more accurately and in a manner that reflects a more accurate assessment of the relative risk posed by a driver. In some embodiments, the application may further be used to track where a vehicle is typically parked. Some policies require an insured individual to provide this information. Embodiments of the present invention may allow the data to be automatically collected and transmitted to an insurer for analysis and use.

In a fourth illustrative (but not limiting) example, a driver may suffer an accident or other loss, and may need to submit a claim. Pursuant to some embodiments, the driver may interact with a mobile application to record details about the accident (including taking pictures, recording notes, and entering loss data) using the mobile application. The claim information is then wirelessly transmitted to an insurance processing system for further processing. In some embodiments, the claim information may be automatically appended with time and location data (from the mobile device) for use in processing the claim. In this manner, users may quickly, efficiently and accurately submit claim information. These and other features and embodiments will be described in further detail below.

Features of some embodiments will now be described by first referring to FIG. 1, where a network 100 for providing risk scores and insurance processing pursuant to some embodiments is shown. As depicted, network 100 includes a number of devices which together operate to generate, store and utilize loss risk scores for use in informing users and in insurance processing. Network 100 includes an insurance processing system 102 with a scoring engine 104 that generates loss risk scores that may be provided to a number of users, such as users operating mobile phones 500 (such as those described in conjunction with FIGS. 2, 5 and 6 below), other user devices 120 (such as personal computers or the like), and vehicle devices 122 (such as navigation systems or the like). The loss risk scores may be used to plan routes (e.g., which avoid high loss risk or dangerous areas) and to track driver or vehicle behavior (e.g., to identify driving patterns which present a relatively low or high risk).

Data may be provided from mobile devices 500, user devices 120 and vehicle devices 122 to update data used by the scoring engine 104 to improve the accuracy and relevancy of scoring data. For example, users operating a mobile device 500 may submit information about a vehicle accident, theft, or other information that may be relevant to the generation of loss risk scores. The data may be used by the scoring engine 104 to update loss risk data which may then be disseminated to devices in the network 100. The use of such loss risk data in conjunction with mobile or other devices will be described further below in conjunction with FIGS. 4, and 7-12.

Pursuant to some embodiments, insurance processing system 102 includes a scoring engine 104 which operates on historical loss data 106 and loss-related data from other data sources (such as public data sources 116 and commercial data sources 118) to generate loss risk scores that indicate a relative loss risk. In some embodiments, the loss risk scores (and data used to generate the loss risk scores) are geocoded to create a loss risk index that represents the relative risk of loss in different geographical locations. Pursuant to some embodiments, address and location data may expressed (or "geocoded") as a location (or "geocode") given in latitude and longitude, using standard decimal degrees notation for the latitudes and longitudes, although other spatial and locational data may also be used to code and tag data associated with the present invention.

In some embodiments, the geocoding or tagging may include identifying specific types of locations, such as street intersections, parking lots, or the like so that loss risk scores and other information may be associated with those locations. In some embodiments, system 102 includes a geocoding engine 110 which operates on received data to express the data as a location. For example, the geocoding engine 110 may be used on address data received from an insurance application, claim or other information and translate or express the address as a latitude and longitude. The engine 110 may also append other location-related data to the address data to provide additional location information to the data. The "geocoded" data may then be stored, used as an input to the scoring engine 104, or presented to a user device (e.g., such as a mobile device 500, etc.) for use (e.g., such as by presenting the data in a map format or overlay). In some embodiments, some of the data used by the scoring engine 104 and/or the geocoding engine 110 may be obtained using data mining techniques (e.g., such as text mining). For example, some claims data or public data used in conjunction with the scoring engine 104 may not be available in a structured format that allows ready geocoding. In such situations, data mining techniques may be used to locate, identify and extract location and risk-relevant data for use and manipulation by the system 102.

Any of a number of different algorithms may be used to generate the loss risk scores and the loss risk index. In some embodiments, the historical loss data 106 and other input data sources 116, 118 are selected based on variables that have a high correlation to loss. The loss risk scores and the loss risk index may be generated using statistical modeling techniques such as by performing computations using discrete scores that are weighted in nonlinear combination (e.g., such as based on the likelihood of a loss in a given geographical location or geocode). In some embodiments, the generation of the loss risk scores and index may be performed by sampling data (including historical loss data 106), normalizing the data, generating a scoring model and verifying and updating the model. In some embodiments, the model may be updated based on actual loss data received from mobile devices and from other sources. In some embodiments, the scoring may be shared among a number of insurance entities (e.g., such as a consortium or group of insurance companies) and historical and current loss data may be provided from those entities to create a more accurate and predictive score.

As a specific example (which is provided for illustration but not limitation), the system of the invention operates on data to generate loss risk scores that are associated with the likelihood of a vehicle loss. In such an example implementation, the following types of data may be used as inputs to the scoring engine: (i) data from historical loss data 106 including historical data associated with collision losses, historical data associated with theft losses, and historical data associated with personal injury losses, (ii) data from public data sources 116, including census and demographic data (e.g., such as population density, crime statistics, emergency call data, highway and road construction data), and (iii) data from commercial data sources 118 (e.g., such as data from other insurers regarding losses, theft data from sources such as LoJack® or OnStar®, and traffic and traffic density data from sources such as EZ-Pass® or the like). This data may further be enhanced or updated using data from users operating mobile devices 500, other user devices 120 and vehicle devices 122 (e.g., such as transponders or communication devices installed in fleet or private vehicles).

A number of algorithms may be used to generate loss risk scores pursuant to some embodiments. As one illustrative (but not limiting) example, a loss risk score may be calculated using the following general function:

$$\text{Loss Risk Score} = aP \times bQ \times cS \times dT \times eU \times fV$$

Pursuant to some embodiments, the function generates a Loss Risk Score which is a score for a specific location or geocode. The Loss Risk Score may be a representation of a general loss risk range. For example, in some embodiments, loss risk tiers may be represented as color codes, such as "green" for low risk, "orange" for normal risk, and "red" for higher risk. As another example, the loss risk tiers may be represented as alphabetical grades or scores (e.g., such as "A" for low risk, "B" for normal risk, and "C" for higher risk). Other representations may include tiers based on percentages, or other representations of the relative risk of a geocode or location.

In the formula depicted above, the variable "P" represents the Average Claims or Loss Severity for a particular geocode or area. The variable "0" represents the Average Claims or Loss Frequency for that geocode or area. The variable "R" represents a Weather Risk factor (e.g., representing adverse weather conditions, such as a snowstorm, rain storm, hurricane, etc.), and the variable "S" represents a Time of Day risk factor (e.g., associated with a time of day, such as rush hour, night time, etc.) The variable "T" represents a Day Risk Factor (e.g., such as a particular day of the week, holiday, etc.), and the variable "U" represents a Traffic Condition Risk factor (e.g., such as a current traffic condition for a particular geocode or location). The variable "V" represents a User Generated risk factor (based on, for example, inputs received from people reporting or identifying dangerous events or conditions using their mobile devices). The variable "W" represents a Crime Risk factor (e.g., such as a risk of car thefts or property damage). The variable "Y" represents a People or Vehicle risk factor (e.g., based on population density information). Those skilled in the art will appreciate that other variables and inputs may be provided to generate a risk score that has a high correlation to the risk of loss in a particular location or geocode. Each of the variables may be based on data received substantially in real time from a number of different sources. Individual risk factors will only be used in applicable jurisdictions as allowed by law.

Pursuant to some embodiments, a trip risk score may be generated using a formula such as:

$$\text{Trip Risk Score} = x \, \% \times A + y \, \% \times B + z \, \% \times C$$

Where the Trip Risk Score is a score for a particular trip or route traveled by an individual or group of individuals across a number of geocodes. The Trip Risk Score may be represented as a color, grade, or other representation of the relative risk associated with a particular trip or route. For example, a high risk route may be represented by a red color, a "C", or a percentage, while a low risk route may be represented by the color green, an "A", or a percentage, while a normal risk route may be represented by the color orange, a "B" or a percentage. Those skilled in the art will appreciate that a number of other representations may be used to depict the relative risk of a trip or route.

In the Trip Risk Score formula depicted above, the variable x % is the percentage of the total trip or route distance (such as in miles) that go through geocodes or locations having a Loss Risk Score of A (or a low risk), while y % is the percentage of the total trip or route distance that pass through geocodes or locations having a Loss Risk Score of B (a normal risk), while z % is the percentage of the total trip or route distance that pass through geocodes or locations having a Loss Risk Score of C (a high risk).

Pursuant to some embodiments, a Vehicle or Person Risk score may also be calculated using a formula such as the following:

$$\text{Vehicle or Person Risk Score} = m \, \% \times A + n \, \% \times B + p \, \% \times C$$

Where the Vehicle or Person Risk Score is a score for a particular person or vehicle (or group of persons or vehicles) over a period of time based on cumulative trips taken during that period of time. For example, a person who, during the course of the year 2010, spends much of their time driving through high risk geocodes may be assigned a Person Risk Score of "red" (or some other indicator of high risk) based for 2010. In the Vehicle or Person Risk Score formula shown above, the variable m % is the percentage of the total distance taken through or in geocodes having a Loss Risk Score of "A" (low risk), n % is the percentage of the total distance taken through or in geocodes having a Loss Risk Score of "B" (normal risk), and p % is the percentage of the total distance traveled in or through geocodes having a Loss Risk Score of "C" (high risk).

Each of these risk scores may be used in providing information to users operating mobile devices as well as in providing insurance services, including in the pricing and underwriting of insurance policies. In some embodiments, the risk scores may be generated and used by an insurance processing system 102.

Insurance processing system 102 may be operated by, or on behalf of, an insurance company that issues insurance policies associated with the type of risk scored by the scoring engine 104. For example, in the situation where the scoring engine 104 is used to score vehicle or automobile types of loss risks, the insurance processing system 102 may be operated by an automobile insurer. In some embodiments, some or all of the components of the system 102 may be operated by or on behalf of other entities. For example, in some embodiments, the system 102 may be operated by a device manufacturer (e.g., such as vehicle navigation system, by a mobile device manufacturer, etc) in order to provide risk and driving related data to their customers. In some embodiments, some or all of the system 102 may be operated by agents or other groups or entities in order to provide, use, and otherwise interact with scoring and driving data pursuant to the present invention.

Data generated by the scoring engine 104, or received from mobile devices 500, user devices 120 and/or vehicle devices 122 may be used by the insurance processing system 102 to perform policy underwriting (e.g., using underwriting systems 112) and/or claims processing (e.g., using claims processing systems 114). For example, as will be described further below, automobile insurance policyholders who suffer an accident and need to submit a claim on their policy may use their mobile device 500 to submit claim data to the insurance processing system 102 (e.g., to trigger a notice of loss or otherwise initiate claims processing). The data received by the insurance processing system 102 may be received via one or more application programming interfaces (APIs) 108 and routed to the claims processing systems 114 for processing. In some embodiments, the data may also be routed to the scoring engine 104 to update loss risk data (e.g., to provide data about the accident, the location and the nature of the claimed loss).

Pursuant to some embodiments, the API 108 may include one or more APIs that expose some or all of the scoring data to external services. For example, in one embodiment, an API may be provided that allows the scoring data to be merged or integrated with data from external mapping services, such as Google® Maps, or Mapquest®. In such embodiments, users viewing a map displayed on a mobile device 500, other user device 120 or vehicle device 122 may select to view an overlay or integrated display of risk data. Examples of such a view are provided and discussed further below in conjunction with FIG. 4. In this way, users may view, plan, and create routes designed to avoid or minimize their exposure to high loss risk areas.

Pursuant to some embodiments, data may be transmitted between devices using a wireless network. In some embodiments, some, or all, of the data may be transmitted using other network communication techniques (e.g., such as satellite communication, RFID, or the like). In some embodiments, some or all of the data transmitted between devices may be encrypted or otherwise secured to prevent intrusion.

Figure 2:
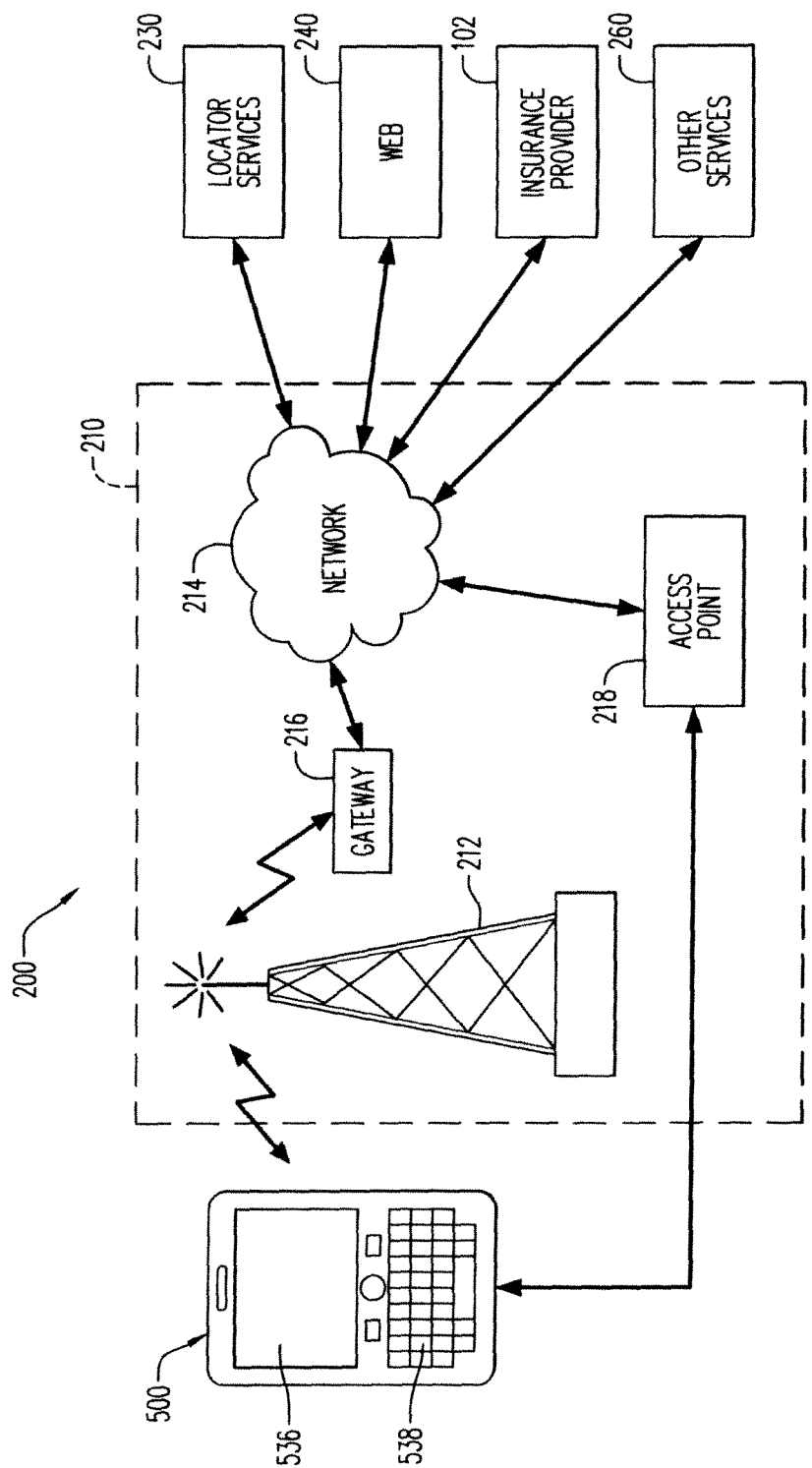
FIG. 2 illustrates a mobile system architecture within which some embodiments may be implemented.

Reference is now made to FIG. 2, which is a block diagram of an example network environment 200 showing communication paths between a mobile device 500 and the insurance processing systems 102 (as well as other devices and data sources). The mobile device 500 may be, for example, a mobile telephone, PDA, personal computer, or the like. For example, the mobile device 500 may be an iPhone® from Apple, Inc., a BlackBerry® from RIM, a mobile phone using the Google Android® operating system, or the like. In general, mobile device 500 may be any mobile computing and/or communications device which is capable of executing the insurance applications described below.

The mobile device 500 of FIG. 2 can, for example, communicate over one or more wired and/or wireless networks 210. As an example, a wireless network can be a cellular network (represented by a cell transmitter 212). A mobile device 500 may communicate over a cellular or other wireless network and through a gateway 216 may then communicate with a network 214 (e.g., such as the Internet or other public or private network). An access point, such as access point 218 may be provided to facilitate data and other communication access to network 214. The access point 218 may be, for example, compliant with the 802.11g (or other) communication standards.

In some embodiments, mobile device 500 may engage in both voice and data communications over the wireless network 212 via access point 218. For example, the mobile device 500 may be able to place or receive phone calls, send and receive emails, send and receive short message service ("SMS") messages, send and receive email messages, access electronic documents, send and receive streaming media, or the like, over the wireless network through the access point 218. Similar communications may be made via the network 212.

In some embodiments, a mobile device 500 may also establish communication by other means, such as, for example, wired connections with networks, peer-to-peer communication with other devices (e.g., using Bluetooth networking or the like), etc.

The mobile device 500 can, for example, communicate with one or more services over the networks 210, such as service providers 230-260 and the insurance processing systems 102 (described above in conjunction with FIG. 1). For example, a locator service 230 may provide navigation information, e.g., map information, location information, route information, and other information, to the mobile device 500.

Other services may include, for example, other web-based services 240 (e.g., such as data services or the like), media services (e.g., providing photo, video, music, or other rich content), download services (e.g., allowing applications and software or the like to be downloaded, etc.), and insurance services, such as the insurance services described further below (and including, for example, insurance reporting, customer service, underwriting, issuance, and the like).

The mobile device 500 can also access other data over the one or more wired and/or wireless networks 210. For example, content providers, such as news sites, RSS feeds, web sites, blogs, social networking sites, developer networks, etc., can be accessed by the mobile device 500. Such access can be provided by invocation of a web browsing function or application (e.g., a browser) in response to a user launching a Web browser application installed on the mobile device 500.

For example, in some embodiments described herein, the mobile device 500 may interact with insurance processing system 102 (of FIG. 1) to receive data associated with loss risk data generated by the scoring engine 104 (of FIG. 1) including the Loss Risk Scores by geocode, the Trip Risk Scores for routes, etc. The mobile device 500 may receive the loss risk data and integrate the data with a map (e.g., as shown and described below in conjunction with FIG. 4B) to allow route planning or driving to avoid high risk of loss areas (or "danger zones"). The mobile device 500 may also operate to transmit insurance-related data or driving data to the insurance processing system 102. For example, in a situation where the operator of the mobile device 500 is insured by the insurance company operating or associated with the insurance processing system 102, claim data associated with a collision, theft or other loss may be reported using the mobile device 500. An example of such a claims processing situation are provided below in conjunction with FIGS. 7 and 8. In some embodiments, an operator of the mobile device 500 may operate the mobile device 500 to submit traffic information, accident information or other information that may be relevant to other users, or to the collection of loss related data for use by the scoring engine 104. An example of such a submission is provided below in conjunction with FIG. 9. In still further embodiments, mobile device 500 (or vehicle devices 122) may be configured to collect and transmit vehicle or operator driving patterns for use in pricing, underwriting or otherwise administering insurance policies. An example of such an embodiment is provided below in conjunction with FIG. 10.

A number of pricing formulas may be used to incorporate the loss risk scores (described above) into a pricing determination. For example, in one illustrative embodiment, the following formula may be used:

$$\text{Price} = \text{Factor } A \times \text{Factor } B \times \text{Factor } C \times \text{Factor } D \times \text{Factor } E \times \text{Base Rate}$$

Where the Factor (x) is a number between 1.00 and 1.99 calculated from a formula using a defined set of Factor Inputs. The Factor Inputs are pre-defined rating variables from a table of different classifications. The Base Rate is a monetary number used for a unit of risk coverage (e.g., Base Rate for vehicles in State of New York or Base Rate for all private passenger vehicles in State of New York). The unit of risk coverage for a particular Base Rate could be for a broad set unit of time and place (year, state). Pursuant to some embodiments, as risk data may be received substantially in real time or on a regular basis, the unit of risk coverage for a particular Base Rate could be much more granular thanks to the dynamically changing data. For example, the unit of risk coverage could be expressed as a base rate per minute, and/or a base rate per mile, or base rate per geocode. As another example, the data may be used to perform "pay as you go" pricing of policies. As an example, in some embodiments, pay as you go, or route or trip specific pricing may be provided and communicated to a user pursuant to some embodiments. A driver on a pay as you go plan may request several different route options and receive pricing for each of the routes so that the driver can pick a desired route based on price, time, and other factors.

In the example pricing formula shown above, a number of Factor Inputs may be used, including, for example, those shown in the Table 1 below.

TABLE 1

| Factor Inputs | Type of Factor |
| --- | --- |
| Person Risk Score (based on Trip Risk Score) | E (non traditional) |
| Vehicle Risk Score (based on Trip Risk Score) | E (non traditional) |
| Credit Score (where legally available) | A |
| Age | A |
| # of at fault accidents | A |
| # of not at fault accidents | A |
| # of accident violations | A |
| # of passenger vehicles owned | A |
| Have prior insurance | B |
| Months since last auto accident | B |
| Months since last comprehensive loss on policy | B |
| Annual Mileage | B |
| Years with Insurance Firm | B |
| Years of owning residence | B |
| Years with clean driving record | B |
| Marital Status | C |
| Gender | C |
| Vehicle Age | C |
| Annual Mileage | C |
| Vehicle Use | C |
| Safe Driver Program | C |
| Non resident student | D |
| Air Bag Safety Discount | D |
| Anti Theft Device | D |
| Mature operator vehicle safety course | D |
| Own hybrid vehicle | D |
| Registered Mobile GPS device | D |

These pricing factors, as well as the risk scoring criteria discussed herein, are provided for illustrative purposes. The factors and criteria used in conjunction with any given insurer or product will be selected and used in a manner that is in conformance with any applicable laws and regulations. Pursuant to some embodiments, more granular pricing may be achieved by using several "non-traditional" pricing factors, including the Person Risk Score, the Vehicle Risk Score and the Trip Risk Score generated by the scoring engine of the present invention. Further, because the data may be obtained based on actual usage patterns obtained from mobile device 500 (or from vehicle devices, in some embodiments), the pricing may accurately reflect the actual loss risk associated with the usage patterns of a particular driver or vehicle.

The mobile device 500 can perform a number of different device functions. For example, the mobile device 500 may operate as a telephone, an email device, a network communication device, a media player device, etc., under control of one or more applications installed on the mobile device 500. In some embodiments, a user operating the mobile device 500 may interact with the applications using a keypad 538 which may be a tactile keypad with individual keys, or which may be a touch screen keypad. The user is presented with information and graphics on a display screen 536.

Figure 3A:
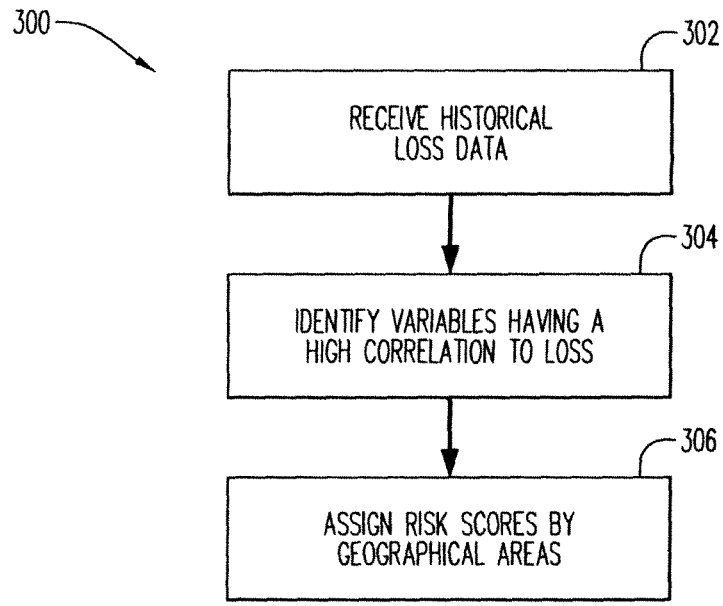
FIGS. 3A and 3B are flow diagrams depicting processes for creating and updating scores pursuant to some embodiments.
Figure 3B:
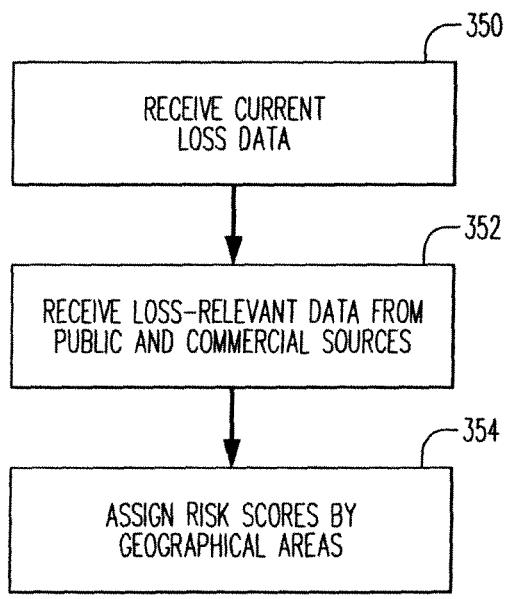
Figure 4A:
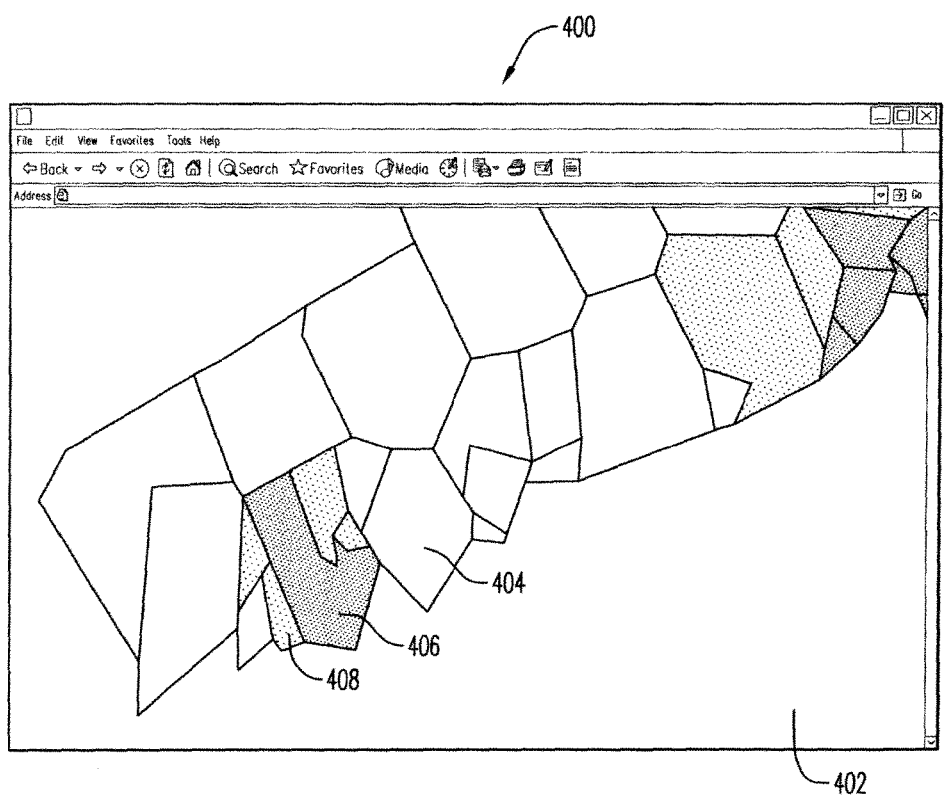

Reference is now made to FIGS. 3A and 3B where flow diagrams are shown which depict processes 300 that may be performed by the insurance processing system 102 of FIG. 1 to generate loss risk scores using the scoring engine 104. Referring first to FIG. 3A, a process 300 may be performed to generate loss risk scores (including the Loss Risk Scores, the Trip Risk Scores, and/or the Vehicle or Person Risk Scores described above) that may be used in insurance processing. The process 300 may be performed on an as needed basis to assign loss risk scores to geographical regions (e.g., such as ZIP code areas, ZIP+5 areas, or more granular areas based on latitude and longitude). Processing begins at 302 where historical loss data are received for processing. Historical loss data may be obtained from a data source such as historical loss database 106 of FIG. 1. In some embodiments, the historical loss data may be data associated with a single insurer. For example, in situations where the system 100 is operated by or on behalf of a particular insurer, the historical loss data may be loss data accumulated by that insurer. In some embodiments, a group, association or affiliation of insurers may aggregate historical loss data to provide a more accurate loss risk score. In such embodiments, the data received at 302 may include receiving data from one or more third party sources (e.g., such as commercial data sources 118). In some embodiments, processing at 302 may include pre-processing or formatting the data to a desired input format. Such processing may also include geocoding the data to a preferred format (e.g., such as using KML or other geographic formatting of data).

Processing continues at 304 where the system is operated to identify one or more variables having a high correlation to loss. For example, some variables may clearly have a high correlation to loss, such as theft, collision, or the like. Other variables may be identified based on analysis at 304. Processing continues at 306 where risk scores are generated and assigned to individual geographical areas or regions. For example, as the risk scores are calculated based on location, scores may be assigned to specific areas (such as by ZIP code or the like) so that those areas may be assigned a relative loss risk score (e.g., such as by using the Loss Risk Score formula described above by geocode).

Reference is now made to FIG. 3B, where a further flow diagram is shown. The flow diagram of FIG. 3B depicts a process for updating loss risk scores based on current or additional information received from various sources (such as public data sources 116, commercial data sources 118, mobile devices 500, user devices 120 and vehicle devices 122). Processing begins at 350 where current loss data is received. For example, current loss data may include new loss claim data received from an insurance policy holder who has submitted a claim using his or her mobile device 500 (as described below in conjunction with FIG. 11), or accident event information received from a user operating a mobile device 500 (as described below in conjunction with FIG. 7). The data received at 350 may be geocoded and formatted so that existing loss risk data and scoring may be updated.

Processing continues at 352 where loss-relevant data from public or commercial sources are received. The loss-relevant data may be information not directly associated with a loss but that is relevant to assessing the likelihood or risk of loss in different geographical areas. For example, data received at 352 may include traffic event information received from a user operating a mobile device 500 (as described below in conjunction with FIG. 9). Other data received at 352 may include police report data (from public data sources 116), or theft report data (from public data sources 116 and/or commercial data sources 118). The data received at 352 may be geocoded and formatted so that existing risk data and scoring may be updated.

Processing continues at 354 where the scoring engine 104 operates to assign updated risk scores by geographical area based on the new or updated information received at 350 and 352. The data updated by the processes of FIG. 3 may be provided to users in a number of different ways. For example, referring now to FIG. 4A, a diagram 400 depicting a user interface 402 is shown. The user interface 402 may be displayed on a computer, on a mobile device (such as the device 500 of FIG. 1), or on any type of display device that can receive data from insurance processing system 102.

The user interface 402 depicts a portion of a map showing a portion of Fairfield County in the State of Connecticut. More particularly, the map shows ZIP code regions of Fairfield County with certain ZIP code regions (such as regions 404-408) having different shading or hatching. The shading or hatching depicts the relative loss risk suffered by drivers in each ZIP code region, with certain rural ZIP code regions (shown without shading or hatching, such as region 404) having a lower risk than other ZIP code regions (such as region 406 with a high loss risk, and region 408 with a moderate loss risk).

The regions and their relative loss risk scores are purely illustrative and are used for purposes of describing features of some embodiments of the present invention. However, pursuant to some embodiments, entire coverage areas may be scored or have their relative risk assessed. Scores or risk levels may be depicted in a number of different ways, including using color codes (e.g., such as red for high risk, yellow for moderate risk, and green for low risk), hatching, numeric scores, or the like. In some embodiments, the presentation of risk levels may be used to primarily to communicate specific "danger zones" to drivers or vehicle operators. Pursuant to some embodiments, the scoring and geocoding of data may be performed on an ongoing basis, with updates performed substantially in real time. As a result, large accidents, disasters, weather conditions, time of day, traffic patterns, and other events may cause the scoring to change, and the presentation of such changes to users operating mobile devices 500 or other devices allows such users to react to or take steps to avoid any danger zones or areas of higher than normal risk.

In some embodiments, such as the one depicted in FIG. 4B, users operating devices such as a mobile device 500, may access risk score information in order to identify a safe route or to assess the relative risk associated with multiple route options. For example, Trip Risk Score maybe generated for each of the multiple route options. As shown in FIG. 4B, a user is viewing a portion of a route map. In the illustrative interface, the user is viewing a route through Fairfield County Conn., and has two route choices—a surface street (shown as Route "1") or a freeway (shown as Interstate "95"). The relative level of loss risk posed between the two routes is depicted by shading or coloring. In the illustrative example, the choice of Route 1 (shown as item 454) is shaded darker than the alternative route (shown as item 456). The darker shading may indicate that the surface street (which traverses a downtown area with multiple traffic issues and intersections) has a higher risk of loss than the alternative route. In this manner, users operating mobile devices 500 (or other devices, such as vehicle navigation systems or computers), may proactively choose to take routes that have lower risk of vehicle damage, passenger injury, or other losses.

Similar maps may be generated for specific loss risks. For example, a user may wish to find the relative danger of parking in one parking lot over another parking lot. Embodiments allow users to request specific loss risk score and receive the data in a visual representation such as a map or a map overlay. Other route planning, mapping, and graphical uses of such risk data will be described further below in conjunction with FIG. 9.

Figure 5:
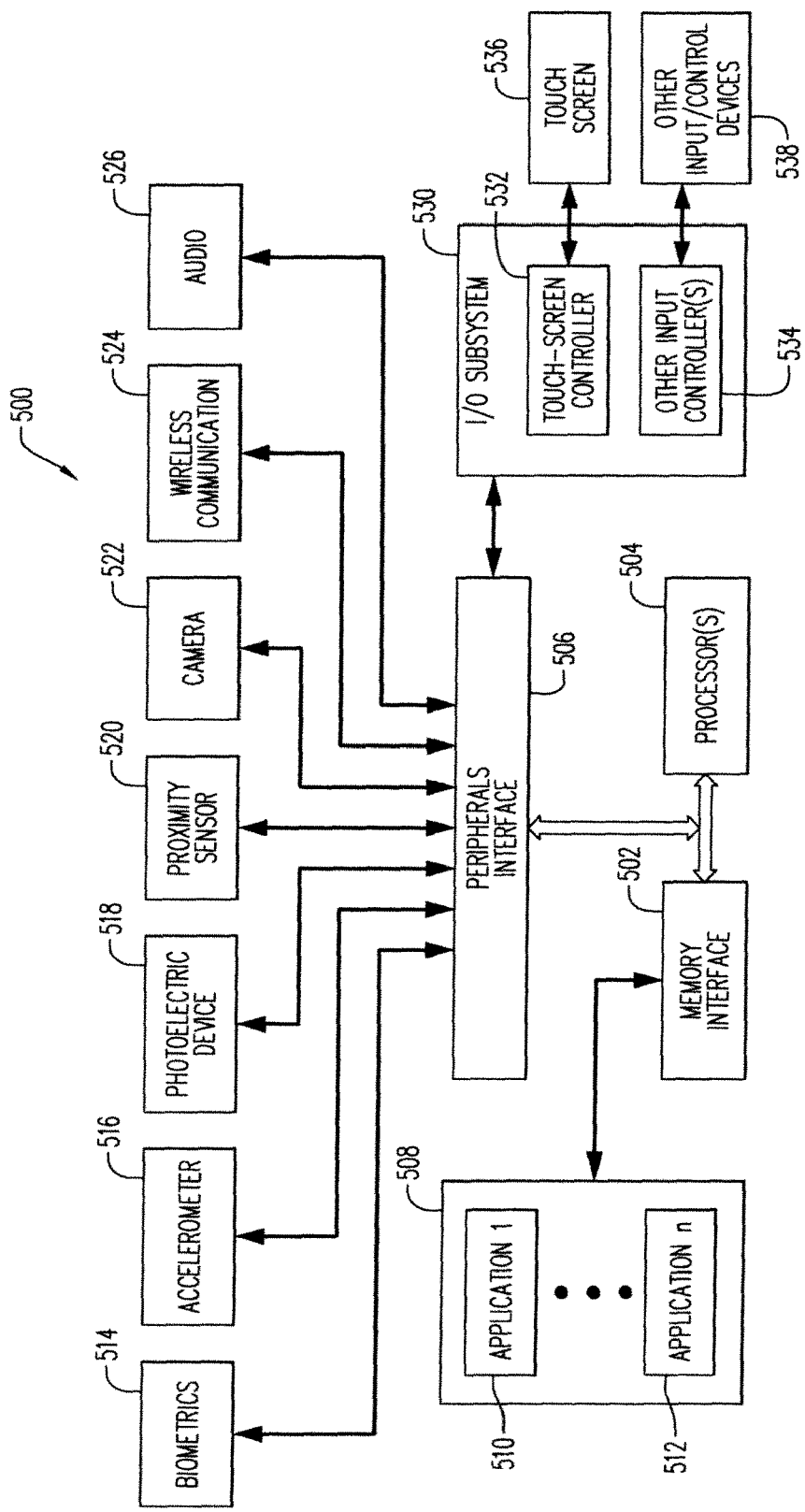
FIG. 5 is a partial functional block diagram of a mobile device and system provided in accordance with some embodiments.

Reference is now made to FIG. 5, where details of a mobile device 500 according to some embodiments is shown. As depicted, the mobile device 500 includes a number of components which may be controlled or perform functions in conjunction with one more application programs 510-512 to perform the features of some embodiments.

The mobile device 500 can include a memory interface 502 one or more data processors, image processors and/or central processing units 504, and a peripherals interface 506. The memory interface 502, the one or more processors 504 and/or the peripherals interface 506 can be separate components or can be integrated in one or more integrated circuits. The various components in the mobile device 500 can be coupled by one or more communication buses or signal lines.

Sensors, devices and subsystems can be coupled to the peripherals interface 506 to facilitate multiple functionalities. For example, a biometrics sensor 514, an accelerometer 516, a photoelectric device 516, a proximity sensor 520, a camera 522, a wireless communication unit 524, and an audio unit 526 may be provided to facilitate the collection, use and interaction with data and information and to achieve the functions of the insurance applications described further below.

The mobile device 500 may include one or more input/output (I/O) devices and/or sensor devices. For example, input controllers 534 may be provided with a speaker and a microphone (not shown) to facilitate voice-enabled functionalities, such as phone and voice mail functions. In some implementations, a loud speaker can be included to facilitate hands-free voice functionalities, such as speaker phone functions. An audio jack can also be included for use of headphones and/or a microphone.

The I/O subsystem 530 can include a touch screen controller 532 and/or other input controller(s) 534. The touch-screen controller 532 can be coupled to a touch screen 536. The touch screen 536 and touch screen controller 532 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 536.

The other input controller(s) 534 can be coupled to other input/control devices 538, such as one or more buttons, rocker switches, thumb-wheel, infrared port, USB port, and/or a pointer device such as a stylus. The one or more buttons (not shown) can include an up/down button for volume control of the speaker and/or the microphone.

In some implementations, a proximity sensor 520 can be included to facilitate the detection of the user positioning the mobile device 500 proximate to the user's ear and, in response, to disengage the touch-screen display 536 to prevent accidental function invocations. In some implementations, the touch-screen display 536 can be turned off to conserve additional power when the mobile device 500 is proximate to the user's ear.

Other sensors can also be used. For example, in some implementations, a photoelectric device 518 may be provided to facilitate adjusting the brightness of the touch-screen display 538. In some implementations, an accelerometer 516 can be utilized to detect movement of the mobile device 500. In some embodiments, the mobile device 500 may include circuitry and sensors for supporting a location determining capability, such as that provided by the global positioning system (GPS) or other positioning system (e.g., systems using Wi-Fi access points, television signals, cellular grids, Uniform Resource Locators (URLs)). In some implementations, a positioning system (e.g., a GPS receiver) can be integrated into the mobile device 500 or provided as a separate device that can be coupled to the mobile device 500 through a peripherals interface 506 to provide access to location-based services. The positioning and location-based services may be used, for example, to tag data transmitted from the mobile device 500 to insurance provider systems 102 (e.g., in conjunction with the reporting of traffic, accidents, or filing claims, as will be described further below).

The mobile device 500 can also include a camera lens and sensor 520. In some implementations, the camera lens and sensor 520 can be located on the back surface of the mobile device 500. The camera can capture still images and/or video. The camera may be used, for example, to capture images of traffic incidents, vehicle collisions, or the like as will be described further below.

The mobile device 500 can also include one or more wireless communication subsystems 524, such as an 802.11b/g communication device, and/or a Bluetooth® communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

In some implementations, additional sensors or subsystems may be coupled to the peripherals interface 506 via connectors such as, for example a Universal Serial Bus (USB) port, or a docking port, or some other wired port connection.

The memory interface 502 can be coupled to memory 508. The memory 508 can include high-speed random access memory and/or non-volatile memory, such as one or more magnetic disk storage devices, one or more optical storage devices, and/or flash memory (e.g., NAND, NOR). The memory 508 can store an operating system, such as Darwin, RTXC, LINUX, UNIX, OS X, WINDOWS, or an embedded operating system such as VxWorks. The operating system may include instructions for handling basic system services and for performing hardware dependent tasks. In some implementations, the operating system can be a kernel (e.g., UNIX kernel).

The memory 508 may also store application programs 510-512 which act, in conjunction with the processors 504, to cause the mobile device to operate to perform certain functions, including the insurance related functions described further below.

The memory 508 can also store data, including but not limited to documents, images, video files, audio files, and other data. In some implementations, the memory 508 stores address book data, which can include contact information (e.g., address, phone number, etc.) for one or more persons, organizations, services, or entities. For example, in some embodiments, the memory stores insurance policy numbers or other unique identifiers to allow a user of the mobile device 500 to quickly access insurance policy related data and information.

In some embodiments, the mobile device 500 includes a positioning system. In some embodiments, the positioning system can be provided by a separate device coupled to the mobile device 500, or can be provided internal to the mobile device. In some implementations, the positioning system can employ positioning technology including a GPS, a cellular grid, URIs or any other technology for determining the geographic location of a device. In some implementations, the positioning system can employ a service provided by a third party or external positioning. In other implementations, the positioning system can be provided by an accelerometer and a compass using dead reckoning techniques. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system can be provided by using wireless signal strength and one or more locations of known wireless signal sources to provide the current location. Wireless signal sources can include access points and/or cellular towers. Other techniques to determine a current location of the mobile device 500 can be used and other configurations of the positioning system are possible.

Figure 6:
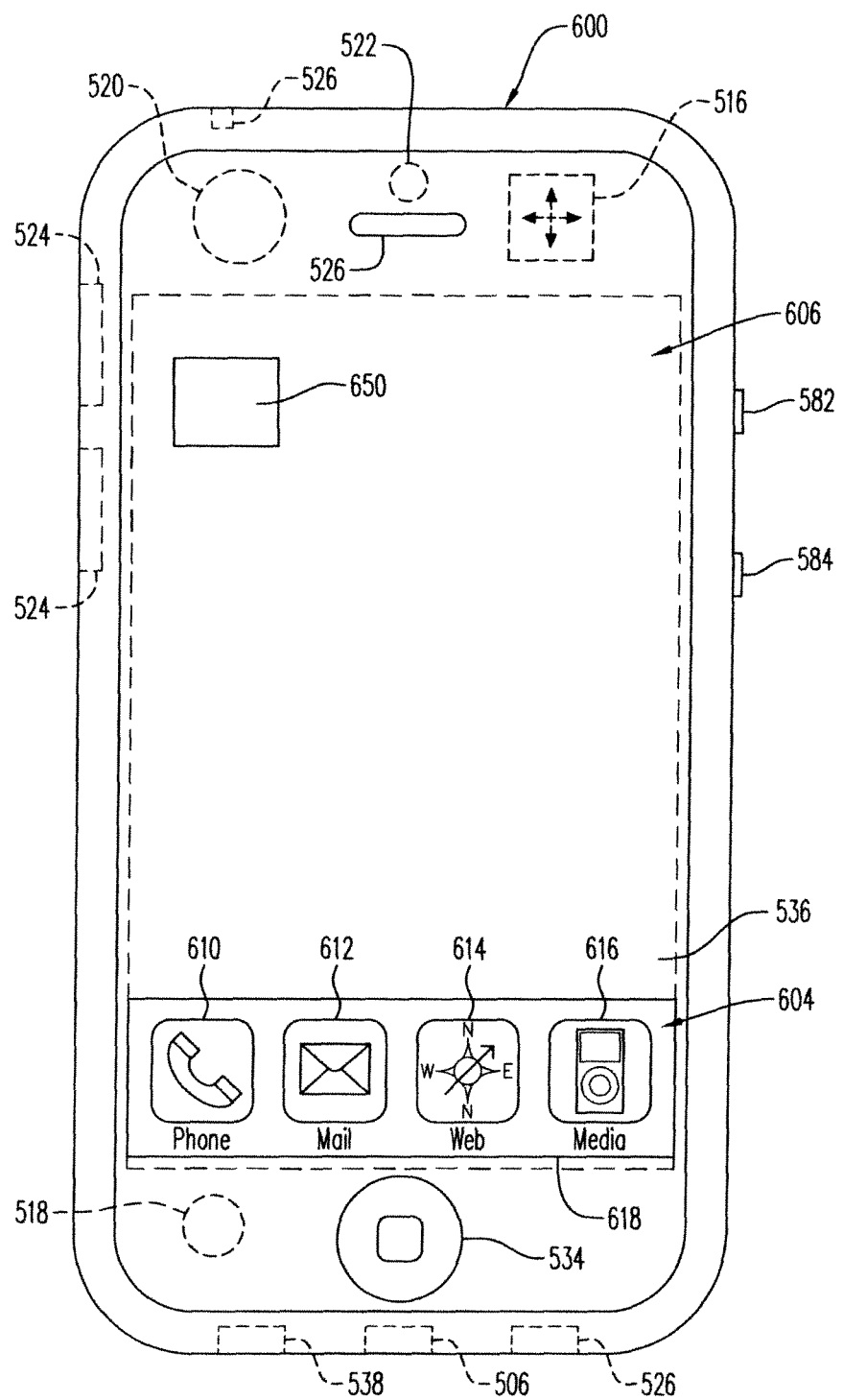
FIG. 6 is a block diagram of the mobile device of FIG. 5.

Reference is now made to FIG. 6, where a mobile device 500 is shown. As shown, the mobile device 500 can launch (and operate under the control of) one or more application programs by selecting an icon associated with an application program. As depicted, the mobile device 500 has several application programs (and corresponding icons), including an insurance application (launched by selecting icon 650), a phone application (launched by selecting icon 610), an email program (launched by selecting icon 612), a Web browser application (launched by selecting icon 614), and a media player application (launched by selecting icon 604). Those skilled in the art will recognize that mobile device 500 may have a number of different icons and applications, and that applications may be launched in other manners as well (e.g., using hot keys, drop down selectors, or the like). In the embodiment shown, an application, such as the insurance application, is launched by the user tapping or touching an icon displayed on the touch screen 536 interface of the mobile device 500.

Once an application is launched, the user may interact with the application, and the mobile device may function pursuant to the program instructions associated with the application. In the various insurance applications described further below, details of some operation of the mobile device 500 will be described.

Pursuant to some embodiments, an application may be stored in, or accessible to, memory 508 of mobile device 500 which allows a user of mobile device 500 to participate in insurance or claim related "crowdsourcing" of data. For example, in some embodiments, the insurance application may allow user-initiated reporting of accidents or events. In some embodiments, a user operating a mobile device 500 may launch the application and select an option such as "report an incident". The option may provide a selection of different types of incidents (e.g., such as an automobile accident, a personal injury, a fire, a robbery, a natural disaster, etc.) and may prompt the user for additional information. Data from the mobile device, including a user identifier, a location of the user, and the user provided data are transmitted over a network to an insurance service provider 102 for collating the data. In some embodiments, a user may provide commentary (e.g., by entering a textual description of the event, by recording a voice narrative, by taking one or more still photos, by taking one or more video recordings, etc.) of the event. Such commentary will be transmitted over a network to the insurance system 102. In some embodiments, the data received by the insurance system 102 is used to update, modify or otherwise maintain accurate and current information for use by scoring engine 104.

In some embodiments, a map of events near a user's location may also be presented and users in the area of an event may be prompted to provide further data about the event. In this manner, for example, a number of separate users may provide near real-time evidence or documentation about events that may trigger insurance coverage so that the insurer may more accurately process claims arising from the event. For example, in some embodiments, when users operating mobile devices 500 transmit information to insurance system 102, the mobile device 500 tags the data with the user's geocoded location and a timestamp.

In some embodiments, users may be provided with an incentive for submitting such event data. For example, users who are insured or might become insured by an insurance company operating the service may receive a benefit (e.g., such as a discount or coupon) based on the number, quality and type of events the user provides data about.

In some embodiments, the data from such user reported events may be presented on a map or other user interface that is transmitted from the insurance system 102 to individual mobile devices 500. The data may then be used to alert users about nearby events so that the user can adjust their location accordingly (e.g., to avoid a traffic accident, to depart from an area with a natural disaster, etc.). In some embodiments, the insurance service provider may use such event data to transmit alerts or notifications to individual users in the area of an event.

In the event of catastrophes or natural disasters (e.g., such as tornados, floods, terrorist activities, etc), user data may be collected substantially in real-time to monitor the extent and exact location of such events and to alert other users of the location and extent of such events.

Figure 7:
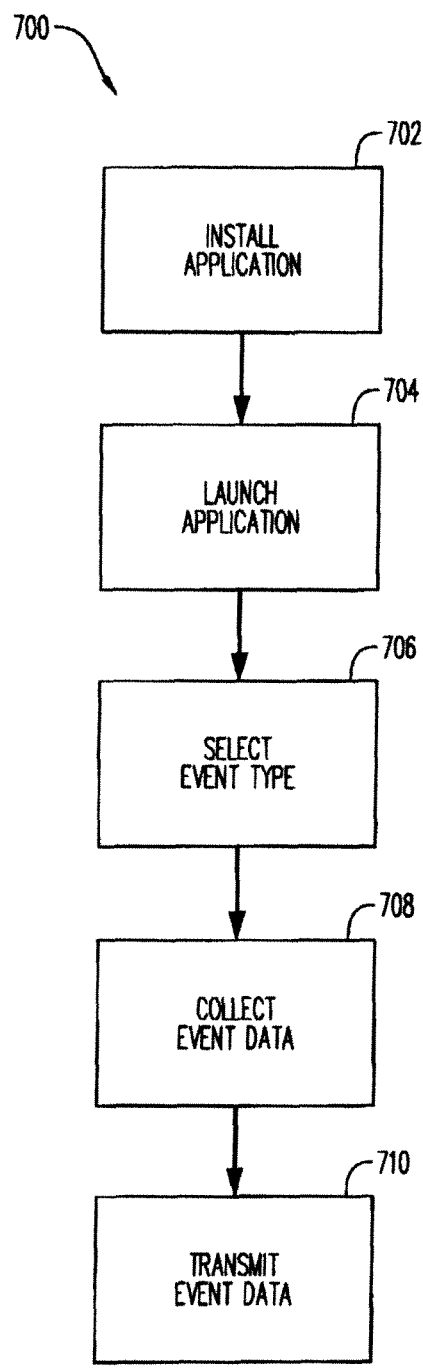
FIG. 7 is a flow diagram depicting a process for collecting and presenting data from a plurality of users operating devices such as the device of FIG. 5 pursuant to some embodiments.

Reference is now made to FIG. 7, which shows a process 700 for installing and using an application pursuant to some embodiments. Process 700 may be performed using a mobile device such as the mobile device 500 described above. As shown, processing begins at 702 where a user of a mobile device 500 downloads and installs the insurance application. This download and install may be performed from the mobile device 500 or from a desktop computer in communication with the mobile device 500. The application may be downloaded from the insurance system 102 or from an application marketplace.

Processing continues at 704 where a user launches the application, e.g., to report on an event witnessed by the user. Processing continues at 706 where the user selects or designates a type of event he or she wishes to report on (e.g., such as a flood, an accident, a fire, or the like). Processing continues at 708 where the user manipulates the mobile device 500 to collect event data. For example, processing at 708 may include the user taking a photo or a video of the event scene, and/or providing a textual or voice recorded description of the event. Processing continues at 710 where the event data is transmitted to an insurance system 102 for further processing. In some embodiments, the application causes geolocation data to be appended to or otherwise associated with the event data. The event data and the geolocation data are then manipulated by the insurance system 102 to provide information to other users or to amass details about the event. In some embodiments, the data may be used in conjunction with insurance processing such as the insurance processing described further below in conjunction with FIGS. 13-19.

Pursuant to some embodiments, an application may be stored in, or accessible to, memory 508 of mobile device 500 which allows a user of mobile device 500 to participate in insurance or claim related reporting of data. For example, a user who has installed an insurance application of the present invention on a mobile device 500 and who witnesses an event may collect, annotate, and transmit the event data to an insurance system 102 via a network interface. As a specific example, where a user witnesses (or is a participant in) a traffic accident involving multiple parties (e.g., such as where the user is a rider on a bus during a bus accident), the user may launch an insurance application and collect, annotate and transmit information associated with the accident to an insurance system 102. One common problem in such events is the processing of claims by parties who purport to have been present in the event, but whose presence cannot be verified. Using features of the present invention, witnesses who were actually present at the scene of the event can record scenes from the event, including pictures and videos of the participants in the event. This data can be time stamped, geocoded and verified as coming from the scene of the event, and can later be used by the insurance 102 to authenticate and process claims arising from the event.

In some embodiments, users who submit such data to the insurance system 102 may receive benefits such as discounts in policies or the like. Further, users who suffered injury from such events may enjoy faster claim processing, as additional paperwork may be minimized and delays associated with claim processing may be reduced.

Similar features may be used in insurance applications which are used to report, record and prove damage from single vehicle or other accidents. For example, a user who is an insured who suffers a single-car accident may use the application to document the extent of damages suffered in the accident. The data transmitted to the insurance system 102 may include geocoded location information as well as time and date information to document the location and time of the event. Such data may be used in conjunction with official accident reports to verify the insured's claim.

Figure 8:
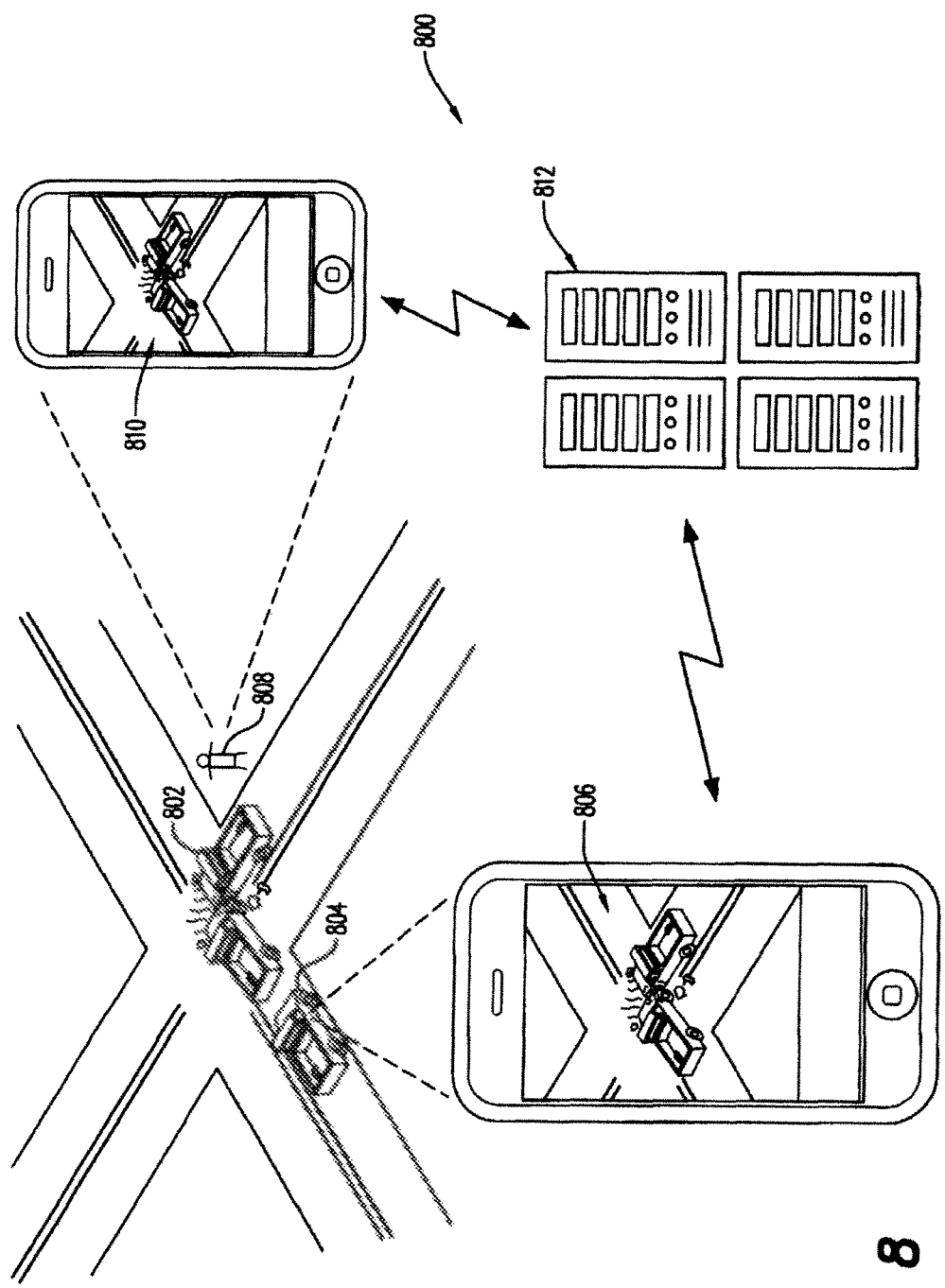
FIG. 8 is a block diagram depicting an accident verification system pursuant to some embodiments.

Reference is now made to FIG. 8 where one embodiment of an accident verification system 800 is shown. As depicted, the accident verification system 800 includes a number of components interacting to allow users of mobile devices 806 and 810 to operate an accident verification application to capture accident or event details. In the system of FIG. 8, two users of mobile devices 500 have installed an accident verification application pursuant to the present invention and are at the scene of a car accident (and may be the insured of one of the vehicles in the accident). One user 808 is standing near the scene and captures one view of the accident by taking a photo or video from her perspective of the accident. The image (and other details, including geocoded data) are transmitted to an insurance system 812 for further processing. Another operator 804 is a passenger in a vehicle just behind the scene and captures a second view of the accident by taking a photo or vide from his perspective of the accident. Again, the data is transmitted to the insurance system 812 for processing.

The insurance system 812 may use the data to verify details of the accident, process claims, or otherwise handle claims arising from the accident. Further examples of some embodiments of such claim or accident reporting using a mobile device 500 are provided below in conjunction with a description of FIG. 12.

Pursuant to some embodiments, an application may be stored in, or accessible to, memory 508 of mobile device 500 which allows a user of mobile device 500 to download and install an application which may be used to alert or notify the user of dangerous areas or areas which have higher than normal risks of accidents or injury. In some embodiments, the application installed on the mobile device 500 interacts with data from an insurance system 102 over a network interface (such as the network of FIG. 2). As a user moves around (e.g., by driving in a car, or by walking, etc.), the application sends updates of the user's location to the insurance system 102. The insurance system 102 uses the location data to compare the user's location (and, for example, the user's trajectory or path) to identify nearby areas that have higher than average accident or injury claims (as scored by the scoring engine 104 of FIG. 1). This accident and injury data may be generated by map snapping or by geocoding historical accident and injury data as described above in conjunction with FIG. 1.

If the user's trajectory or path is likely to take the user to an area of high risk, a notice or warning may be provided. For example, a voice prompt may be generated if the user is driving toward an intersection that has a very high number of accidents stating "Careful, the intersection of Oak and Main is dangerous, please use caution when going through the intersection." Other types of notifications may also be provided (and may, in some embodiments, be configured or specified by the user).

In some embodiments, the application may be used to construct a route plan, with a risk rating for each of several alternative routes so that a user may select the lower-risk of alternative routes (e.g., as shown in the illustrative map of FIG. 4B). In some embodiments, a route risk score may be generated allowing the user to select the more desirable route.

Figure 9:
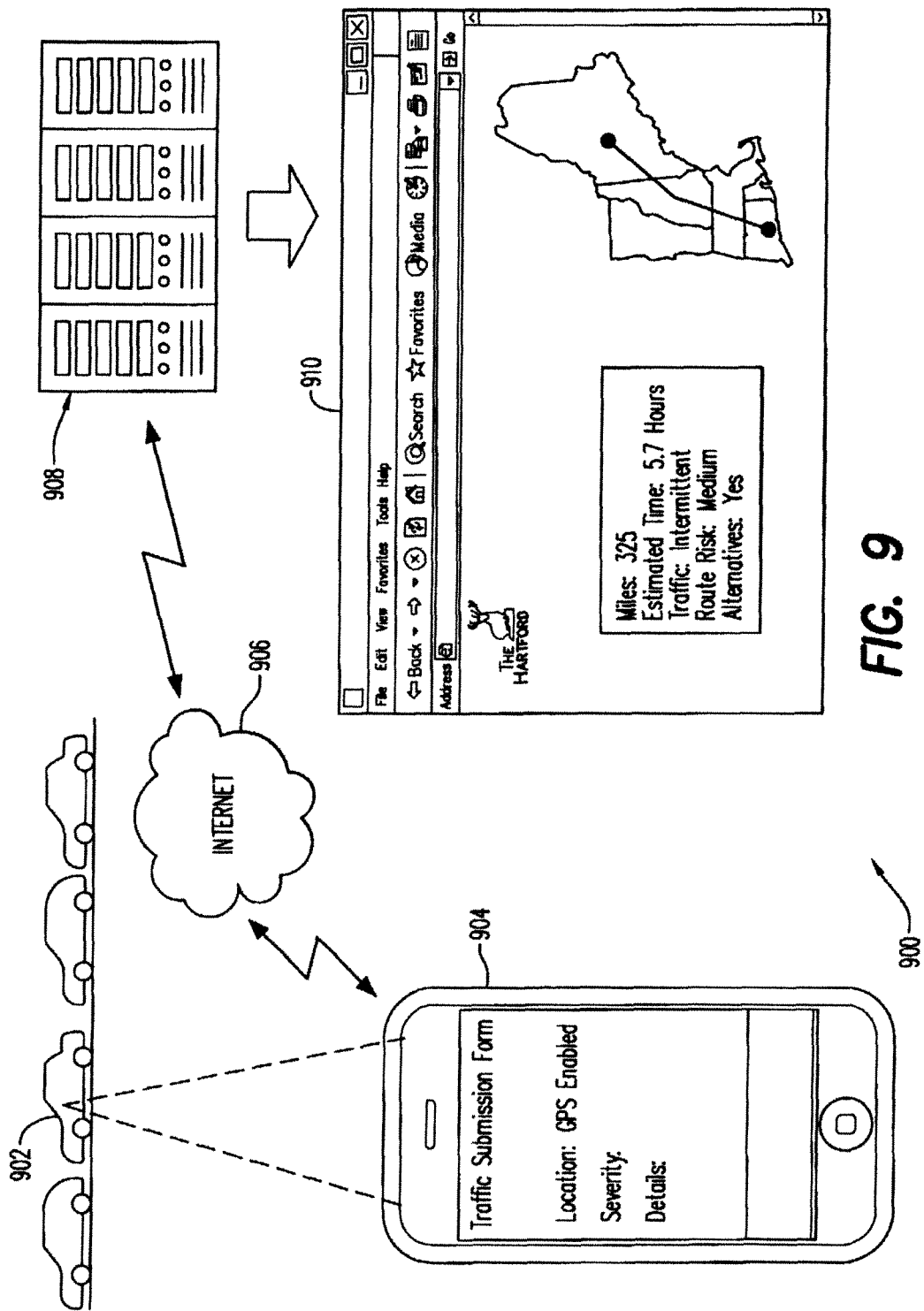
FIG. 9 is a block diagram depicting a route selection system pursuant to some embodiments.

Reference is now made to FIG. 9 where a system 900 is shown in which a user 902 is operating a mobile device 904 on which an insurance application pursuant to the present invention is installed. The user 902 is the operator or a passenger in a vehicle stuck in a traffic jam and operates the application to submit details of the traffic situation (including a geolocation of the traffic jam and a severity of the jam as well as other relevant details). The information is transmitted from the mobile device 904 to an insurance or other processing system 908 via a network 906. The processing system 908 aggregates data from a plurality of different users to create a report of the danger area or traffic situation that can be viewed (or otherwise received) by other users.

Pursuant to some embodiments, an application may be stored in, or accessible to, memory 508 of mobile device 500 which allows a user of mobile device 500 to track a user's driving patterns to provide insurance coverage and pricing based on the user's actual behavior. For example, currently, a driver in Kansas who claims to drive 10,000 miles a year will pay less for insurance than a similarly-aged driver in New York City who also claims to drive 10,000 miles a year. However, it may turn out that the driver in Kansas should pay more if the driver engages in higher risk driving patterns than the New York driver. Pursuant to some embodiments, drivers may download an application and install it on their mobile device 500 so that their driving patterns may be tracked or monitored. In some embodiments, drivers who participate may receive premium discounts or other incentives to participate.

Pursuant to some embodiments, a driver who has downloaded and installed the insurance application on a mobile device 500 will be prompted to register the application with the insurer. Once registered, in some embodiments, the mobile device 500 may be configured to recognize when the driver is in his or her insured vehicle (e.g., by synching with a blue tooth device of the car, by scanning a bar code, RFID code, or other tag associated with the vehicle, etc.). Once registered and configured, the driver may use the mobile device 500 to track his or her driving patterns. In some embodiments, a weekly or monthly sample may be taken to track how and where the driver operates the vehicle to determine if insurance coverage can be granted or modified. In this manner, operators may qualify for improved insurance terms and insurers may more appropriately cover insureds.

Figure 10:
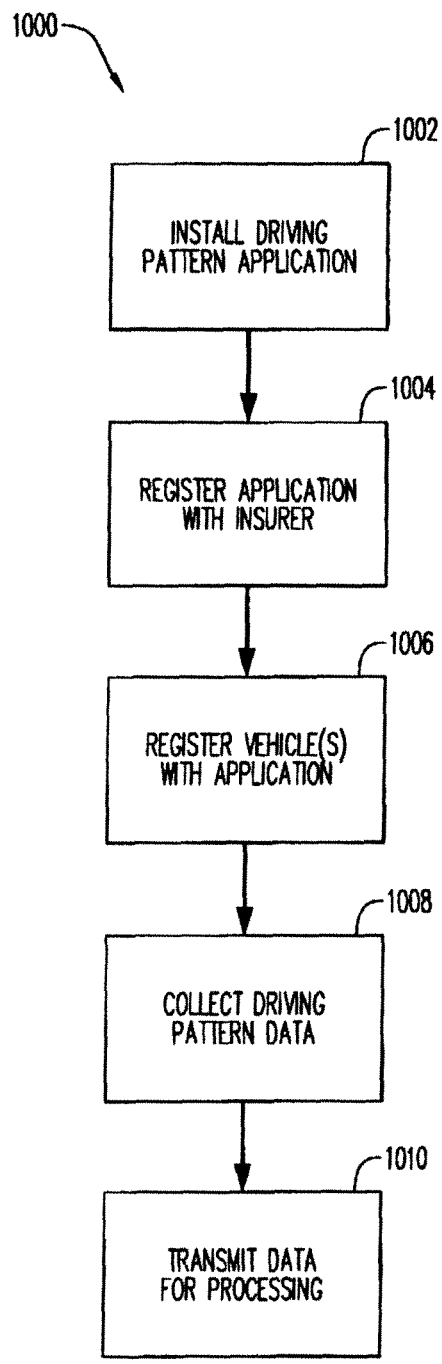
FIG. 10 is a flow diagram depicting a process for collecting and processing driving pattern data pursuant to some embodiments.

Reference is now made to FIG. 10 where a process 1000 is shown for installing and using a driving pattern application pursuant to some embodiments. Process 1000 may be performed using a mobile device such as the mobile device 500 described above. As shown, processing begins at 1002 where a user of a mobile device 500 downloads and installs the driving pattern application. This download and install may be performed from the mobile device 500 or from a desktop computer in communication with the mobile device 500. The application may be downloaded from the insurance processing system 102 or from an application marketplace. In some embodiments, the application may be installed at the request of an insurer, or as an option provided by an insurer so the user may qualify for reduced rates or as part of an underwriting process performed by an insurer.

Processing continues at 1004 where the user interacts with the application to register the application with their insurer (e.g., by providing a policy number or the like). Processing continue at 1006 where the vehicle(s) to be monitored are registered with the application (e.g., by synching the application and the mobile device with a Bluetooth system of the vehicle, by reading an RFID tag installed in the vehicle or the like).

Processing continues at 1008 where the application is operated to collect driving pattern data. The application may be triggered once the vehicle moves or when activated by the user. Location data may be collected while the vehicle is in operation to track data such as a vehicle's route, speed, driving characteristics, or the like.

Processing continues at 1010 where the application causes the driving pattern data to be transmitted to an insurance processing system for further processing (e.g., such as for underwriting, risk analysis or other processing such as that described below in conjunction with FIGS. 13-19).

Pursuant to some embodiments, an application may be stored in, or accessible to, memory 508 of mobile device 500 which allows a user of mobile device 500 to interact with the application to transmit data and information about an accident, injury or loss to an insurance system 102. For example, in some embodiments, a user may activate an insurance application when an accident, injury or loss occurs, and for which insurance coverage may be sought. The insurance application prompts the user to provide detailed information about the event (which may vary based on the type of event). In some embodiments, the insurance application prompts the user to take one or more photos or videos associated with the accident, injury or loss to prove the extent of damage or loss. The data collected by the application is transmitted over a network to an insurance system 102 for further analysis. In some embodiments, the data is geotagged so that the insurer can identify the exact location and time of the claim. In this manner, insurers can more quickly act on claims, and can avoid or reduce the number of fraudulent claims submitted. In some embodiments, fraudulent claims can further be reduced by determining if a mobile device is in one location, but the alleged incident relating to a claim is at a second location.

Figure 11:
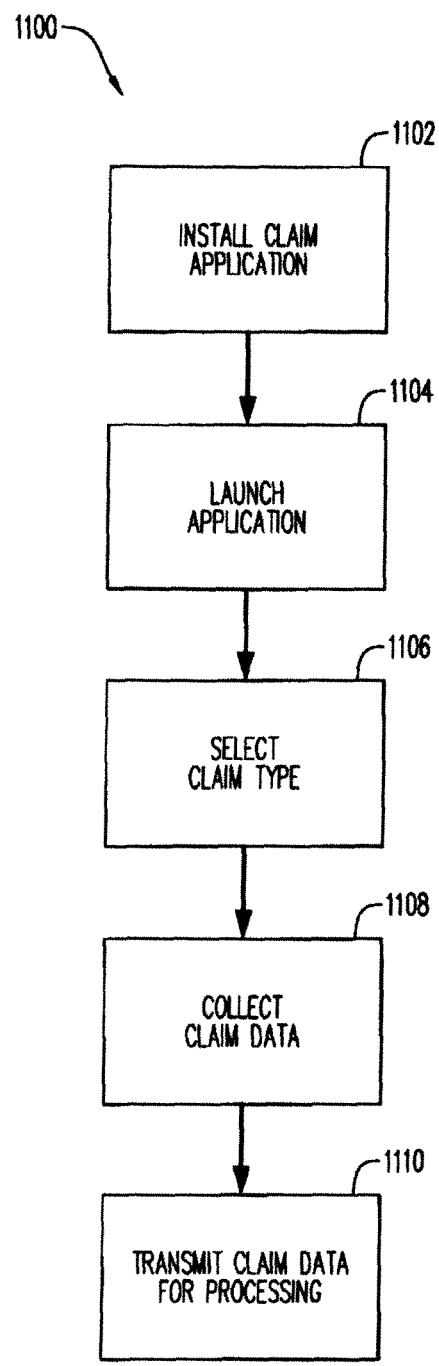
FIG. 11 is a flow diagram depicting a process for collecting and processing claim proof data pursuant to some embodiments.

Reference is now made to FIG. 11 where a claim proof and processing method 1100 is shown which may be performed using a mobile device such as a mobile device 500. Process 1100 may be performed using a mobile device such as the mobile device. As shown, processing begins at 1102 where a user of a mobile device 500 downloads and installs the claim proof application. This download and install may be performed from the mobile device 500 or from a desktop computer in communication with the mobile device 500. The application may be downloaded from the insurance system 102 or from an application marketplace. In some embodiments, the application may be installed at the request of an insurer, or as an option provided by an insurer so the user may qualify for more efficient claim processing as a result of the data collected by the user.

Processing continues at 1104 where the user launches the claim proof application (e.g., once a loss or event has occurred). Processing continues at 1106 where the user selects a claim type (e.g., such as an auto accident, a theft, an injury or the like). Processing continues at 1108 where the user, interacting with the application and using features of the mobile device (such as a voice recorder, camera, geo-location data, etc) collects claim data. For example, if the claim type is an auto accident, the user may be prompted to take one or more photos of any auto damage, as well as to enter data identifying the extent of the loss and circumstances surrounding the loss. Once sufficient data has been collected, processing continues at 1110 where the claim data is transmitted to an insurer system (such as system 102 of FIG. 1) for processing. Insurance processing may include processing as described below in conjunction with FIGS. 13-19.

Figure 12A:
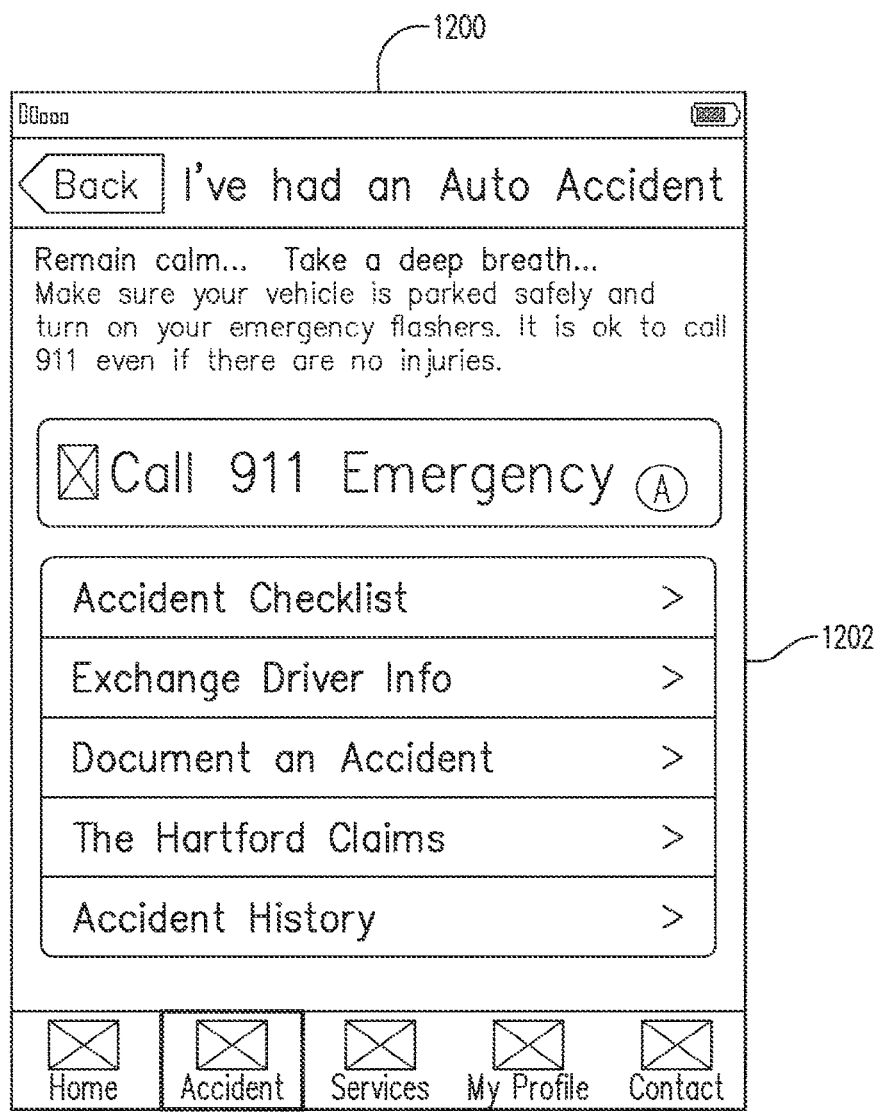

Reference is now made to FIGS. 12A-J, where a number of illustrative user interfaces depicting insurance application processing (e.g., as described in conjunction with FIGS. 7, 8 and 11) are provided. The user interfaces of FIGS. 12A-J may be displayed, for example, on a display device of a mobile device such as the device 500 of FIG. 5. A number of other user interfaces may be provided to allow user interaction with any of the flows or processes described herein, and the user interfaces of FIG. 12 are provided for illustration only. The user interfaces of FIGS. 12A-J depict an example series of interfaces that may be provided to a user who has had an accident. FIG. 12A shows a user interface 1200 that may be presented to a user who launches a mobile application pursuant to some embodiments and selects the option "I've Had an Auto Accident". The user interface 1200 includes a series of options or steps that the user may walk through in order to properly handle and report a claim associated with the accident.

Figure 12B:
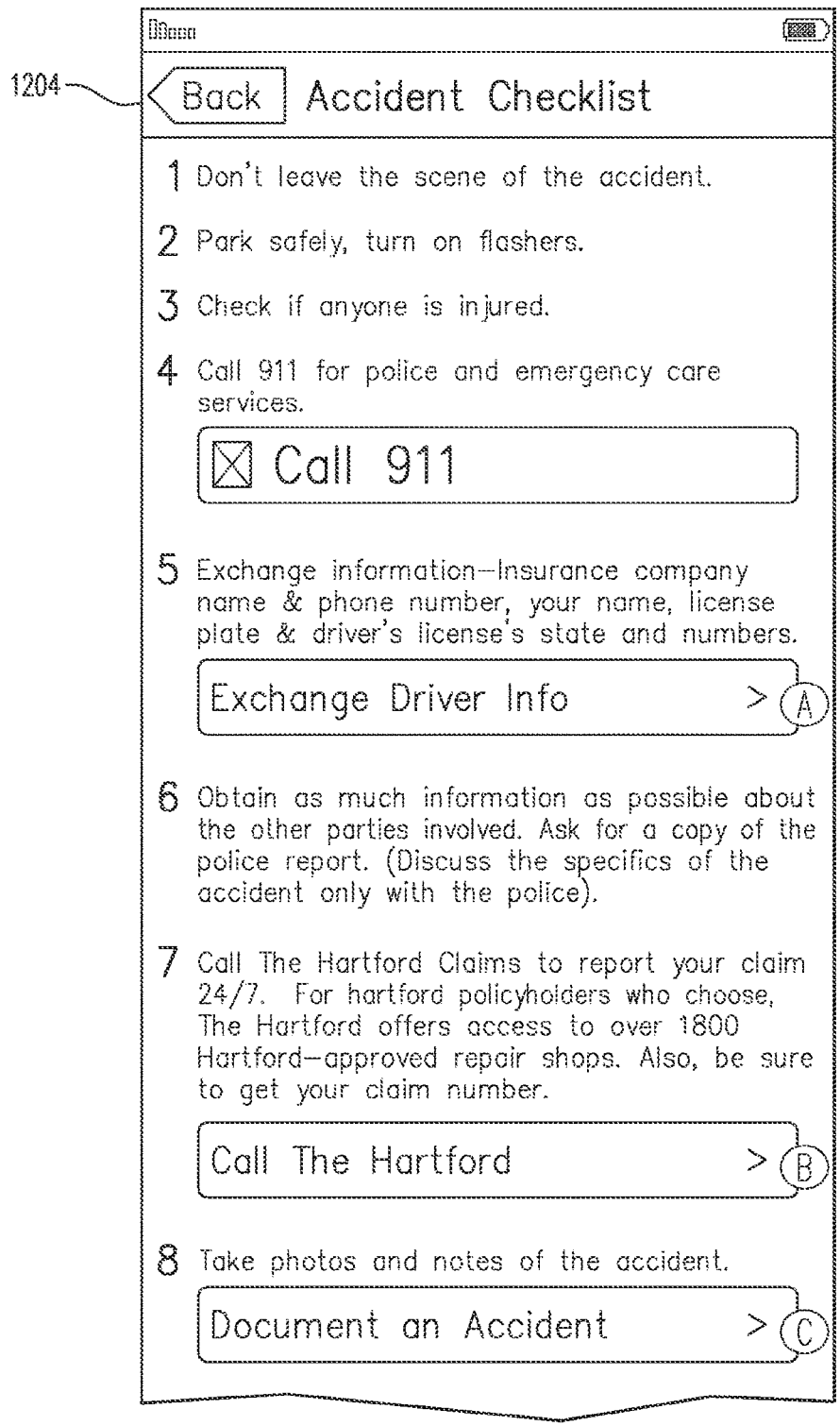
Figure 12E:
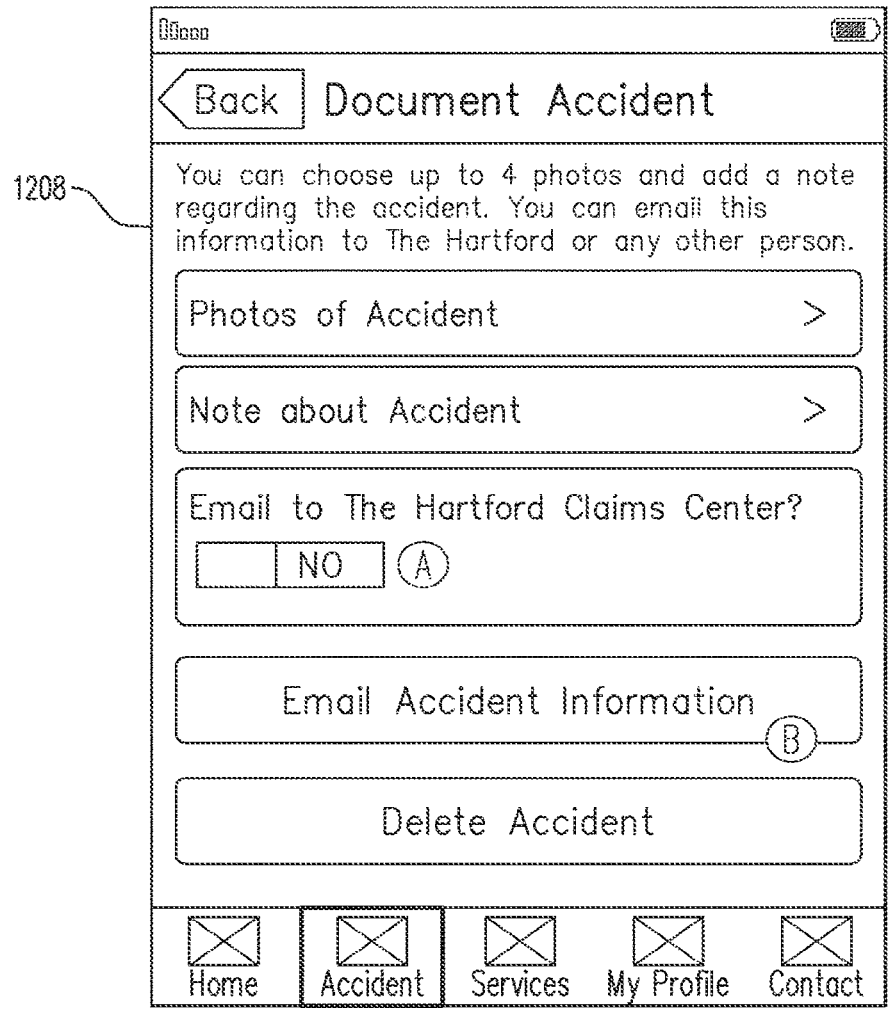
Figure 12G:
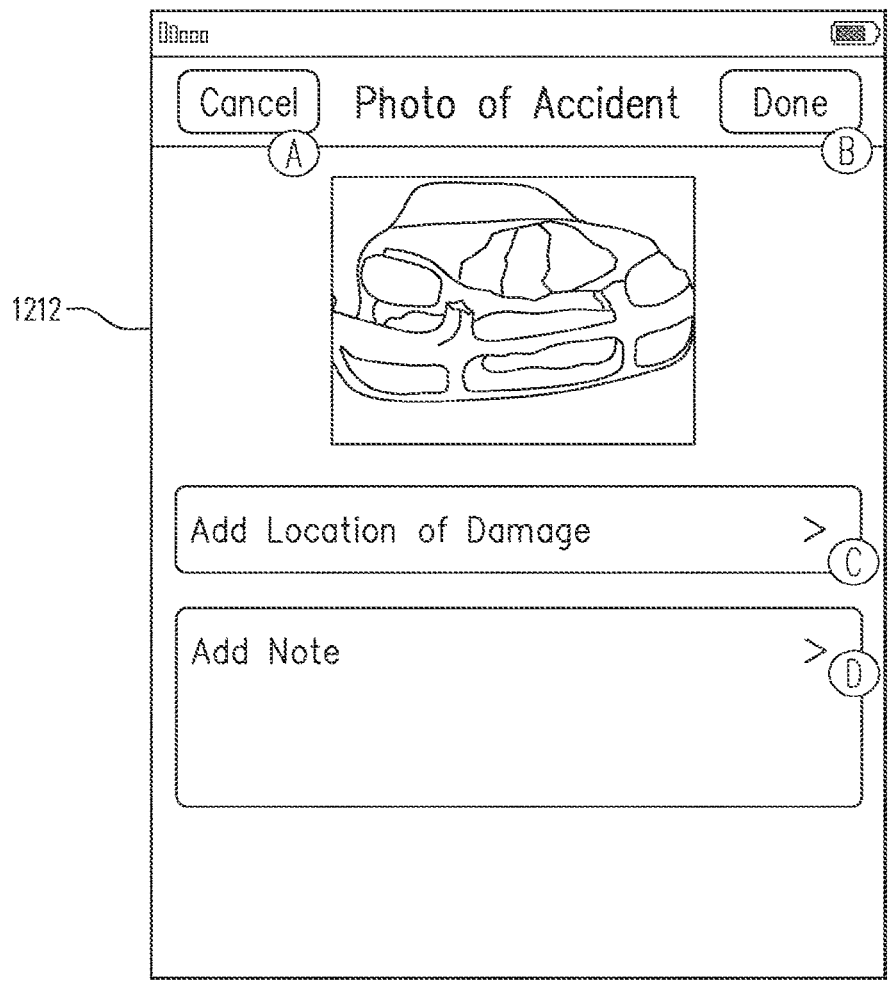
Figure 12H:
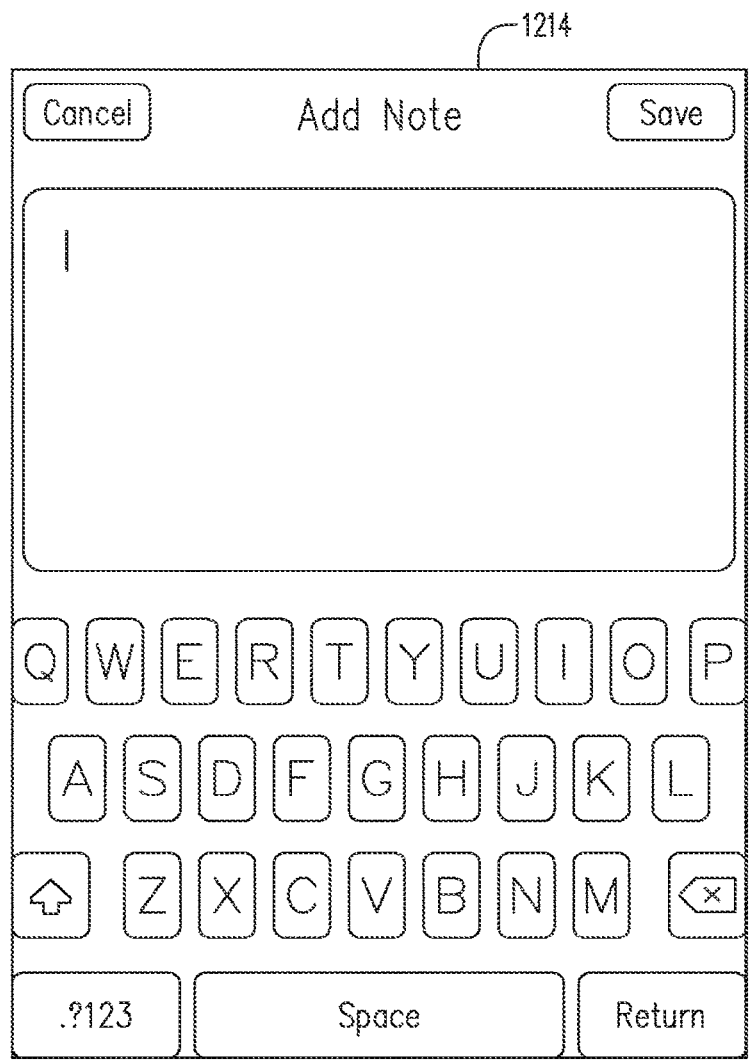
Figure 12I:
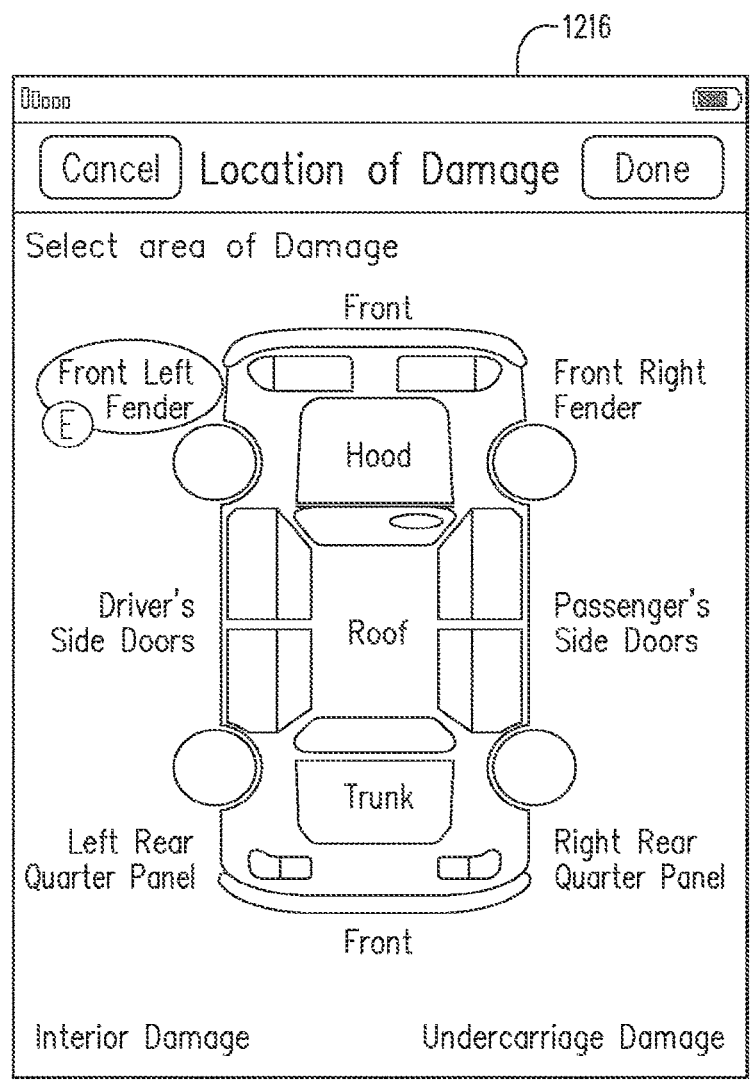
Figure 12J:
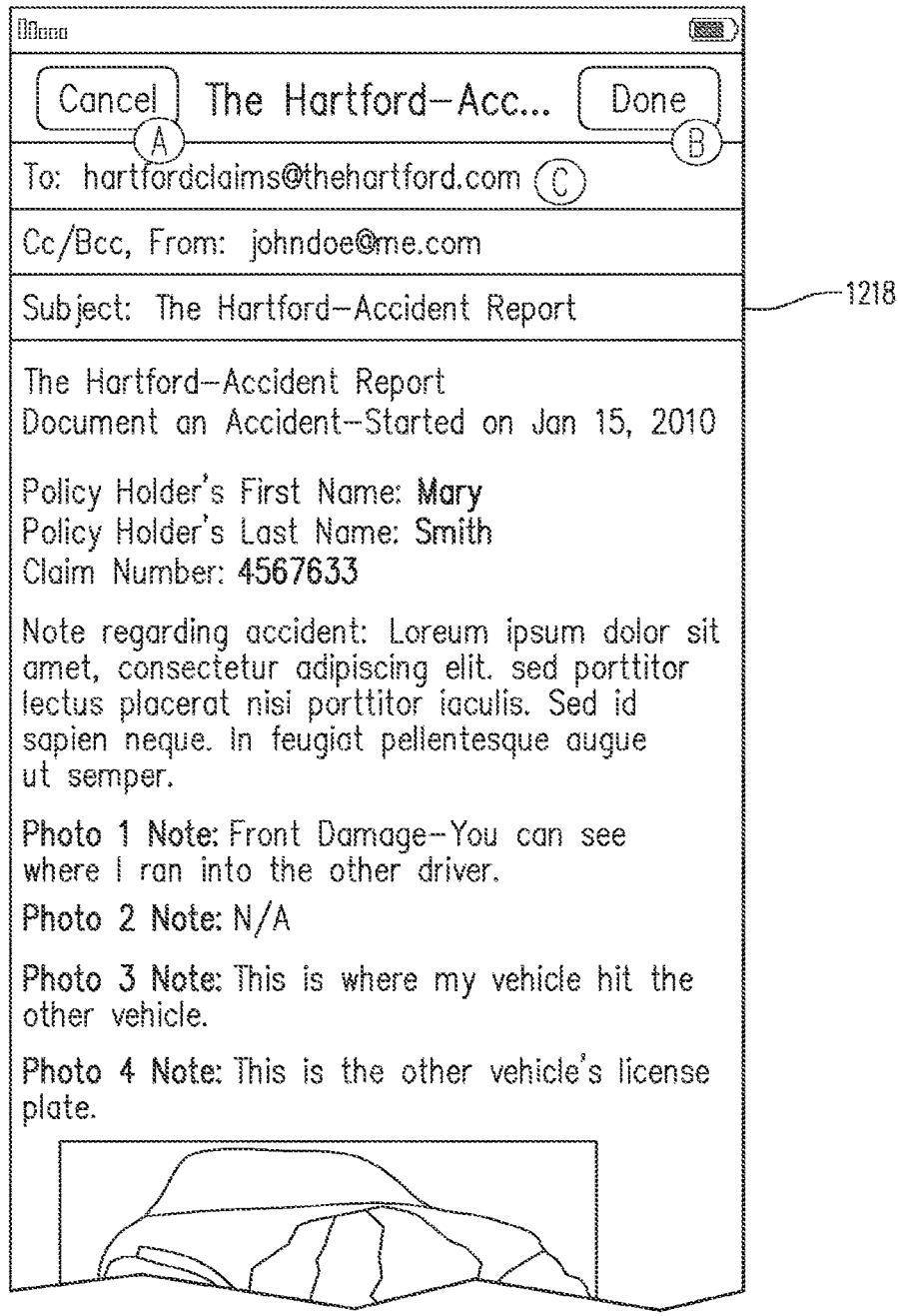

FIG. 12B depicts a user interface 1204 presenting an accident checklist that may be presented to the user so the user properly reports and handles the accident reporting. FIGS. 12C-D depict a user interface 1206 that is displayed in response to the user selecting the option of "Exchange Driver Info" and provides tips and instructions on what data to collect from the other driver. Some data may be prepopulated for the user to speed data collection. FIG. 12E depicts a user interface 1208 that prompts the user to provide information to document the accident, including taking photos and providing notes and details regarding the accident. FIG. 12F depicts a user interface 1210 that allows the user to select an option to email details of the accident to the insurance company. In some embodiments, the details may be wirelessly and automatically transmitted to the insurance company. FIG. 12G depicts a user interface 1212 that shows a photo taken by the mobile device which has been selected as representing the accident damage and location. A user may enter a note about the damage in a user interface 1214 (FIG. 12H) and may also indicate the location of the damage on the vehicle in a user interface 1216 (FIG. 12I). The full details entered by the user (including, in some embodiments, geocoded location and time data) may be transmitted to the insurance provider (e.g., as depicted in FIG. 12J as an email message transmitted to the insurer). Those skilled in the art will appreciate that other data entry, data configuration, and data collection screens may be provided to facilitate the collection and reporting of claim data.

Each of the mobile applications described herein may be in communication with one or more insurance processing systems such as the system 102 of FIG. 1. In addition to providing loss risk data as described above (e.g., in conjunction with route planning or the like), the systems may further operate or interact with data from the mobile applications to perform insurance policy underwriting, pricing, claim processing, policy renewal, risk analysis or the like. Features of some embodiments of insurance processing systems and environments will now be provided by reference to FIGS. 13-19. Each or any of the applications described above may provide data to, or receive data from, one or more of the insurance processing systems described below.

Figure 13:
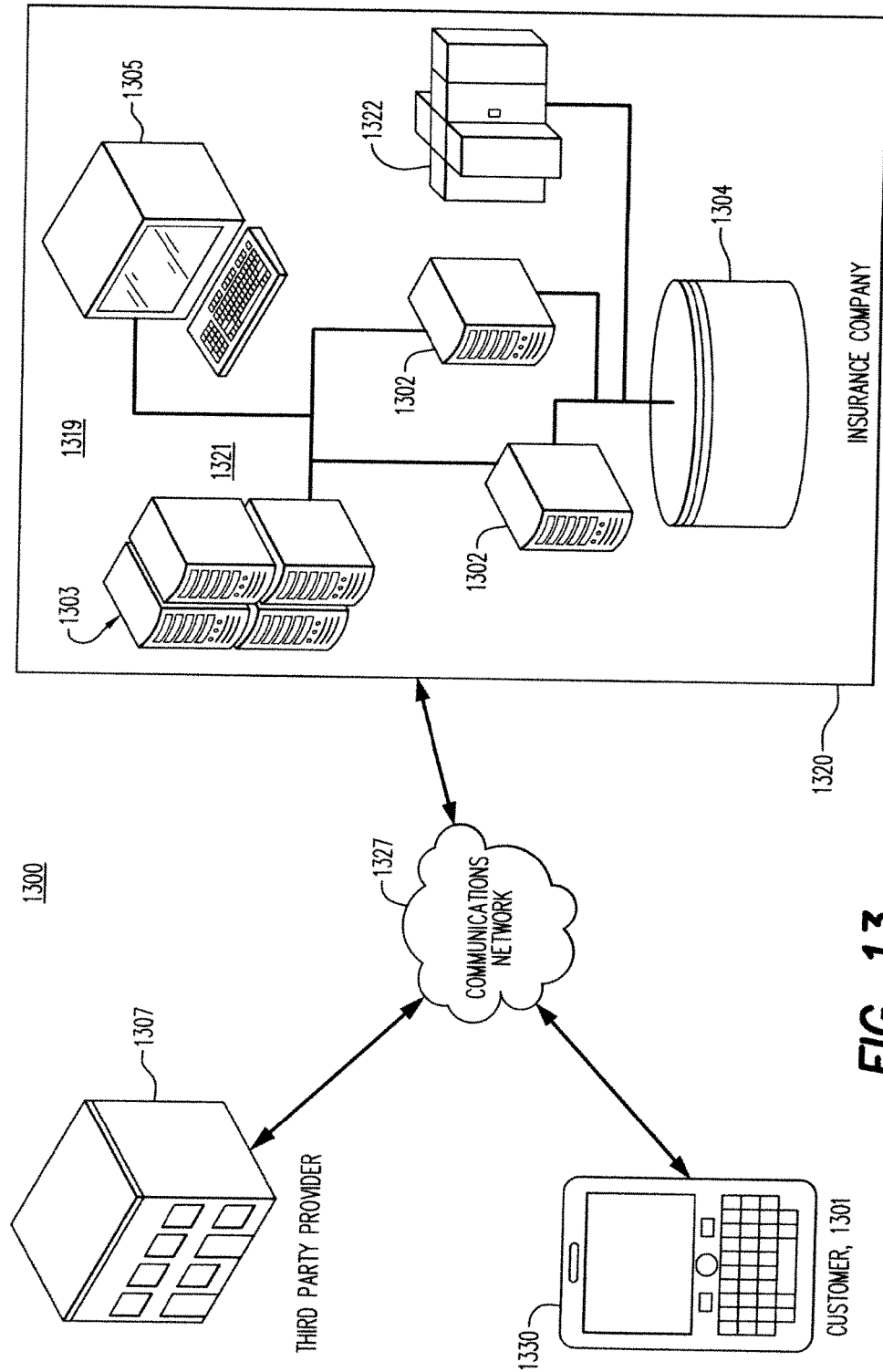
FIG. 13 is a block diagram of an insurance system pursuant to some embodiments.

FIG. 13 is a schematic diagram of a system 1300 for monitoring, evaluating, and providing feedback on insurance. In FIG. 13, insurance company 1320 provides customer 1301 with insurance coverage. The type of insurance provided by insurance company 1320 may be any type of insurance, such as general liability insurance, although the present invention is described primarily in terms of automobile insurance. Insurance company 1320 can simultaneously provide services to multiple customers, although only one customer 1301 is shown in FIG. 13 for clarity.

Mobile device 1330, pursuant to some embodiments, stores an application program that may be loaded onto the mobile device 1330 from an insurance company 1320 or from an application repository (e.g., such as Apple's App Store or the like). The application, when launched, prompts the customer 1301 from information used to interact with the insurance company 1320. A variety of different types of data and information may be provided from mobile device 1330 to insurance company 1320, including static data regarding the customer 1301, such as the customer's name, address, contact information, age, height, weight, policy information, etc. Other variable information may be provided (as described in each of the mobile application embodiments described above).

The data from mobile device 1330 is transmitted via communications network 1327 to insurance company 1320 for evaluation and processing. Third party provider 1307 can also be a source of information associated with customers and policies.

Insurance company 1320 has a computer system 1319 that includes application servers 1302, load balancing proxy servers 1303, data storage unit 1304, business logic computer 1322, and user interface module 1305 to perform risk evaluation and underwriting based on the collected data. Employees of the insurance company 1320 and other authorized personnel use user interface module 1305 to access the insurance company computer system. User interface module 1305 may be any type of computing device that is configured to communicate with other computer systems. User interface module 1305 may be connected directly to application server 1302, or may access an application server 1302 via the load balancing proxy servers 1303. User interface module 1305 may connect to load balancing proxy servers 1303 via a local area network, a private data link, or via the internet. Although depicted as being part of insurance company 1320 in FIG. 13, user interface module 1305 may be located remotely. The business logic computer 1322 is connected to the data storage unit 1304 and application servers 1302 over a local area network 1321, which may be part of communication system 1327. In addition, other network infrastructure, including, for example a firewall, backup servers, and back up data stores, may also be included in the system 1319, without departing from the scope of the invention. Communications over the local area network 1321 and/or over the Internet, in one implementation, may be encrypted. In addition, such communications, whether encrypted or not, may also be digitally signed for authenticating the source of the communications. The computer system 1319 may also include a certificate authority to authenticate one or more of the communications using public key infrastructure.

Based on data collected from the mobile device 1330 and any third party data sources, an evaluation module analyzes and evaluates data associated with a customer 1301. As used herein, a "module" may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In addition, entire modules, or portions thereof, may also be implemented in programmable hardware devices such as field programmable gate arrays, programmable array logic, programmable logic devices or the like or as hardwired integrated circuits.

A business logic module, implemented preferably in business logic computer 1322, is used to underwrite or alter insurance pricing for customer 1301 based on the received data. The business logic module may use predictive models, such as neural networks, Bayesian networks, and support vector machines, in performing the underwriting and premium adjustment. In one embodiment, the premium of an insurance policy is increased or decreased if data received from customer 1301 warrants. Instead of altering premium rates, other terms of the insurance policy can be altered, such as the policy deductible. In some embodiments, the premiums may be increased or decreased based on driving pattern data collected using the mobile device 1330 as described above in conjunction with FIG. 10. Further still, rates may depend on one or more loss risk scores calculated by the scoring engine 104 described in conjunction with FIG. 1.

In another scenario, insurance company 1320 awards customer 1301 with premium discounts, or other advantageous rewards, simply for operating certain mobile insurance applications as described above. Insurance company 1320 may award different discounts depending on the nature and amount of data provided by customer.

In one implementation, software operating on the application servers 1302 act merely as presentation and data extraction and conversion servers. All substantive business logic, including underwriting and pricing determinations, is carried out on the business logic computer 1322. In this implementation, the application servers 1302 obtain data from the data storage unit 1304 and the business logic computer 1322 and incorporate that data into web pages (or other graphical user interface formats). These web pages are then communicated by the application servers 1302 through the load balancing proxy servers 1303 to user interface module 1305 for presentation. Upon receiving input from user interface module 1305, the application server 1302 translates the input into a form suitable for processing by the business logic computer 1322 and for storage by the data storage unit 1304. In this implementation, the application servers can be operated by third parties, who can add their own branding to the web pages or add other customized presentation data. In the alternative, at least some of the business logic is also carried out by the application servers 1302. Application servers 1302 may also include a webserver for automatically recovering or retrieving data from local computer 1333.

In another implementation, the application servers 1302 are software modules operating on one or more computers. One of the computers on which the application servers 1302 are operating may also serve as the business logic computer 1322 and/or as a load balancing proxy server 1303.

In other implementations, the software operating on user interface module 1305 includes a thin or thick client application in addition to, or instead of web browser. The thin or thick client application interfaces with a corresponding server application operating on the application server 1302.

Figure 14:
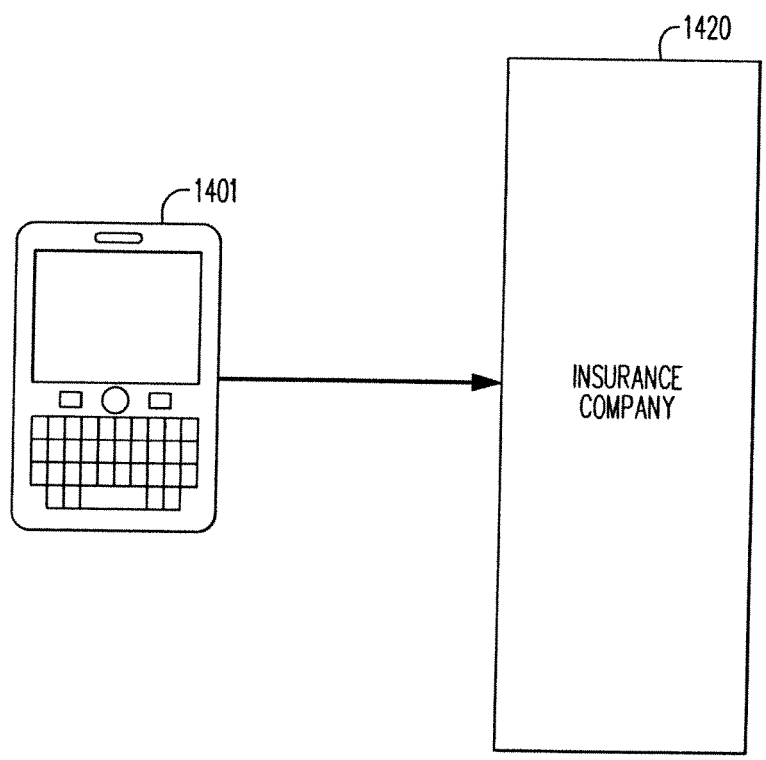
FIG. 14 is a block diagram of an insurance system receiving mobile device data pursuant to some embodiments.

FIG. 14 is a schematic diagram of an illustrative customer monitoring and evaluation system where a customer (operating a mobile device 1401) is insured by insurance company 1420. As customer 1401 operates and provides data using a mobile application (as described above) the mobile device transmits transmit data to the insurance company 1420.

The insurance company may perform, for example, a premium analysis which includes activities that potentially affect a customer's premium, deductible amount, discounts or credits, as well as large scale analysis to provide input into industry or occupation experience factors. The determination of premium and offering of discounts or credits may be performed once at underwriting time, regularly on an interval, continuously, in response to an event, or retroactively, as permitted by local, state, and/or federal regulations.

The analysis and decisions made by insurance company 1420 with regard to premium/service adjustments may be transmitted back to customer via the mobile device 1401. Insurance company 1420 may save the data and reports received from customer 1401, and the decisions that were made based upon them, in a data storage unit associated with the insurance company 1420 or in a separate data warehouse. This archived data may be used for future retrospective analysis, claims adjudication, and/or to support fraud investigation.

Figure 15:
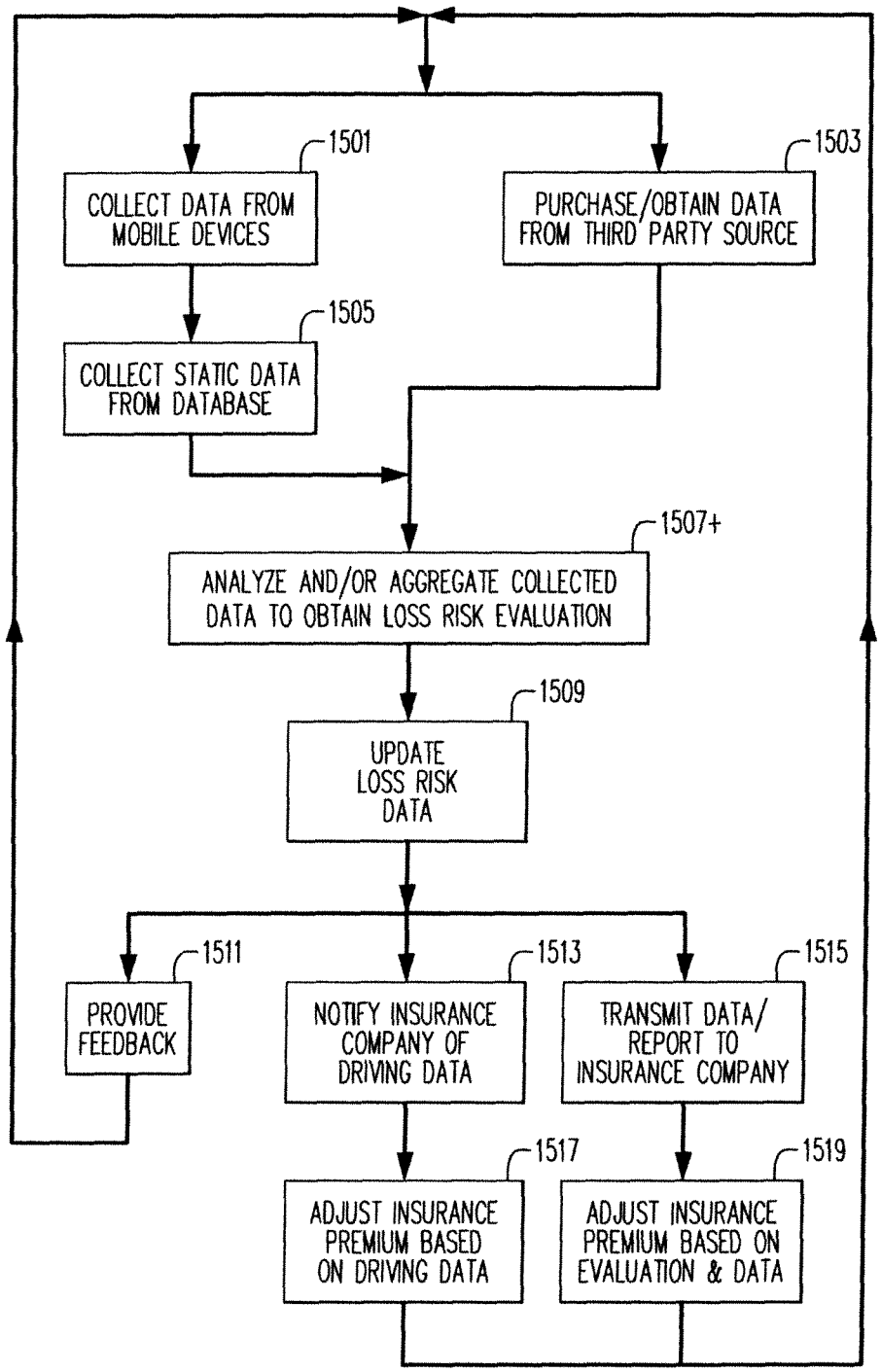
FIG. 15 is a flow diagram depicting a process for evaluating mobile device data pursuant to some embodiments.

FIG. 15 is a flow chart of exemplary steps in a method for evaluating data received from a mobile device operating one or more insurance applications as described above. For example, in embodiments where a mobile device is configured to collect driving pattern data associated with a user, the data may be collected, transmitted and used to evaluate insurance premiums and policy adjustments using the method of FIG. 15.

The method of FIG. 15 begins at 1501 by collecting data from mobile devices associated with an insured customer (or, in some embodiments, associated with a prospective insured customer). The data may include driving pattern data including speed, areas of operation, mileage traveled, time of operation, or other data collected by mobile computing devices as described above. The data may be transmitted to an insurance system for processing via wireless or cellular communication protocols. In some embodiments, the data may be transmitted automatically under control of a mobile application installed or operated on a mobile device associated with the customer.

In addition to mobile device data, static data may be collected at 1505. Static data may include personal information associated with a customer, such as their medical history, level of physical fitness, etc. In addition to or instead of collecting data from mobile devices and local static data servers, data may also be purchased or obtained from a third party at 1503. The purchased data may be used to supplement the mobile device data or may be used to validate or debug the system.

The data is analyzed, processed, and aggregated at 1507. The aggregated data may be generated into reports, which can then be provided to interested parties (at 1511 below). Data processing may include applying algorithms to the collected data, which may be in its raw form, to obtain values of interest. For example, raw sensor data may be noise filtered. In response to insured customer providing the data about their driving patterns or other driving related information, the insurance company can favorably alter the terms of the insurance policy, such as decreasing the premium or deductible.

At 1513, the insured customer provides the driving pattern data to the insurance company. In some embodiments, simply based on the customer's willingness to provide the data, and without receiving the actual data, the insurance company may grant discounts to the insured at 1517. In deciding to alter the terms of the insurance policy, the insurance company, or the third party evaluator, may compare the mobile device data, as determined from the mobile device, of the insured to a comparative baseline. The process of FIG. 15 may be repeated on a regular basis, and a similar process may be applied for a plurality of insured customers. In some embodiments, the process may be used to price and issue policies for new customers as well.

Reference is now made to FIG. 16 which is a high level flow chart of a method carried out by the system of FIG. 13 in processing requests for insurance. The method begins at 1602 with the receipt of a request to insure a driver. As described above, the request may be received by an insurance company 1320 from a mobile device 1330 (such as the mobile device 500 described in conjunction with FIGS. 5 and 6) or an agent/employee terminal. The system then requests and obtains information about the customer and the vehicle to be insured at 1604. The information is obtained in part through requests posed to the customer or insurance agent or employee assisting the customer. Additional information is obtained through the third party data vendors 1307 and from the central database 1304. Pursuant to some embodiments, many of the questions posed to the customer are presented to the consumer by an application on the mobile device which is provided by the insurance company.

In some situations, a prospective insured customer may be required to agree to provide driving pattern data associated with the customer's driving patterns in order to qualify for a policy (or to qualify for good driver discounts, etc). Insurance products that incorporate the use of collected driving pattern data in pricing and underwriting enable insurance companies to insure customers that might otherwise be outside of their appetite. That is, the risks presented by insuring a particular customer or vehicle operated by the customer may be too large for an insurance company to accept unless it is actively able to monitor the operation of a vehicle or driving characteristics of a customer. Thus, in one embodiment, after obtaining basic information about the vehicle and customer at 1604, the system 1320 determines whether driving pattern data is needed for making a final insurability decision at 1606. The system may determine that driving pattern data is unnecessary, for example, if the insurer determines that no amount of driving pattern data will bring the requested policy within the appetite of the insurance company, resulting in the request for being denied at 1616.

Insurance products using collected driving pattern data for adjusting premiums may also be used to reward customers that use, operate and maintain insured property safely. Thus, in some circumstances, collection of driving pattern data is not necessary, but instead is merely an option provided to customers that may lead to lower premiums. In such situations, the decision at 1606 may be skipped, and the method proceeds directly from the receipt of basic customer and vehicle information (at 1604) to determining whether driving pattern data is available (at 1608). Driving pattern data may be provided via a mobile device such as the mobile device 500 described above.

If at determination at 1608 indicates that existing driving pattern data is not available the insurance company, in one embodiment, may offer the customer insurance during a probationary period (at 1610) during which the insurance company can obtain baseline driving pattern data (at 1612) on which it can base its underwriting and pricing decision. Depending on the characteristics of the insured vehicle, the customer, and/or the data collected during the probationary period, the probationary period may vary in length, for example, from about one to about three months. For example, if the driving pattern data in a first month exhibits a great deal of variability, the period may be extended. The driving pattern data can include a number of parameters depending on the type of property to be insured. For example, for vehicles, the monitored parameters can include speed, acceleration, braking, turning speed, blinker usage, driving time of day, mileage, driving location, seat belt usage, and number of passengers. Raw vehicle operation data can be combined with location data to determine relevant speed limits, presence of stop signs, and other relevant location-based traffic laws, and a driver's adherence thereto. Other useful specific information may be derived from collected location data, including, for example, traffic patterns, road quality, incline and decline grades, crime rates, weather conditions and patterns, and accident rates. The parameters can also include data indicating the condition of the vehicle, including, without limitation, oil level, tire pressure, engine temperature, brake condition, fuel level, and the status of warning light indicators. The monitored parameters may also include activity levels associated with the vehicles, including, for example, how often items (e.g., radio, speed control, headlights, or alarm systems) within the vehicle are used as well occupancy and usage rates for the vehicle. The premium offered by the insurance company during the probationary period is likely higher than the premium that would be paid during a non-probationary coverage period, unless the data collected during the probationary period suggests the risks of issuing a non-provisional policy are substantially higher than expected based on the non-driving pattern related information collected prior to the probationary policy.

The insurance company 1320 then analyzes the driving pattern data made available at 1608 or collected at 1612 (at 1614). The exact analysis process, as described further below, is determined dynamically based on the driving pattern data collected, information about the customer, and/or information about the vehicle being insured. For example, the analysis may take into account different monitored parameters or take into account the same parameters to different extents. Preferably, the analysis is carried out using one or more predictive models, such as statistical models, neural networks, expert systems, or other forms of artificial intelligence.

Based on the analysis carried out at 1614, the insurance company 1320 decides whether to offer insurance to the customer under the terms requested by the customer (at 1616), and if so, calculates a premium for such a policy (at 1618). The premium may be calculated holistically for an entire policy, or separately for each coverage (e.g., collision, comprehensive, medical, uninsured motorist, physical damage, bodily injury, rental, and/or towing) requested in the policy. In one embodiment, the analysis of collected data at 1614, the decision to offer or deny insurance at 1616, and the determination of a premium at 1618 constitute a single process carried out by the computing systems of the insurance company 1320. In alternative implementations, the underwriting decision and the pricing calculation are carried out separately in series.

After determining a premium for the policy at 1618, the system forwards an offer for insurance to the mobile device 1330 or employee/agent terminal 1305 (at 1620). If the customer rejects the offer (at 1622), for example, due to the premium being higher than desired, or if the insurance company 1320 declines to offer insurance (at 1616), the process ends. If the offer is accepted (at 1622), the insurance company issues an insurance policy covering the customer and the vehicle (at 1624). After the policy is issued, the insurance company 1320, either directly or through a monitoring service, may continue to monitor the output of the sensors associated with the mobile device 1330. Based on the results of the monitoring, the insurance company 1320 occasionally or periodically may adjust the premium charged to the customer. The premium change, if any, preferably uses the same artificial intelligence used to set the initial premium. The premium change may affect the premium charged in future periods, in prior periods, e.g., through issuance of a refund or surcharge, or in a current period, depending on the specific implementation of the method. Alternatively, the premium change may only affect the premium charged for a renewal policy after the expiration of the current policy term.

While others have suggested utilizing data collected from sensors monitoring vehicles for insurance underwriting and pricing, the prior methods have failed to adequately take into account the fact that sensor data is not equally relevant to all insurance customers and all property requested to be insured. The following illustrative underwriting and premium pricing processes demonstrate that such distinctions can be made to achieve a more accurate insurance determination. The following processes are one example of pricing and underwriting processes that may be used in conjunction with some embodiments (in part or in whole). Further, features of the risk scoring and pricing methods described above may be used in conjunction with the processes of FIGS. 17 and 18 to perform pricing, premium adjustment, and underwriting.

Figure 17A:
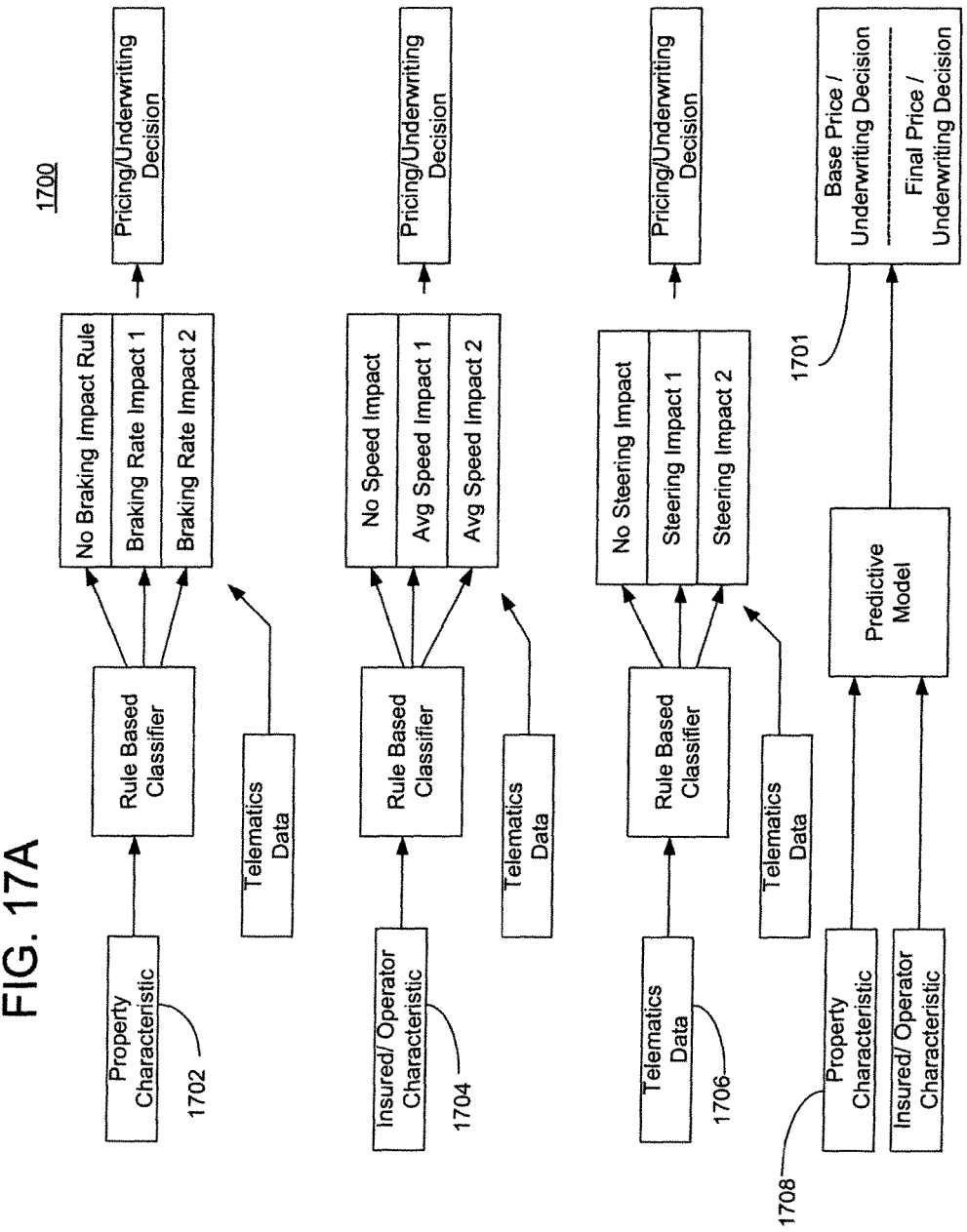
FIG. 17A is a diagram depicting a first underwriting and pricing process carried out by the system of FIG. 13 according to some embodiments.

FIG. 17A is a diagram depicting a first underwriting and pricing process 1700 carried out by the computer systems of the insurer 1320 of FIG. 13, according to an illustrative embodiment of the invention. The process 1700 generates an underwriting and a pricing decision 1701 for a request for personal lines auto insurance. The process 1700 is showed in simplified form for illustrative purposes. According to the process 1700, four separate underwriting and pricing determinations are made in independent process 1702, 1704, 1706, and 1708. The results of the four are combined to yield both a final underwriting decision and a final pricing decision 1701. Negative underwriting results from one process may be compensated for by positive underwriting results from other processes. Together, the processes determine which data parameters collected by sensors monitoring the vehicle are used in making the underwriting and pricing decisions and the weight each parameters plays in the decision making process.

The first process 1702 determines whether and to what extent a driver's braking behavior effects whether the vehicle should be insured, and at what cost. According to the process 1702, this determination is based on characteristics of the vehicle, for example, its size and its breaking system. Drivers with a habit of abrupt braking are at a greater risk of collisions resulting from a failure to stop. Larger vehicles require greater distances to stop and cause more damage upon impact. These factors, combined, make the risk associated with insuring larger vehicles with less efficient brakes greater than the risk associated with insuring smaller vehicles with better brakes. The risk posed by large vehicles can be mitigated, however, if the vehicle is driven with safer braking habits. The braking data may be collected using a mobile device such as the device 500 described above (e.g., via a Bluetooth® or other collection of braking data from an automobile computer system which is then forwarded to insurance company 1320 via the mobile device).

To translate these general principles into practical insurance decisions, a rule based classifier in the insurance company 1320 computer systems can be programmed with a set of rules that place a request to insure a vehicle into one of three categories: braking behavior is irrelevant, braking behavior is relevant, and braking behavior is important. For example compact cars with anti-lock brakes are assigned by the rule based classifier into the first category. Trucks with anti-lock brakes and mid-sized sedans with ordinary disk brakes fall into the second category. Trucks with standard disk brakes fall into the third category.

Based on the category into which the vehicle is categorized and actual data collected about the braking behavior of drivers of the vehicle, an underwriting and pricing impact is calculated. In one embodiment, the underwriting portion of the process 1702 includes a kill question. That is, there is a threshold, which, if met, would demand denial of the request for insurance coverage, regardless of what other parameters may be. For example, for vehicles in the third category, i.e., those with the greatest risk of collisions resulting from a failure to stop, an insurance request is "killed" if sensor data indicates that the vehicle stops abruptly, on average, more than once per day. If a request is killed, the customer is notified and further processing of the request is cancelled, avoiding unnecessary processing.

If the request for insurance survives the "kill question" of process 1702, a pricing result and an underwriting result are generated based on the category and observed braking behavior. For vehicles falling into the first category, braking behavior is ignored in making the pricing and underwriting decision, as braking behavior will have little impact on the risk posed by the vehicle. For vehicles that fall into the second category, safe braking habits may yield a small credit and a positive underwriting result. Poor braking habits may yield a small premium surcharge and a somewhat negative underwriting result. For vehicles in the third category, safe braking habits may yield a more significant premium credit, as a greater portion of the risk associated with insuring such a vehicle is managed well by the driver. Poor braking habits, if not sufficiently poor to surpass the "kill threshold" may result in a substantial premium surcharge and negative underwriting result.

While in the illustrative process 1702, a vehicle's size and braking system impact only the way in which the computer systems of the insurance company 1320 manipulates a single collected data parameter, i.e., braking behavior. The same factors may be used to dictate the way in which the computer systems of the insurance company 1320 manipulate other collected data parameters, including, for example, speed or acceleration. The rules used to assign a vehicle to a braking behavior category may be identical to those used to assign the vehicle to speed or acceleration categories. Alternatively, the business logic computer may implement separate classification rules for each collected data parameter. Particularly in this second case, the business logic computer may take one set of collected data parameters into account if the vehicle has a first characteristic (e.g., it has anti-lock brakes) and a second set of collected data parameters into account if the vehicle has a second characteristic (e.g., it has disc or drum brakes). Other vehicle characteristics that may be employed as determinants of the impact of various collected data parameters include, without limitation, vehicle safety ratings, engine size, color, cargo capacity, and age. In insuring buildings, characteristics of the buildings that may be used as determinants of the impact of collected data parameters include building age, construction, location, and use.

The second process 1704 determines if, and to what extent, the average speed at which a vehicle is driven impacts the insurance pricing and underwriting decision. In the illustrative process 1704, the determination is based on a characteristic of an owner seeking to insure the vehicle. Such characteristic might be, for example, the driver's age and/or driving record. These characteristics are analyzed by another rule-based classifier to assign insurance requests into three categories. In the first category, speed is considered irrelevant, in the second category, speed is relevant, and in the third category, speed is considered important. As in the first process 1702, the request for insurance is considered in light of the category and the actual data observed by the sensors monitoring the vehicle. Analysis of the actual vehicle speed may result in "killing" the request, or it may result in a range of pricing and underwriting results, as described above.

As with the first process 1702, the characteristic of the entity seeking to insure the vehicle, i.e., its owner and driver, may impact the way the computer systems of the insurance company 1320 manipulate multiple collected data parameters. For example, the age of the owner may also dictate the way the business logic computer takes into account the time of day during which the vehicle is driven and/or the acceleration behavior detected by sensors monitoring the vehicle. For example, for a vehicle owned by a minor, the business logic computer may ignore the time of day during which the vehicle is driven, consider the vehicle's speed (for example, the average speed, maximum speed, and/or a actual speed/posted speed limit differential) important, and the vehicle's acceleration only relevant. Alternatively, for a teen driver, number of passengers and the day of week and time of day of driving may be important. In contrast, for an elderly vehicle owner/operator, the business logic computer may ignore acceleration behavior, consider speed relevant, and time of day important. Thus, based on the value of this one characteristic of the entity seeking insurance, different sets of collected data parameters may be taken into account in making underwriting and pricing determinations. Additional characteristics of an entity that may be employed as determinants of the way in which the computer systems manipulate collected data parameters in making underwriting and pricing decisions include, without limitation, driving history, gender, and for commercial vehicles, the line of business in which the entity is involved.

The third process 1706 determines if, and to what extent, the steering behavior with which a vehicle is driven impacts the insurance pricing and underwriting decision. In the illustrative process 1706, the determination is based on sensor data collected from monitoring the vehicle. Relevant data parameters might include, for example, the speed at which the vehicle is driven. For example, erratic or frequent steering at high speeds may be indicative of aggressive highway lane changing or reckless turning.

Speed is analyzed by a third rule-based classifier to assign insurance requests into three steering behavior categories. For example, in one implementation, the third rule-based classifier assigns requests based on average speed. If average speed falls below 45 miles per hour, a vehicle is assigned to a first category. If average speed falls between 46 miles per hour and 60 miles per hour, the vehicle is assigned to a second category, and if the average speed exceeds 60 miles per hour, the vehicle is assigned to the third category. In an alternative implementation, the third rule-based classifier assigns requests based on the frequency of the vehicle speeding (i.e., driving above a posted speed limit). In another alternative implementation, the third rule-based classifier assigns requests based on the average speed of the vehicle in relation to the speed of nearby vehicles, determined, for example, by sonar, laser, radar, or other ranging technology incorporated in the vehicle.

Pursuant to some embodiments, the risk score calculated pursuant to some embodiments (and described above in conjunction with, e.g., FIG. 1) may be used as a factor, category or classifier in performing the analysis of FIG. 17.

In the first category, steering behavior is considered irrelevant, in the second category, steering behavior is relevant, and in the third category, steering behavior is considered important. Subsequently, the request for insurance is considered in light of the category and the actual vehicle steering behavior observed by the sensors monitoring the vehicle. Analysis of the actual steering behavior may result in "killing" the request, or it may result in a range of pricing and underwriting results, as described above. As with the other processes 1702 and 1704, the value of a collected data parameter may govern the application of, and weight assigned to more than one other collected data parameter. Additional data parameters that may be employed as determinants of the way in which the business logic computer 101 manipulates those data parameters or others in making underwriting and pricing decisions include, without limitation, driving location, how often the vehicle is used, and the environment, e.g., weather conditions, in which the vehicle is driven.

Finally, according to a fourth process 1708, a base price and underwriting determination are made based purely on information related to the customer and intended drivers of the vehicle and information about the vehicle itself. The information utilized for this process is obtained from the web pages presented by the insurance company 1320 along with information garnered from the third party data sources 1307 based on the information submitted through the web pages.

In a particular implementation, each process results in an absolute price determination and an underwriting score. So long as the sum of the underwriting scores stays within a specified range, the insurance company 1320 offers insurance coverage to the customer. If the number falls outside of the specified range, insurance coverage is denied. In determining the absolute costs for the first three processes 1702, 1704, and 1706, each category is associated with a multiplier. For example, the process 1702 may add a surcharge determined by the following equation:

$$\text{Surcharge} = \text{multiplier} \times \$100 * \text{average number of abrupt braking incidents per day.}$$

As indicated above, in the first category, braking is deemed irrelevant, and therefore the multiplier associated with the first category is zero. The multiplier associated with the second category is 1.0 and the multiplier associated with the third category is equal to 2.0. The speed related surcharge is determined as follows:

$$\text{Surcharge} = \text{multiplier} * \$10.00 * (\text{average speed} - 55 \text{ mph}).$$

In this case, the multiplier associated with the first category is zero. The multiplier associated with the second category is 1.0, and the multiplier associated with the third category is 3.5. In alternative implementations, the categories may be associated with exponent values, log values, or other modifiers or functions to apply to the value of the data parameter in question instead of a simple multiplier.

In practice, an actual pricing and underwriting process may have fewer than four or more than four underwriting and pricing processes. In addition, while the processes 1702, 1704, 1706, 1708 describe assigning insurance requests to one of three categories, in practice, the processes may assign requests to one of four, five, ten, twenty or more categories. In addition, the equations for determining premium modifications may be substantially more complicated.

Figure 17B:
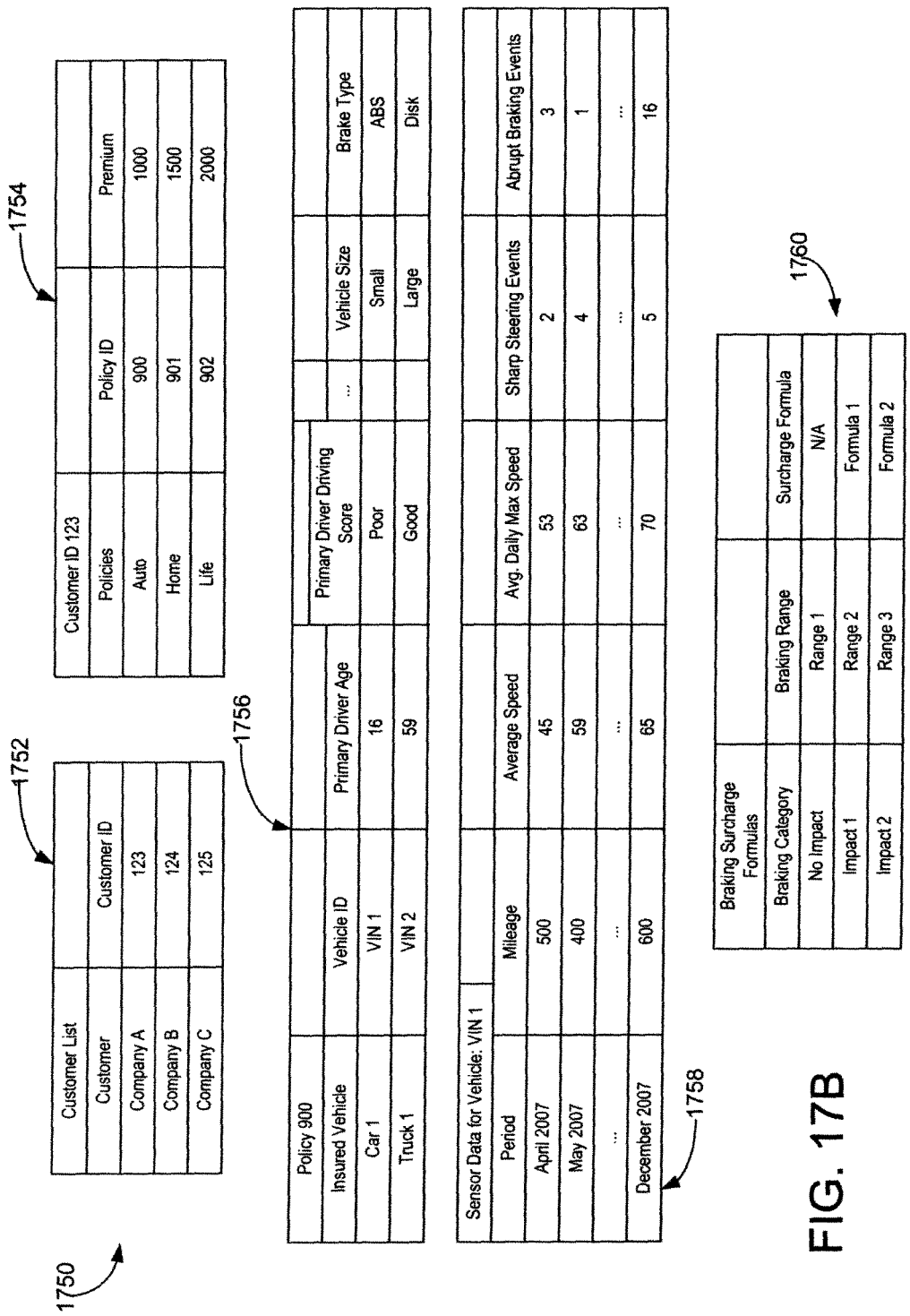
FIG. 17B is a diagram of illustrative data tables maintained by the database of FIG. 13 for implementing the process of FIG. 17A.

FIG. 17B depicts data tables 1750 maintained by the database 1304 of FIG. 13, for implementing the underwriting and pricing process 1700, according to an illustrative embodiment of the invention. The data tables 1750 include a customer list data table 1752, a customer policy data table 1754 for each customer, a policy data table 1756 for each issued policy, a sensor data table 1758 for each piece of insured property for which sensor data is collected, and formula tables 1760 for determining premiums based on the data stored in the remaining tables. The set of tables 1750 and data parameters within the data tables 1750 selected for depiction in FIG. 17B highlights the types of data and that may be stored within the database 1304 for use in the process 1700, and is in now way intended to be limiting of the types of data that may be stored, or the format in which is may be stored, in any given implementation of the system 1300. Similar data tables may be employed to implement the processes described below with respect to FIG. 18.

The customer list data table 1752 includes a list of the customers served by the insurance company with an associated customer ID used for identification purposes in the database. For each customer listed in the customer list data table 1752, the database 1304 includes a customer policy data table 1754. The customer policy data table 1754 lists the various policies issued to the customer along with a corresponding ID and premium value. In the illustrative customer policy data table 1754, the premium value is an annual premium value. Alternatively, the premium value may be stored for any desired period, including premium per day, per week, per month, or per quarter. In one implementation, the premium period is selected to correspond to the frequency with which the premium may be adjusted based on the collected sensor data. The premium is determined by the computer systems of the insurance company 1320 and forwarded to the database 1304 for storage.

For each policy, the database 1304 includes a policy data table 1756. The policy data table 1756 includes data describing the property covered by the policy, and if relevant, information about users of the property. Such data may include identifying information relevant to premium pricing. For example, for a vehicle, the policy data table 1756 identifies the make, model, value, prior damage, vehicle size, and braking technology employed by the vehicle. It also includes data about the primary driver of the vehicle, including his or her age and a characterization of their driving history.

The set of data tables 1750 stored in the database 1304 also includes sensor data tables 1758 for insured pieces of property. For vehicles, the sensor data table 1758 may be indexed by vehicle identification number. In the illustrative sensor data table 1758, data is stored on a period basis, for example, as aggregate information for each month of coverage. The sensor data table 1758 includes mileage data, average speed data, average daily maximum speed, a number of high acceleration events, and a number of abrupt braking events. This data may be fed directly from data uploaded from the sensors, or it may first be processed by the computer 1302 to generate the aggregate information.

The illustrative data tables 1750 also include formula data tables 1760 used to calculate premiums based on the data stored elsewhere in the database 1304. For example, to calculate the a surcharge resulting from braking behavior, a braking formula table 1760 includes a list of braking categories, with corresponding ranges that define membership in the category, as well as corresponding formulas for calculating surcharges based on membership in each respective category. During a pricing or underwriting decision, the computer 1302 retrieves the appropriate formulas from the formula tables 1760 to make its determination. In addition, as additional data is collected, the system can be retrained based on the new data, and new formulas can be stored in the formula data tables 1760. In alternative implementations, formulas are encoded directly in the software executed by the computer 1302.

As indicated above, the data tables 1750 described above are merely illustrative in nature. Various implementations may have fewer or more data tables storing fewer or more parameters without departing from the scope of the invention.

Figure 18:
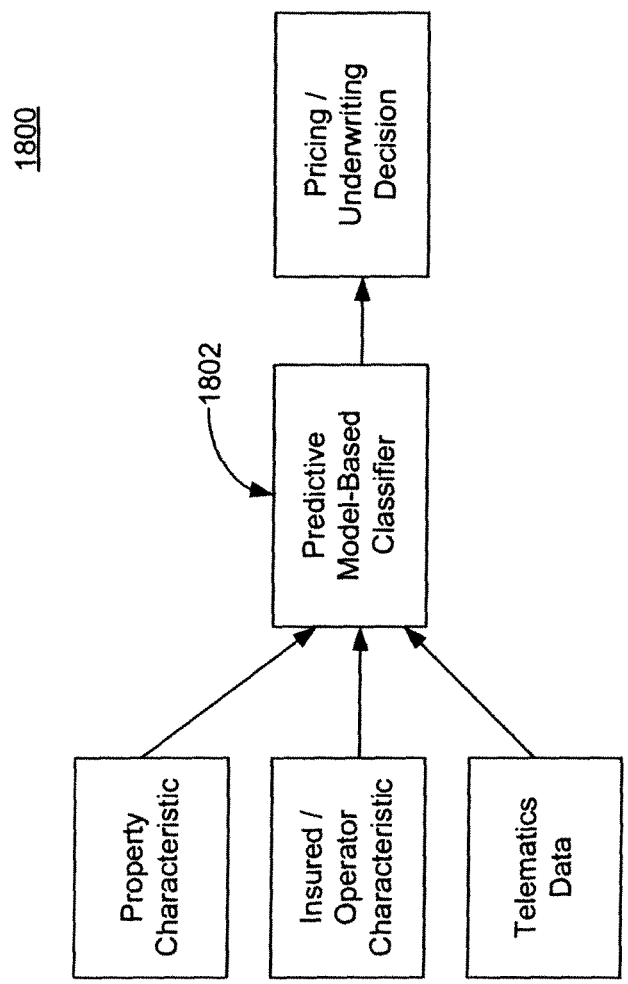
FIG. 18 depicts an illustrative underwriting and pricing process according to some embodiments.

FIG. 18 depicts a third illustrative underwriting and pricing process 1800, according to an illustrative embodiment of the invention. The process 1800 alters the way in which collected driving pattern data impacts an underwriting and pricing outcome based on one or more of characteristics of a customer or operator of a vehicle, and/or on one or more collected sensor data parameters. In the process 1800, a single predictive model 1802 directly outputs an underwriting and pricing result, without first outputting a classification. For example, the predictive model 1802 is programmed with a base premium price for each set of policy limit/deductible pairs made available to customers. Then, the predictive model 1802, using a clustering process, for example, an SVM, determines a set of previously issued coverages having risk profiles to which the requested policy is most similar. An SVM process iteratively separates elements of application in multidimensional space by identifying hyperplanes that maximizes distance between elements on either side of the hyperplanes. The process iterates to divide the elements into smaller and smaller groups. During this iterative clustering process, depending on which cluster an insurance request falls into at an early stage in the clustering process, different dimensions may be relevant in assigning the insurance request to a smaller cluster within that cluster.

After being assigned to a cluster, the loss history of the existing coverages in the cluster are compared to a loss history distribution of the entire universe of coverages. A premium for the new policy is set based on the base premium and where on the distribution of loss histories the assigned cluster falls.

Figure 19:
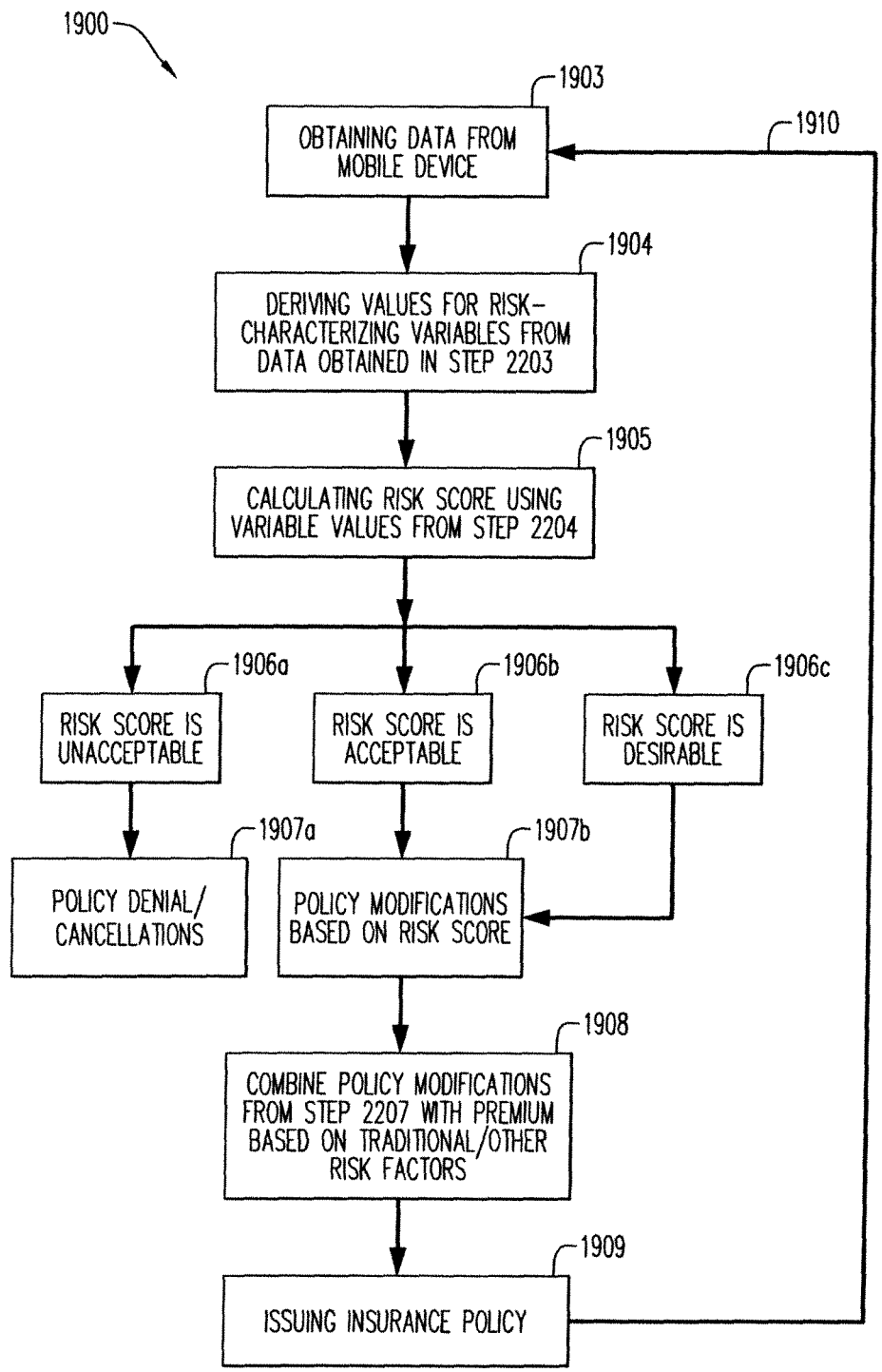
FIG. 19 is a flow diagram of a method of risk evaluation pursuant to some embodiments.

FIG. 19 shows a flowchart of a method of risk evaluation 1900, according to an illustrative embodiment of the invention. The risk evaluation method, in some embodiments, uses data received from a user operating a mobile device (such as the mobile device 500 described above). At step 1903, the insurance company obtains customer data related to the customer from a mobile device (and any external sources). These sources may include client questionnaires, driving pattern data collected by the mobile device 500, outside experts, or other external sources of information. Outside experts may include private research services, government agencies, or databases of collected information. The data may be collected by the insurance company in real-time, or at discrete time intervals throughout the term of the insurance policy.

Optionally at step 1904, values for intermediate variables that characterize risk are derived from the collected data. At step 1905, the intermediate variable values from step 1904 may be used to calculate a total risk score associated with the customer or insured vehicle. In one embodiment, the risk score is calculated by taking the weighted sum of the intermediate variable values from step 1904, where the weights are determined retrospectively e.g., using regression analysis from a database of insured data. Alternatively, the total risk score may be computed directly from the data collected at step 1903.

Depending on the value of the computed risk score, the risk score may be determined to be unacceptable (step 1906a), acceptable (step 1906b), or desirable (1906c). This determination may be done automatically by an insurance company computing system or program, such as insurance system computer 1302, or may be decided upon by an insurance agent or insurance company employee. Although there are only three categories shown in the figure, the risk score may be characterized into any number of categories, or may be considered a continuous real number.

If the risk score is decided to be unacceptable, then the customer may be denied an insurance policy at step 1907a. If a policy already exists, a renewal may be declined. If the risk score is decided to be acceptable or desirable, appropriate modifications, if any, to premiums based on the risk score may be determined at step 1907b. The premium may be reduced if the risk score is favorable, or it may be increased if the risk score is unfavorable (though still acceptable). The premium may not be altered at all if the risk score is moderate or inconclusive. Furthermore, different types of coverage policies, such as general liability or worker's compensation, may be selectively offered or denied in response to the risk score.

At step 1908, any modifications made in step 1907 may be combined with premium determinations made based on risk factors unrelated to the policy in a separate underwriting process. The final policy may then be issued at step 1909.

If the data collected at step 1903 changes during the term of an issued insurance policy at step 1910, the risk score may be reevaluated based on the new data. Accordingly, the insurance policy may be modified and reissued or even canceled. Reevaluation of risk may occur in real-time as data is collected in real-time, or may occur at discrete time intervals throughout the term of the policy. Steps 1903-1909 may thus be repeated many times during the term of an insurance policy.

Figure 20:
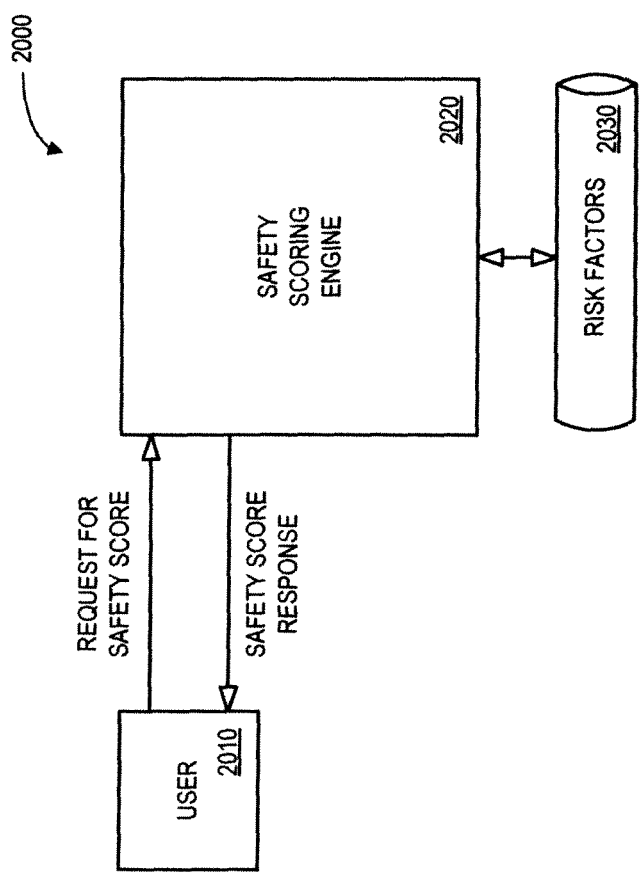
FIG. 20 a system architecture within which some embodiments may be implemented.

Note that any of the embodiments described herein may be performed by a variety of system architectures. For example, FIG. 20 illustrates a system architecture 2000 within which some embodiments may be implemented. In particular, a user 2010 may transmit a request for a safety score to a safety scoring engine 2020 (e.g., associated with an insurance provider or third party service).

The safety scoring engine 2020 may have a data storage device 2030 for storing, updating and providing access to loss risk factors associated with geographic locations. The safety scoring engine 2020 may further have a computer processor for executing program instructions and for retrieving the loss risk score data from the data storage device 2030 and a memory, coupled to the computer processor, for storing program instructions for execution by the computer processor. Still further, the safety scoring engine 2020 may include a communication device to receive the request for a safety score (associated with data indicative of at least one user location) from the user 2010.

The safety scoring engine 2020 may include program instructions stored in the memory for calculating a safety score based on the data indicative of the user location and the loss risk factors. The safety score may then be transmitted to the user 2010 in a reply. The user location might represent, for example, a current location, a destination, and/or a route between a current location and a destination. Note that the user location might be determined via a user input, telemetric data, GPS data, wireless telephone data, and/or vehicle data (e.g., provided by an electric vehicle).

According to some embodiments, an insurance engine modifies at least on element of an insurance policy associated with the user in accordance with the safety score. Although personal automobile insurance is described in connection with many of the embodiments set forth herein, note that embodiments may be associated with any other type of insurance, including homeowner's insurance, renter's insurance, condominium insurance, boat insurance, snowmobile insurance, umbrella insurance, worker's compensation insurance, general liability insurance, commercial multi-peril insurance, commercial automobile insurance, life insurance, vacation insurance, and/or reinsurance.

The modified element of the insurance policy might comprise, for example, an insurance premium adjustment of an existing insurance policy. For example, a driver might be rated on a current premium method, or on an estimate of an average safety score the driver will experience over a policy term. At the end of the policy, an actual average driving safety score might replace the initial estimate. The policy holder might then be charged more (or less) depending on how the estimate compares to the actual score. According to some embodiments, a driver may earn real time discounts (or surcharges) based on the routes taken during the policy period. For example, a driver that drives on a dirt road in six inches of snow or other poor conditions may incur surcharges based on those decisions. Therefore, his or her rate might go up or down each month based on the driving conditions and safety score.

As another example, a modified element of an insurance policy might comprise an insurance premium adjustment of a quoted insurance premium. For example, based on the safety scores associated with routes taken in previous years, a quote may be given to a potential insured to reflect the estimated risk. A driver who drives in dangerous locations, with dangerous vehicles, and/or during dangerous weather/traffic conditions might be expected to continue that behavior and receive a higher estimated premium. A safer driver might, of course, be given a discount. Note that a modified element of an insurance policy might refer to an existing insurance policy (e.g., a decision to renew and/or alter an existing insurance policy) or a newly proposed or offered insurance policy. For example, safety score information might be considered as a factor when generating a quote associated with an underwriting process for a new insurance policy.

According to other embodiments, the modified element of the insurance policy comprises an insurance benefit adjustment, a deductable adjustment, and/or an insurance coverage limit adjustment. That is, instead of premiums being changed, one or more policy characteristics could change. For example, if a policyholder consistently makes thoughtful/careful decisions, his or her deductible could be waived or additional coverage limits may be applied at no charge. Different coverages and services could be denied or added automatically, according to some embodiments, based on the decisions made by the policyholder (and associated safety scores). For example, if a driver drives in a particular area, full glass coverage might be removed from his or her policy because of the high risk of burglary. As another example, a driver who goes "off roading" might find that his or her collision coverage becomes suspended. Another example might comprise a driver earning a free tire patching service for being a risk aware driver.

According to still other embodiments, just requesting a safety score might indicate that the person is a more risk adverse individual and a lower cost insured. That is, a premium calculation could give a discount just for viewing routes or interfacing with the safety engine on a regular basis. Consider, for example, two people who are the same age, gender, drive the same type of vehicle, miles, etc. One driver, however, one regularly views the score of his or her routes as compared to a very similar person who does not. The first driver might represent a lower cost insured and therefore receive a discount in a coverage term (e.g., past, present, or future). Additionally, the level of interaction (e.g., a person who views safety scores once a year vs. one who views them many times per day) could reflect different risk exposure levels respectively.

The loss risk factors in the storage device 2030 might include, for example, road segment information, weather information, traffic information, a time of day, a day of week, litigation information, crime information, topographical information, governmental response information (e.g., how long it would take a fire truck or ambulance to reach a location), a transportation mode, a vehicle type, and/or population density.

Figure 21:
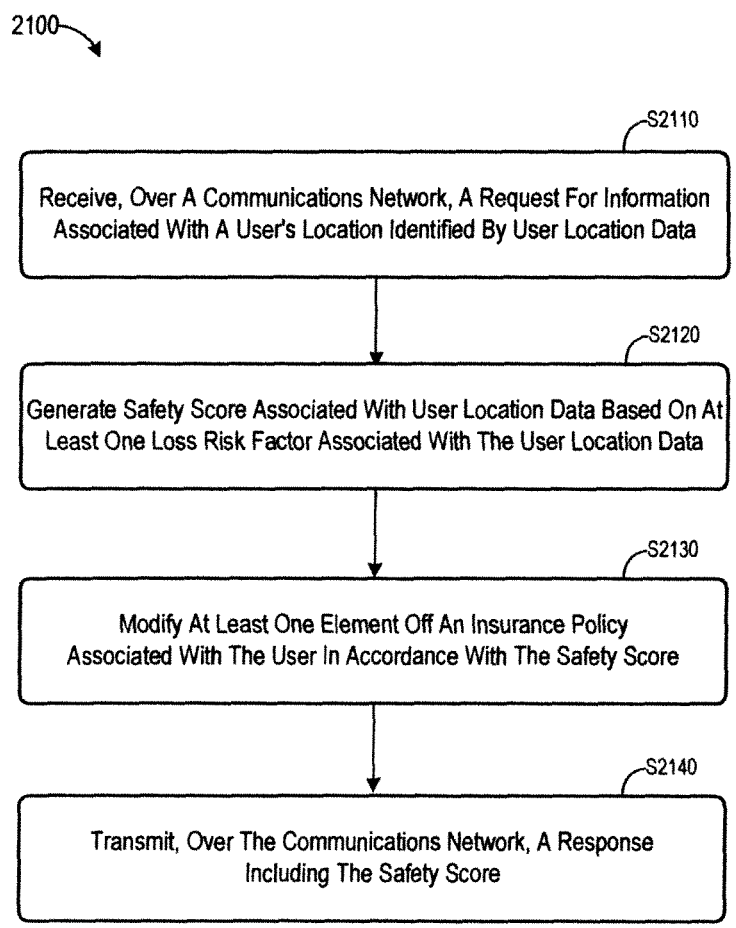
FIG. 21 is a flow diagram depicting a process in accordance with some embodiments.

FIG. 21 is a flow diagram depicting a process 2100 in accordance with some embodiments. At 2110, a request may be received (e.g., over a communications network) asking for information associated with a user's location identified by user location data. The location data might be associated with, for example, a current location, a destination, and/or one or more potential routes between a current location and a destination.

At 2120, a safety score associated with the user location data may be generated from one or more loss risk factors associated with the user location data. The loss risk factor might be associated with, for example, population density, litigation grade, crime rates, weather annuals, types of cars driven in an area, hours of operation of establishments that serve alcohol, distances from hospital/emergency services, times from hospital/emergency services, road information (e.g., type, condition, snow plow priority, materials used, speed limit, grade, pitch, number of lanes, divided, shoulder width, accident frequency, and/or residential zone status), vehicle information (e.g., make, model, year, drive train, a vehicle identification number, custom add-ons, value, horsepower, a number of seats, seat belt type, maintenance warning, major mechanical issue warnings, tire type, tire wear, center of gravity, content type, content secure, speed and/or accelerations), driver and passenger information (e.g., vision, hearing, reaction time, driving grade, distracted driving indicators from any device/sensor or derived logically, health, weight, height, number of passengers and/or a passenger location in vehicle), time of day, real time weather, weather intensity, daylight, artificial luminescence, traffic density, territory rates, territory accident frequency, and/or historic event average severity.

At 2130, at least one element of an insurance policy associated with the user may be modified in accordance with the safety score. The modified element of the insurance policy might be associated with, for example, an insurance premium adjustment of an existing insurance policy, an insurance premium adjustment of a quoted insurance premium, an insurance benefit adjustment, a deductable adjustment, and/or an insurance coverage limit adjustment.

A response may then be transmitted at 2140 (e.g., over the communications network) to the user including the safety score. Note that the request from and/or response to the user might be associated with a tablet computer, a desktop computer, a laptop computer, an electronic book reader, a web portal, an automobile device, a navigation device, a voice interface (e.g., where the driver talks with a device that talks back to change routes, discuss upcoming threats, and/or ask for the safest path before trip starts), a steering wheel interface (e.g., using the steering wheel as the interaction device with buttons and switches), and/or an augmented reality interface (e.g., a windshield display where risk levels and alerts are displayed as holographs on the windshield in real time, such as "Stopped traffic ahead!").

Figure 22:
FIG. 22 illustrates a portion of a tabular database that may be provided pursuant to some embodiments.

FIG. 22 illustrates a portion of a tabular database 2200 that may be provided pursuant to some embodiments. In particular, the database 2200 includes a safety score identifier 2202 generated for a particular user 2204 (e.g., a policy holder). The database 2200 further stores location information 2206 (e.g., a current location, destination, or route) and a safety score 2208 generated based on the location information 2206 and one or more risk factors. Finally, the database includes an insurance adjustment 2210 that resulted from the safety score 2208.

The safety score 2208 may represent a combination of traditional insurance rating elements in addition to location based data and device information, as well as an interaction between the variables. A scoring algorithm might, for example, consist of layers of information from relatively static (e.g., updated yearly) elements to relatively dynamic, substantially real time in order to increase the accuracy of the risk assessment. A total premium for an insurance product might, for example, be comprised of sub-premiums for each coverage, which would in turn be comprised of a base rate, combined with rating factors. Factors might be partially or totally derived by the safety score 2208.

For example, a total insurance premium might be defined by the following equation:

Total Ins premium=Cov $A$ prem.+Cov $B$ prem . . .

where Cov $A$ premium is further defined by the equation

Cov $A$ premium=base rate*factor 1*factors 2 . . .

The factors might be associated with, for example, a current location and historical loss data associated with that location. Note that the factors might be associated with a single-way table or a multiple variable interaction table. The scoring may use location aware data and devices may be embedded in those one way or multi variable tables.

Although any number of variables might be utilized, by way of example a factor for a car insurance score might be associated with: road segment information, real time weather information, the current traffic information, a time of day, and/or visibility conditions. For a property insurance score (home or commercial) the factors might include: crime rates, police presence, a time for fire department response, weather information, and/or topographical information (trees, soil, altitude, and/or relative altitude). Note that the variables may be different and weighted differently based on the type of safety score 2208 being derived (automobile vs. walking).

According to some embodiments, each of the loss factors may be weighted using an algorithm. The safety score 2208 may be dynamic and other variables may have more or less weight depending on the nature of the scenario. The specificity of the safety score 2208 might be based on a granularity and responsiveness to changing environments. The safety score 2208 might, according to some embodiments, be made up of specific sub-scores that vary based on variables such as the type of car, weather, slope of roads, etc. Note that the safety score might be generated by an insurance provider, or, according to some embodiments, a third party service that generates the safety score for an insurance provider or any other party.

For example, the safety score 2208 of a given route over a mountain in sunny weather may be different than the safety score 2208 of that same route during heavy traffic conditions when it is snowing. In addition, there might be a different safety score 2208 based on what vehicle the user is driving (e.g., 4 wheel drive or 2 wheel drive). The current weight of the vehicle also might be used as one real time variable that may vary the safety score 2208 of the same route. Driver behavior might also adjust the safety score 2208 (e.g., if the driver has a limited driving license then trips at night might be especially dangerous and have a lower safety score 2208 as compared to the same trips during the day.)

As other examples, a safety score 2208 for a walking route could vary by time of day, traveling in a group vs. single person travel, and/or other traffic (car or walking) at that time. A home location safety score 2208 may depend on the type of house (number of floors), animals present, and/or security systems. According to some embodiments, a safety score 2208 might be based on geographical risks that can change with the economic environment.

Sources for such data could include, but are not limited to, third party derived or direct accident data (e.g., available from the Highway Loss Data Institute), government data (census, crime, laws, etc. . . . ), weather data, internal premium rates, internal insurance loss data, traffic data, placed cameras, people using the interfaces, the vehicle, and/or police reports. For example, the mandated closing time for business that serve alcohol may vary by state. This might affect safety scores 2208, for example, near pubs at a closing time. Various statistical methods might be deployed to calculate appropriate factors based on location aware technology and data. These might include, but are not limited to, general linear models, clustering, neural networks (artificial), blind signal separation, regression analysis, learning algorithms (e.g., supervised, unsupervised, and reinforced), rank maximization, and/or price models. An example of a general linear model might be to define accident counts as a dependent variable. Other data elements may then be available to predict the counts in each cell, as close as possible, using appropriate assumptions.

The safety score 2208 might be used to target insurance marketing, such as to identify low cost insureds may help an insurance company grow business. For example, routes that are low hazard might be identified. An insurance provider might then look for populations that drive those routes (and entice those populations with special incentives). As another example, people who regularly review driving route safety scores might represent lower costs as compared to others.

Figure 23:
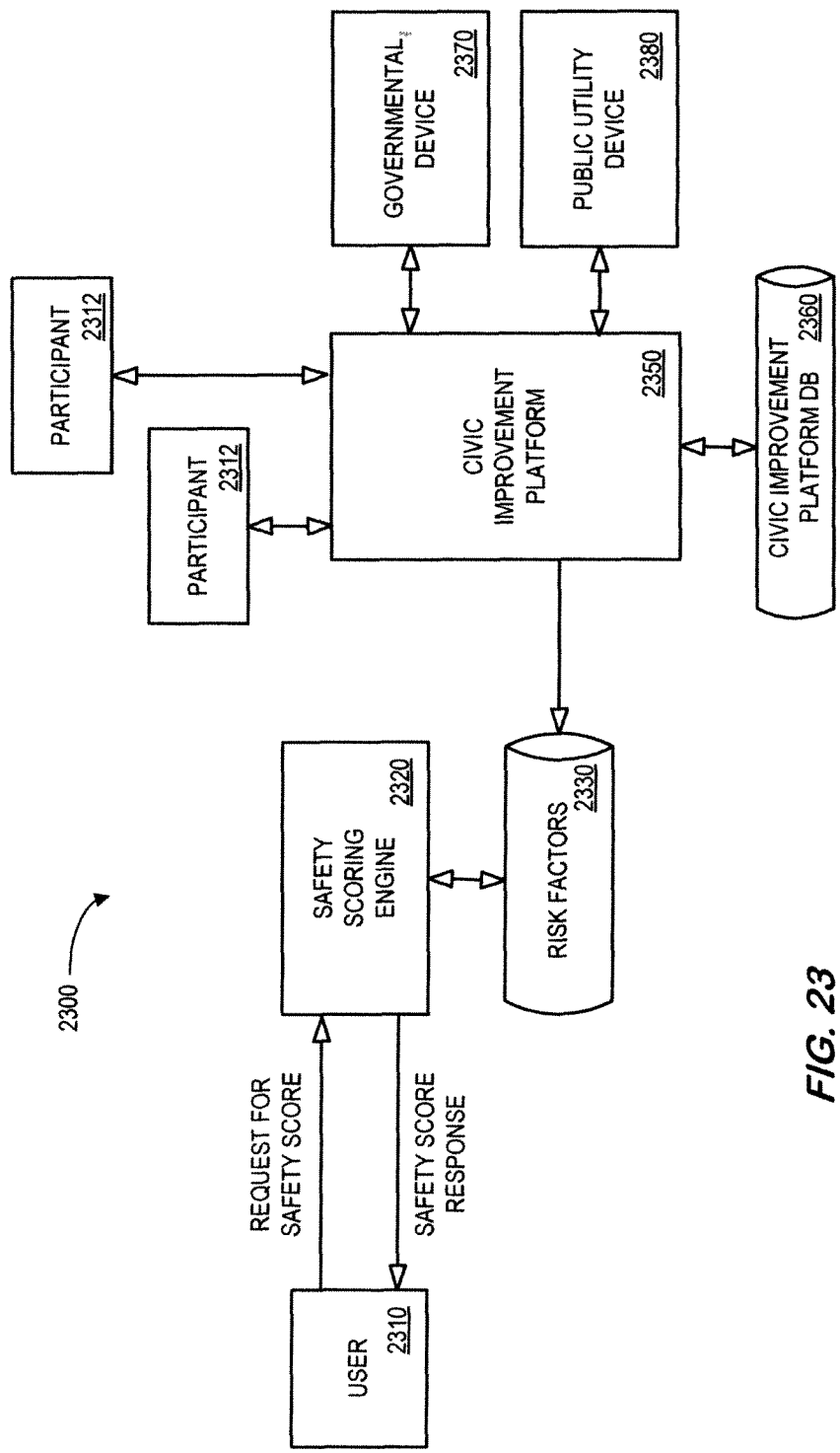
FIG. 23 illustrates a system associated with a civic improvement platform in accordance with another embodiment.

Note that a safety score 2208 may be based on many different types of risk information. For example, a "civic"

improvement platform may let users report unsafe conditions associated with a roadway or other environment. As used herein, a civic improvement platform may be associated with a group of people and/or one or more locations, such as, for example, a city, town, neighborhood, community, and/or municipality. For example, a user might notice that a traffic light in his or her hometown is not working properly and report that fact to a remote civic improvement platform via a communication network (e.g., by transmitting a message from his or her smartphone to the platform via the Internet or wireless telephone network). FIG. 23 illustrates a system 2300 associated with a civic improvement platform in accordance with some embodiments.

In particular, a user 2310 may transmit a request for a safety score to a safety scoring engine 2320 (e.g., associated with an insurance provider or third party service). The safety scoring engine 2320 may have a data storage device 2330 for storing, updating and providing access to loss risk factors associated with geographic locations. The safety scoring engine 2320 may further have a computer processor for executing program instructions and for retrieving the loss risk score data from the data storage device 2330 and a memory, coupled to the computer processor, for storing program instructions for execution by the computer processor. Still further, the safety scoring engine 2320 may include a communication device to receive the request for a safety score (associated with data indicative of at least one user location) from the user 2310.

The safety scoring engine 2320 may include program instructions stored in the memory for calculating a safety score based on the data indicative of the user location and the loss risk factors. The safety score may then be transmitted to the user 2310 in a reply. The user location might represent, for example, a current location, a destination, and/or a route between a current location and a destination. Note that the user location might be determined via a user input, telemetric data, GPS data, wireless telephone data, and/or vehicle data (e.g., provided by an electric vehicle).

The loss risk factors in the storage device 2030 might include, for example, data from a civic improvement platform 2350 according to some embodiments of the present invention. Examples of civic improvement platforms may include, for example, the SeeClickFix web site, the Virginia Department of Transportation telephone road condition service, the SpotCrime crime data aggregator, and New York Cities 311 telephone reporting system. Note that a civic improvement platform 2350 might be associated with a social networking platform (e.g., Facebook or Twitter).

In this example, the civic improvement platform 2350 may communicate with a number of remote participant devices 2312 via a communication network. For example, the participant devices 2312 may represent wireless telephones, PCs, laptop computers, automobile devices, or any other apparatus able to exchange information with the civic improvement platform 2350. The participant may use the participant device 2312 when he or she notices a safety issue, such as a road condition (e.g., an unusually large pothole), a traffic sign condition (a "Stop" sign that has fallen down), a streetlight condition, a traffic light condition, an electrical wire condition (e.g., a broken power line across a roadway), a water hazard, a weather hazard (e.g., an icy bridge), a street condition, a plant hazard (e.g., overgrown bushes blocking a driver's line of sight), a sidewalk condition, a guardrail condition, and/or a criminal activity (e.g., a sign vandalized with graffiti), etc. As other examples, a participant might submit information via a Facebook account, a web blog, or a Google plus account.

According to some embodiments, the participant device 2312 transmits a safety report to the civic improvement platform 2350. The participant safety report might include, for example, a participant identifier, a location (e.g., a street address or latitude and longitude information), a time and date, image information (e.g., a video or photograph taken with his or her smartphone), and/or an insurance identifier. Note that a safety report might be pushed from participant device 2312 to the civic improvement platform 2350 or pulled from the participant device 2312 to the civic improvement platform 2350 (e.g., on a periodic basis).

The civic improvement platform 2350 may store information about safety reports in a civic improvement platform database 2360 and/or forward information about safety reports to a governmental device 2370 (e.g., a governmental agency associated with a police or roadway maintenance department) and/or a public utility device 2380 (e.g., associated with a water or electrical utility). In this way, a solution to the safety issue may be implemented (e.g., a broken streetlight may be repaired). According to some embodiments, information from the civic improvement platform 2350 may be supplemented with information from public and/or governmental databases (e.g., associated with a health department or department of motor vehicles). Moreover, information may be provided from the civic improvement platform 2350 to the risk factors 2330 that are used by the safety scoring engine 2320. In this way, the safety scoring engine 2320 may use information generated by participants to improve the accuracy of safety scores provided to users 2310 (e.g., multiple reports of broken traffic lights might result in a lower safety score).

Figure 24:
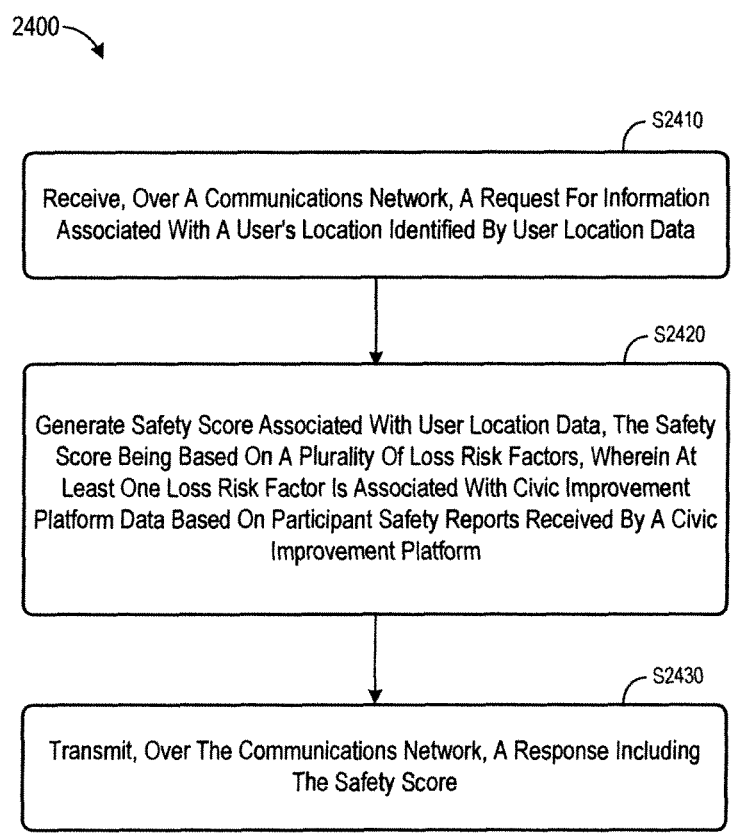
FIG. 24 illustrates a civic improvement platform method according to some embodiments.

FIG. 24 illustrates a civic improvement platform method 2400 according to some embodiments. At S2410, a request for information associated with a user's location identified by user location data may be received over a communications network. At S2420, a safety score associated with the user location data may be generated. The safety score might be, for example, based on a plurality of loss risk factors associated with the user location data. Moreover, at least one loss risk factor may be associated with civic improvement platform data based on participant safety reports received by a civic improvement platform. For example a location or route that is associated with a large number of unresolved safety reports might result in a relatively low safety score. At S2430, a response including the safety score may be transmitted over the communication network. According to some embodiments, an insurance policy might be automatically adjusted in accordance with the safety score (e.g., an insurance premium might be automatically lowered).

Figure 25:
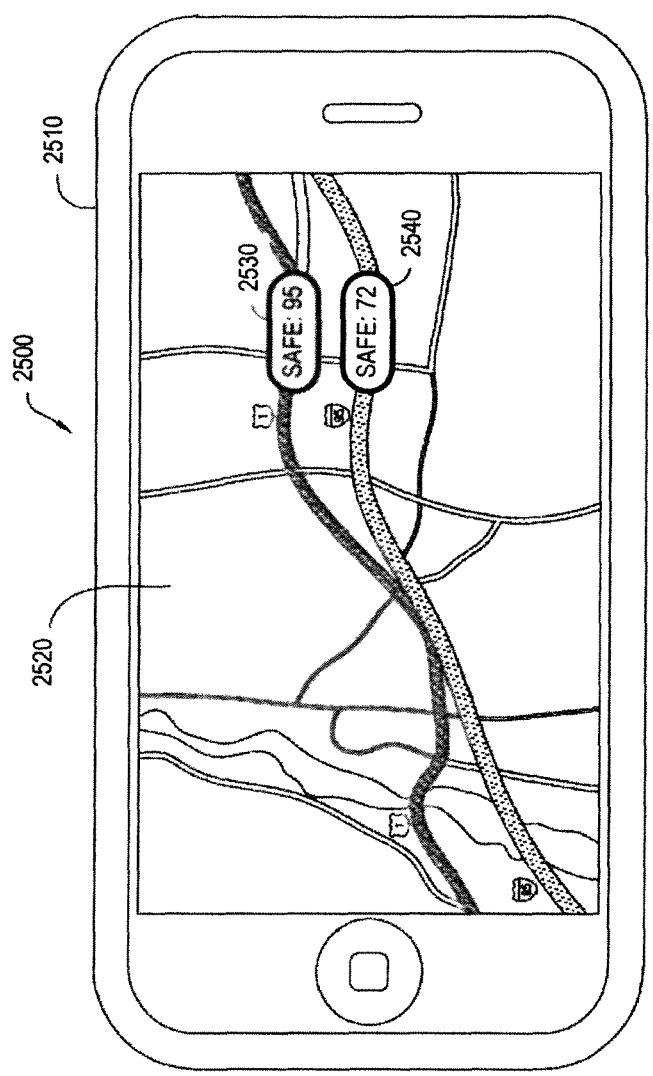
FIG. 25 illustrates a display of a relative safety score in accordance with some embodiments.

According to some embodiments, including those associated with civic improvement platform risk data as well as any of the other risk factors described herein, one or more safety scores may be displayed to a user. For example, FIG. 25 illustrates a system 2500 including a mobile device 2510 displaying a map 2520 to a user. The map includes two different potential routes, and safety score displays 2530, 2540 are provided for each route. In this way, a user may decide to travel along a particular route based at least in part on the safety scores.

Figure 26:
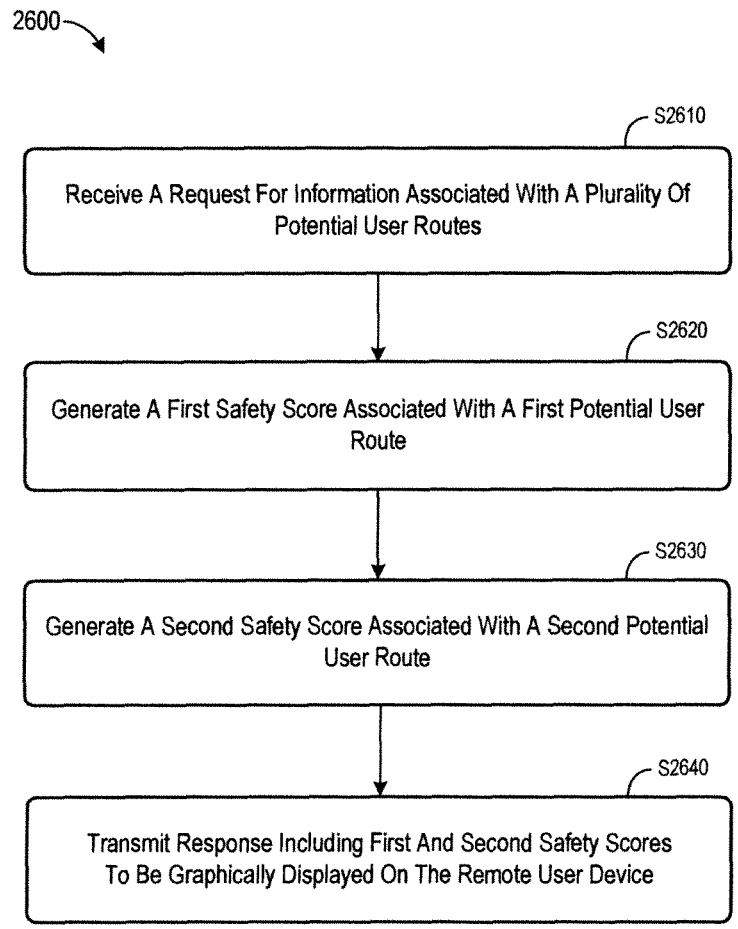
FIG. 26 illustrates a relative safety score method according to some embodiments.

FIG. 26 illustrates a relative safety score method 2600 according to some embodiments. At S2610, a request for information associated with a plurality of potential user routes may be received. For example, the request might be received from a remote user device via a communications network. In some cases, a user might request information about a number of different routes to travel between a start location and a destination location (e.g., "tell me about various routes between my home and local hardware stores").

At S2620, a first safety score associated with a first potential user route may be generated. Similarly, a second safety score associated with a second potential user route may be generated at S2630. Note that the first and second safety scores may be based on a plurality of loss risk factors associated with locations along the first and second potential user routes. For example, the safety scores might be based at least in part on: road segment information, real time weather information, current traffic information, crime rates, automobile accident information, a time of day, visibility conditions, police data, fire department response times, topographical information, third-party accident data, governmental data, internal insurance loss data, video cameras, and/or police reports. According to some embodiments, safety scores are calculated and/or updated in substantially real time.

According to some embodiments, safety scores may be based at least in part on publicly available weather data collected and supplied by the National Oceanic and Atmospheric Administration. Similarly, auto accident data provided by various state Departments of Transportation might be used in connection with safety scores along with demographic and economic data provided by various Federal government departments, including the Census Bureau, the Bureau of Labor Statistics, and the Bureau of Economic Analysis.

Note that various statistical methods may be deployed when calculating a safety score. For example, a safety score might be generated using general linear models, clustering, neural networks, learning algorithms (e.g., supervised, unsupervised, and/or reinforces), regression analysis, and/or a blind signal separation). According to some embodiments, a general linear model might define accident counts as a dependent variable and use other data elements to predict the counts in each cell or geolocation as close as possible using appropriate assumptions.

At S2640, a response including the first and second safety scores may be transmitted over the communications network so that the first and second safety scores can be graphically displayed on the remote user device. For example, the first and second safety scores might be graphically displayed on a map as numeric scores (e.g., from 0 to 10 or from 0 to 100). According to some embodiments, one or more safety symbols may be displayed (e.g., a first symbol might indicate a construction zone while a second symbol indicates a weather alert). According to other embodiments, different routes may be displayed in different colors to indicate relative safety (e.g., a green route might be safer than a red route). Moreover, a plurality of sub-scores might be associated with different locations or "legs" along the routes. In such an embodiment, a user might select a sub-score to learn more about why that particular portion of the route is relatively unsafe.

Figure 27:
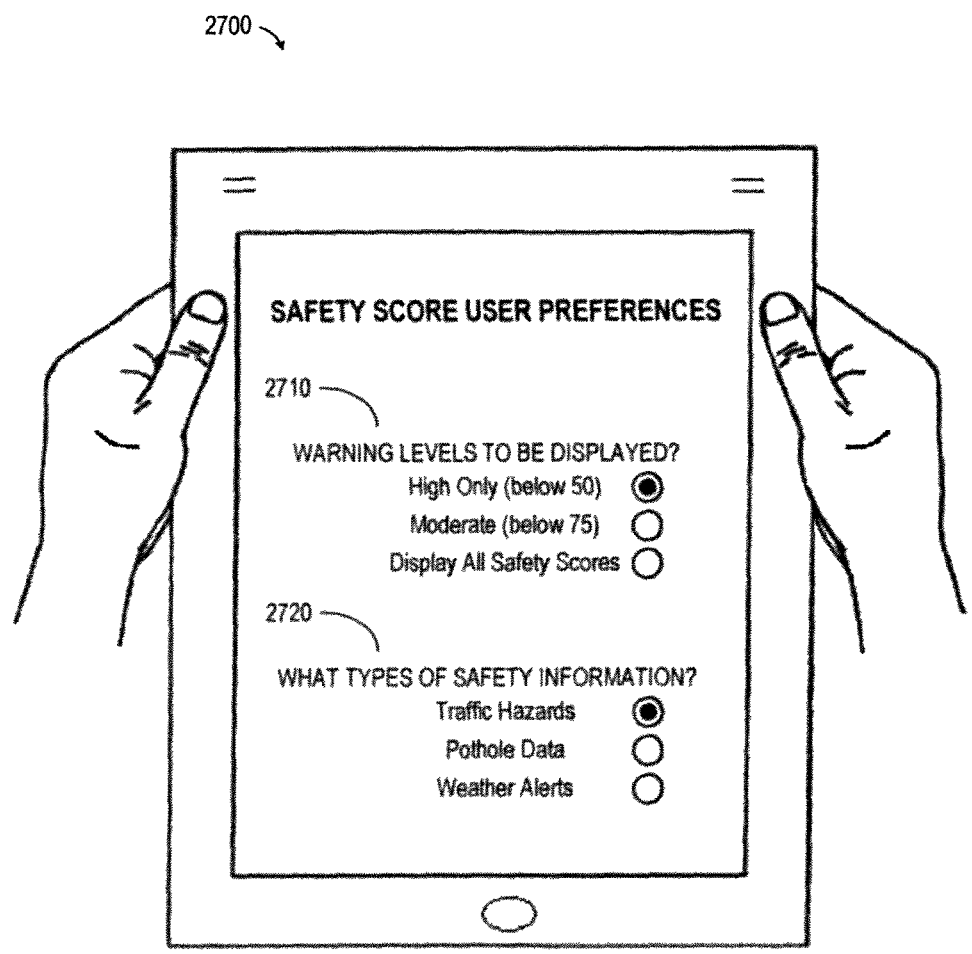
FIG. 27 illustrates a user preference interface in accordance with some embodiments.

Note that safety information associated with a wide variety of risk factors might me displayed to a user (e.g., associated with road conditions, crime data, etc.). In some cases, however, a user may find that too much safety information is being presented. For example, a user might find it difficult to locate information he or she considers important if the user interface appears too cluttered. FIG. 27 illustrates a user preference interface 2700 in accordance with some embodiments. In this example, a user might make selections in a first portion 2710 of the interface 2700 to indicate which warning levels should be displayed (e.g., perhaps only routes with a safety score below 75 out of a possible 100 should be graphically presented). Similarly, a user might make selections in a second portion 2720 of the interface to indicate different types of safety issues that should be displayed (e.g., a user might be interested in seeing traffic hazards but not weather alerts).

Figure 28:
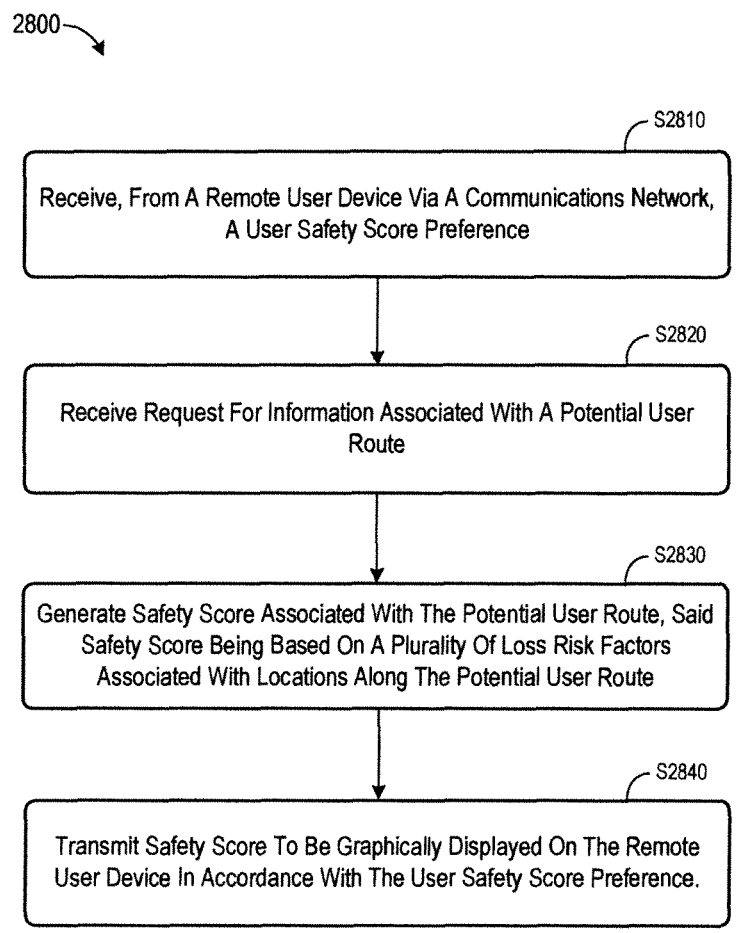
FIG. 28 illustrates a user preference method in accordance with some embodiments.

FIG. 28 illustrates a user preference method 2800 in accordance with some embodiments. At S2810, a user safety score preference may be received from a remote user device via a communications network. The user safety score preference might, for example, indicate a range of safety score values that are to be displayed on the remote user device and/or a type of safety score value that is not to be displayed on the remote user device.

At S2820, a request for information associated with a potential user route may be received from the remote user device via the communications network. For example, such a request might be generated when a user activates an application on his or her smart phone. At S2830, a safety score associated with the potential user route is generated. The safety score might be, for example, based on a plurality of loss risk factors associated with locations along the potential user route. At S2840, a response including the safety score is transmitted over the communications network. The safety score may then be graphically displayed on the remote user device in accordance with the user safety score preference.

Figure 29:
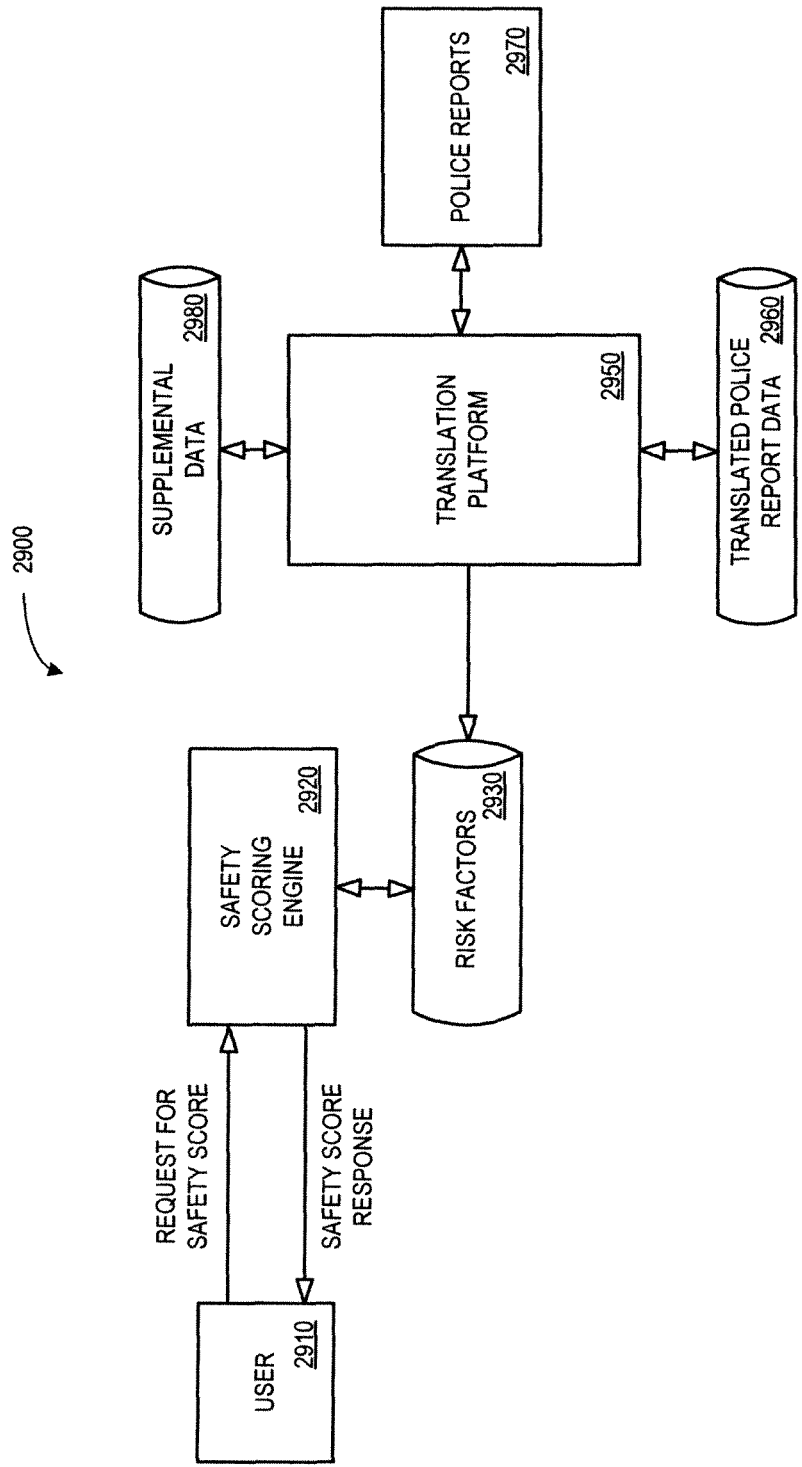
FIG. 29 illustrates a system associated with police report data according to some embodiments.

Note that automobile accidents often result in the filing of a police report. Moreover, some governmental authorities make such police reports available to the public (e.g., a state Department of Transportation might make a database containing police report data available to the public). FIG. 29 illustrates a system 2900 associated with police report data according to some embodiments. As before, a user 2910 may transmit a request for a safety score to a safety scoring engine 2920 (e.g., associated with an insurance provider or third party service). The safety scoring engine 2920 may have a data storage device 2930 for storing, updating and providing access to loss risk factors associated with geographic locations. The safety scoring engine 2920 may further have a computer processor for executing program instructions and for retrieving the loss risk score data from the data storage device 2930 and a memory, coupled to the computer processor, for storing program instructions for execution by the computer processor. Still further, the safety scoring engine 2920 may include a communication device to receive the request for a safety score (associated with data indicative of at least one user location) from the user 2910.

The safety scoring engine 2920 may include program instructions stored in the memory for calculating a safety score based on the data indicative of the user location and the loss risk factors. The safety score may then be transmitted to the user 2910 in a reply. The user location might represent, for example, a current location, a destination, and/or a route between a current location and a destination. Note that the user location might be determined via a user input, telemetric data, GPS data, wireless telephone data, and/or vehicle data (e.g., provided by an electric vehicle).

The loss risk factors in the storage device 2030 might include, for example, information directly received from or indirectly adjusted based on information received from a translation platform 2950. The translation platform 2950 may, according to this embodiment, receive information from police reports 2970 and generate translated police report data 2960. The type of information that might be found in the police reports 2970 could include, for example, locations, descriptions, a time of day, visibility data, road condition information, a driver age or other driver information, etc.

According to some embodiments, the translation platform 2950 may translate different types of police reports (e.g., from different states) into a uniformly formatted translated police report data 2960. According to other embodiments, the translation platform 2950 may determine a geographic location, such as a latitude and longitude, associated with each record in the police reports 2970. For example, a police report might include a road mileage marker identifier (e.g., such as "accident occurred on Route 100 at mile marker 29.4"). In this case, the translation platform 2950 might convert that road/marker information into a latitude and longitude, a street address, a zip code, etc.

Moreover, the translation platform 2950 might add supplemental data 2980 when creating the translated police report data 2960. By way of example, the nature of a road (e.g., a side street or highway) or applicable speed limit could be added to the police reports 2970.

Figure 30:
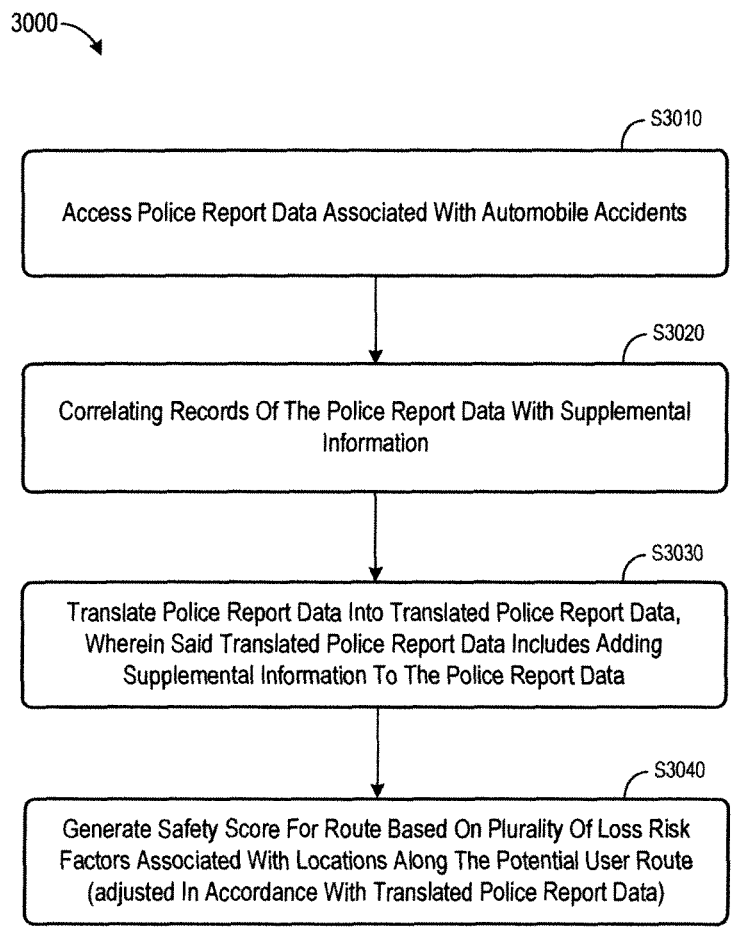
FIG. 30 illustrates a method associated with police report data in accordance with some embodiments.

FIG. 30 illustrates a method 3000 associated with police report data in accordance with some embodiments. At S3010, police report data associated with automobile accidents may be accessed. The police report data might include, for example, a date, location information, a time of day, a visibility condition, a vehicle speed, damage information, weather information, and/or a mile marker.

At S3020, records of the police report data may be correlated with supplemental information. For example, a mile marker might be converted to a latitude and longitude which may then be used to determine a speed limit, a geographic location, a road width, a number of traffic lanes, and/or a road complexity.

At S3030, the police report data may be translated into translated police report data, and the translated police report data may include supplemental information that was added to the police report data. A safety score associated with a potential user route may then be generated at S3040, and the safety score may be based on a plurality of loss risk factors associated with locations along the potential user route. Moreover, at least one of the loss risk factors may be directly based on the translated police report data. According to some embodiments (e.g., such as the one described in connection with FIGS. 33 and 34), a risk factor may be indirectly adjusted in accordance with the translated police report data.

Figure 31:
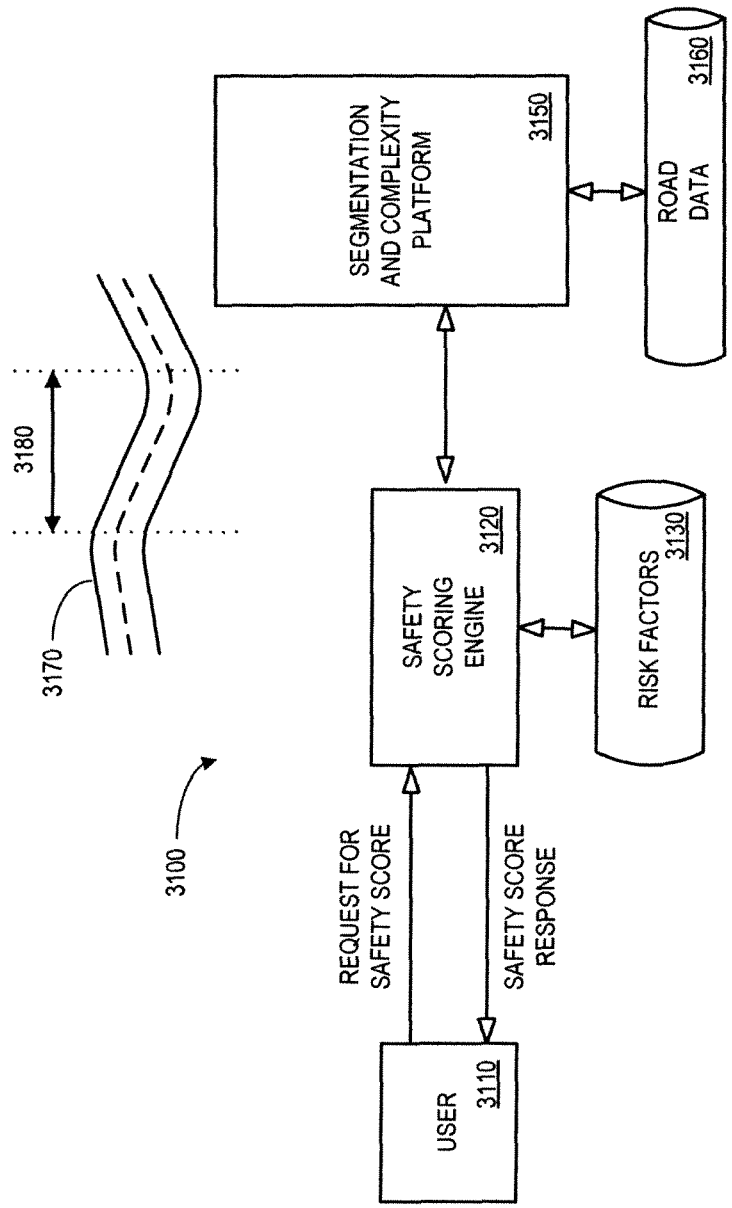
FIG. 31 illustrates a system associated with road segmentation according to some embodiments.

A safety score for a route may be based on a number of sub-scores associated with legs or "segments" of the journey. FIG. 31 illustrates a system 3100 associated with road segmentation according to some embodiments. According to this embodiment, each segment of a trip is evaluated to determine how "complex" the route is (e.g., how curvy the roads are along the way). As before, a user 3110 may transmit a request for a safety score to a safety scoring engine 3120 (e.g., associated with an insurance provider or third party service). The safety scoring engine 3120 may have a data storage device 3130 for storing, updating and providing access to loss risk factors associated with geographic locations. The safety scoring engine 3120 may further have a computer processor for executing program instructions and for retrieving the loss risk score data from the data storage device 3130 and a memory, coupled to the computer processor, for storing program instructions for execution by the computer processor. Still further, the safety scoring engine 3120 may include a communication device to receive the request for a safety score (associated with data indicative of at least one user location) from the user 3110.

The safety scoring engine 3120 may include program instructions stored in the memory for calculating a safety score based on the data indicative of the user location and the loss risk factors. The safety score may then be transmitted to the user 3110 in a reply. The user location might represent, for example, a current location, a destination, and/or a route between a current location and a destination. Note that the user location might be determined via a user input, telemetric data, GPS data, wireless telephone data, and/or vehicle data.

The safety engine 3120 may further receive information from a segmentation and complexity platform 3150. The platform 3150 may access road data 3160, such as data associated with road 3170, and segment the road data 3160 into road segments 3170. Road segments 3170 might be based on, for example, town borders, intersections, mile markers, etc. According to some embodiments, the platform 3150 may evaluate a road's complexity (e.g., in connection with a number of segments). This information may, in turn, be used to help calculate a safety score.

According to some embodiments, the road data 3160 may be based on actual telematics data collected from prior trips, data from receivers and sensors, an accelerometer, a vehicle computer, etc. Data from a plurality of trips might be collected since the complexity of a single trip may not be representative of the types or variety of trips traveled by a driver. A driver typically uses his vehicle for different types of trips, such as commuting to work, running errands, recreational trips, long-distance travel, etc., which occur on different routes and at different times of the day, and data from these various trips traveled by the driver might be included when creating a safety score.

Once data for a trip has been collected (or road data defining the shape and/or path of a road has been accessed), the complexity of the trip may be calculated. One metric for describing the complexity of the trip is fractal dimension. Fractal dimension is a statistical quantity that gives an indication of how completely a fractal appears to fill a space. Fractal dimension for a two dimensional curve ranges from 1 to 2. A straight line has a fractal dimension of 1; a completely filled in two-dimensional space has a fractal dimension of 2. A more complex trip, e.g., a trip having more turns, accelerations, decelerations, changes in speed and orientation, etc. than a less complex trip, has a greater likelihood or average number of safety events. A safety event refers to an occurrence of a sudden change in speed or orientation, which may lead to an accident. A more complex trip also has a higher fractal dimension than a less complex trip. As an example, the fractal dimension can be calculated for a two-dimensional plot of the driver's location over time.

There are many calculation processes for determining the fractal dimension of a route, including box-counting dimension calculation, correlation dimension calculation, and Lyaponuv exponents calculation. Each calculation is performed using a different algorithm, but any of the calculations should return the same or similar fractal dimension for a route. As an example, the box-counting dimension calculation, also called the Minkowski-Bouligand dimension calculation, could be used. A grid can be formed over a path in two dimensions, and boxes are drawn over any square of the grid through which the path travels. The box-counting procedure involves counting the number of boxes that would be required to cover a path. If smaller boxes are drawn, then the number of boxes increases, while the side length of each box shrinks. The box-counting dimension for a route S is defined by comparing the number of boxes N covering the route to the inverse of the side length as the box side length c approaches zero.

Note that the box-counting method and other methods for determining fractal dimension can be used in more than two dimensions. The maximum fractal dimension for a curve in N dimensions is N. For example, elevation along a route can be added so that location data is available in three dimensions; in this case, cube-counting can be used to determine fractal dimension, and the fractal dimension is in the range of 1 to 3. Additional data, such as vehicle speed, acceleration, jerk, orientation, etc. can add additional dimensions. While these additional dimensions are harder to visualize, the fractal dimension can similarly be calculated. In other embodiments, multiple different fractal dimensions can be calculated for the different types of data or different combinations of data. More detail about calculating fractal dimension can be found in "Estimating Fractal Dimension" by James Theiler, published in Volume 7, Number 6 of the Journal of the Optical Society of America A (June 1990), the entirety of which is incorporated herein by reference.

Another measure for analyzing the route is lacunarity, which describes how a fractal fills space. Lacunarity is often calculated in conjunction with fractal dimension. Two shapes with the same fractal dimension can have different lacunarities; denser fractals have lower lacunarity, whereas coarser fractals with large gaps or holes have higher lacunarity. In other words, a more heterogeneous path having periods of high complexity and periods of low complexity will have a higher lacunarity than a more homogeneous path of the same fractal dimension and having more moderate complexity. Details about calculating lacunarity and fractal geometries can be found in The Fractal Geometry of Nature by B. B. Mandelbrot (1983), the entirety of which is incorporated herein by reference.

Vehicle kinematics other than location can be measured and analyzed to determine the complexity of a route. For example, changes in orientation can be used to measure complexity. A higher number of times or a higher frequency with which a driver changes direction is associated with a more complex route with more turns. The road that the driver is on and/or the amount of change in orientation can be used to distinguish between a driver behavior, such as a lane change, and a route characteristic, such as a turn from one road onto another road. Other potential complexity measurements include a number or frequency of times a vehicle comes to a full stop along a route or the amount of time the vehicle spends at a full stop, which correlates to the amount of time the driver is at stoplights or stopped in traffic.

Once one or more complexity measurements have been calculated for the plurality of trips, an aggregate complexity rating may be calculated. The aggregate complexity rating can be an average or weighted average of the route complexities. For example, route complexities can be weighted by the distance or time duration of the trip by multiplying the route complexity for a route by the distance or length of the route so that longer trips have a greater weight than shorter trips in the aggregate score. In other embodiments, rather than weighting the trips, the route complexity is calculated at predetermined distance or time intervals. For example, a route complexity can be calculated for each mile traveled or each minute of driving. This also avoids giving too little weight to long trips and too much weight to short trips. If multiple fractal dimensions were calculated for multiple types of data collected, these fractal dimensions can be weighted and combined in the aggregate complexity rating.

Figure 32:
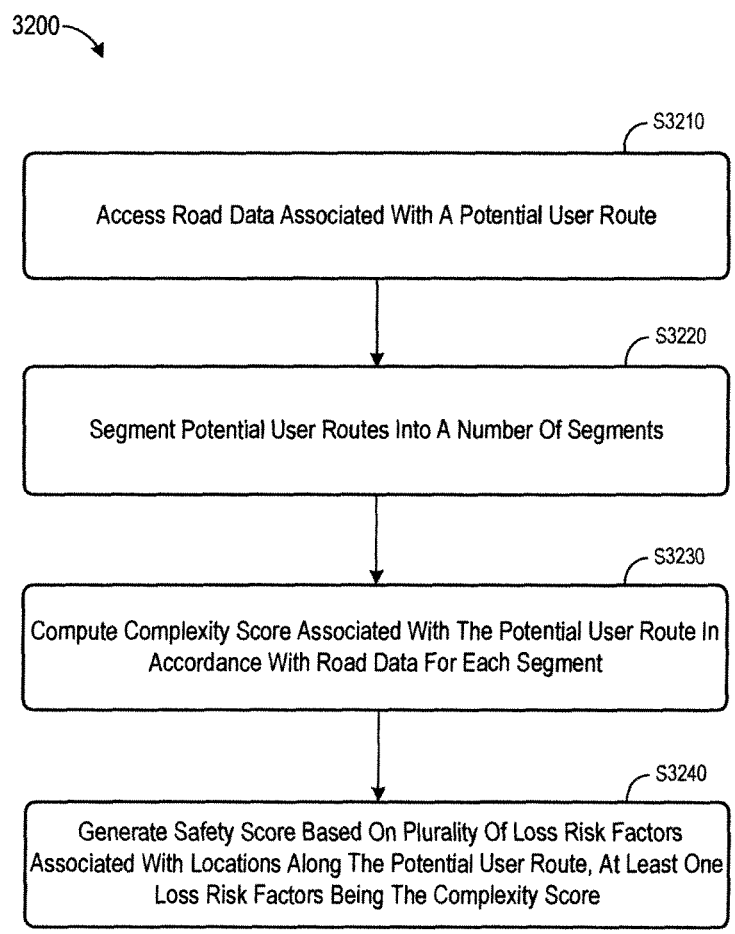
FIG. 32 illustrates a road segmentation method according to some embodiments.

FIG. 32 illustrates a road segmentation method 3200 according to some embodiments. At S3210, road data associated with a potential user route may be accessed. The road data might include, for example, information about the shape and/or path of the road. At S3220, the potential user route may be segmented into a number of road segments. At S3230, a complexity score associated with the potential user route may be calculated in accordance with road data for each segment in the potential user route. The complexity score may be, for example, based at least in part on fractal dimension information. A safety score associated with the potential user route may then be generated. The safety score may be, for example, based on a plurality of loss risk factors associated with locations along the potential user route, and at least one of the loss risk factors might represent the complexity score. Note that generation of the safety score may involve calculating a sub-score for each segment in the potential user route and combining the sub-scores to determine an overall safety score.

Figure 33:
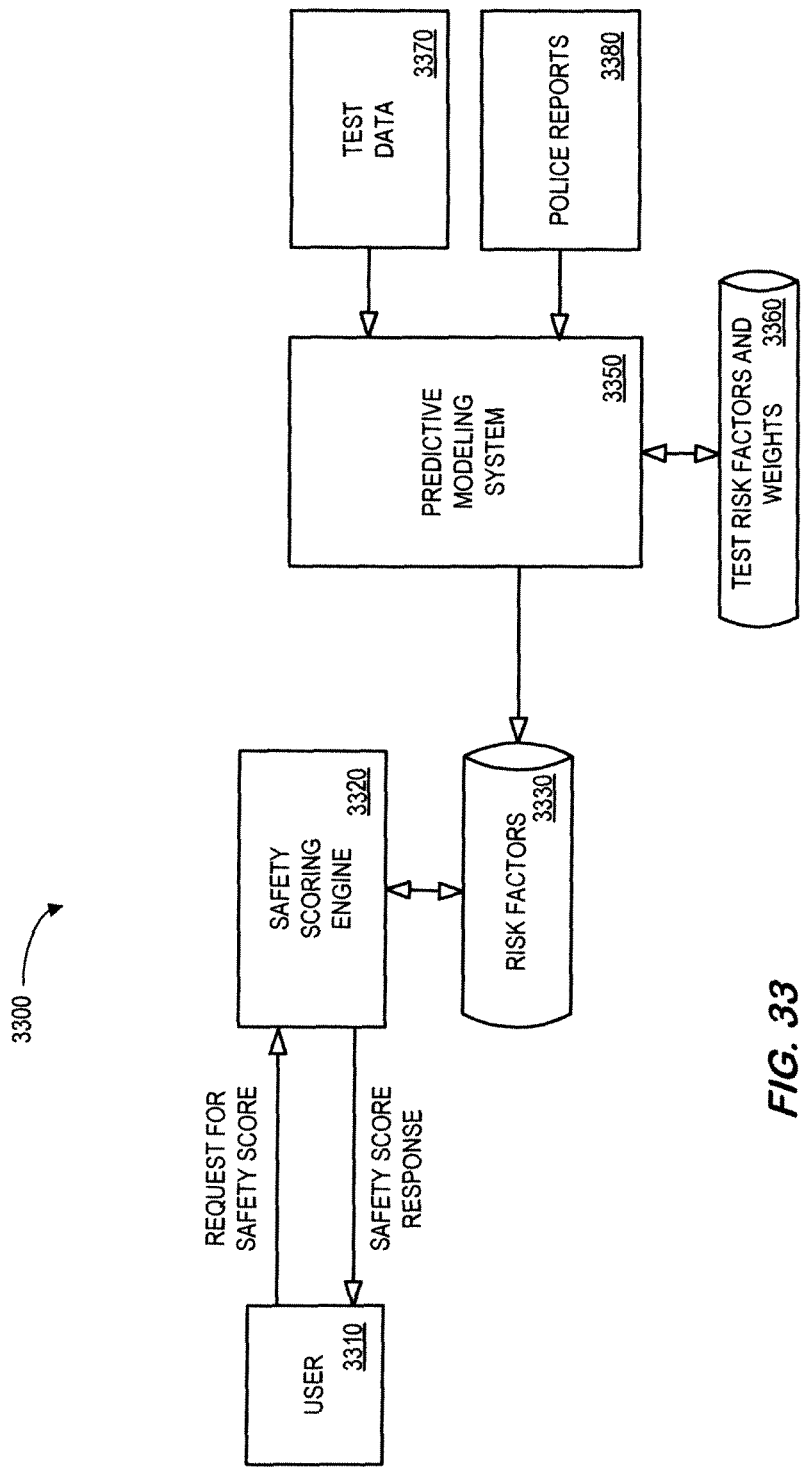
FIG. 33 illustrates a system including a predictive model according to some embodiments.

In some embodiments, a predictive model may be used to generate accurate safety scores. For example, FIG. 33 illustrates a system 3300 including a predictive model according to such embodiments. As before, a user 3310 may transmit a request for a safety score to a safety scoring engine 3320 with a data storage device 3330 for storing, updating and providing access to loss risk factors associated with geographic locations. The safety scoring engine 3320 may further have a computer processor for executing program instructions and for retrieving the loss risk score data from the data storage device 3330 and a memory, coupled to the computer processor, for storing program instructions for execution by the computer processor.

The safety scoring engine 3320 may include program instructions stored in the memory for calculating a safety score based on the data indicative of the user location and the loss risk factors. The safety score may then be transmitted to the user 3310 in a reply. The user location might represent, for example, a current location, a destination, and/or a route between a current location and a destination. Note that the user location might be determined via a user input, telemetric data, GPS data, wireless telephone data, and/or vehicle data.

The safety engine 3320 and/or risk factors 3330 may further receive information from a predictive modeling system 3350. The predictive modeling system 3350 may, for example, store a set of test risk factors and associated weights 3360. The predictive modeling system 3350 may use the test risk factors and associated weights 3360 to make predictions (e.g., a predicted number of accidents) associated with test data 3370 (e.g., test routes). The results of those predictions might then be compared with actual police reports 3380. If needed, the test risk factors and weight might be adjusted to improve performance. When completely tested and validated, the appropriate weights might be provided to the safety scoring engine 3320 and/or applied to the risk factors 3330.

Note that a primary measure of road safety may be an expected number of accidents that occur on a given segment of a road way. Moreover, increasing the amount of historical accident data that is available with associated geocode information may improve the accuracy of the system 3300. The geocoding may let the system 3300 consider the spatial density and distribution of accidents at a very fine geographic level. According to some embodiments, the system 3300 may normalize this data, either by time (e.g., a number of accidents per hour/day) or by distance (e.g., a number of accidents per mile). The result is a "spatial expectation" that a driver will have an accident in some boundary around where they are driving, given a set of predictive safety factors as described herein. This expectation may be dependent or target variable in the analysis to be modeled. Because of the flexibility that geocode data provides, the system 3300 may aggregate the safety score for individual road segments into a composite score for a trip of any length.

Note that a number of different predictive factors may impact safety: road features and characteristics, traffic volume and flow patterns, inclement weather, time of day and the season, road network "complexity," business and household demographics of the surrounding area, etc. In addition, weather and demographic data from public sources may provide information about safety predictive factors. Further, geocoded historical accident data provided by a Department of Transportation (e.g., about 300,000 recorded accidents taken from police reports) may provide information associated with safety. Such data may be thought of as large spreadsheet where each row contains data on one specific accident, and each column contains data on the predictive factor—the associated latitude and longitude, time of day, conditions of the road, weather, traffic volume, road features, etc.

To calculate a score in a statistically reliable and robust fashion, a method from spatial statistics known as "kriging" may be employed. Kriging is associated with a form of spatial regression, or more appropriately, spatial smoothing. It may be used in modeling environmental risk, such as oil spills, and in epidemiology to predict the spread of diseases across a region. Unlike conventional regression, however, kriging makes explicit use of the spatial relationship between the data. Thus, with geocoded data, the system 3300 may directly use the geographic distances between accidents and therefore, their spatial distribution. This may be useful because it lets the system 3300 infer an expected accident score even at those locations where there is not a high density of data (e.g., rural areas or areas less traveled).

In more familiar regression terms, the system 3300 may estimate a complex mathematical regression "surface" that relates accident occurrence to predictive factors, while still taking into account the specific location at a geocoded level of past accidents. Consider a detailed road map with dot representing the location of all of the accidents that have occurred during the past ten years. At every dot—which represents a geocoded coordinate corresponding to where an accident occurred—there is a set of other data associated with the accident—weather, time, road conditions, other accident locations, intersections, stop signs, speed limits, traffic, etc. Kriging ties all of this together into a three dimensional "surface" that may be overlaid on top of the map (such as a cloth with lots of peaks and valleys fitting over the map). The three dimensions are latitude, longitude, and the predicted safety score (the height) from the kriging algorithm. The height of the surface represents the expected accident score—the higher the surface representing increased risk at that point. Each point of the surface takes into account all of the data at that point and is influenced by data at all the surrounding points, with closer points having more of an influence than points far away. Because the "surface" fits over every part of the map, the system 3300 may calculate a safety score anywhere or over any route. Moreover, because this is a formal statistical measure, there is a confidence band associated with the safety score. That is, not only can the system 3300 indicate a safety score for a segment in a route, but also a confidence level associated with the safety score (e.g., the 95% confidence interval).

Figure 34:
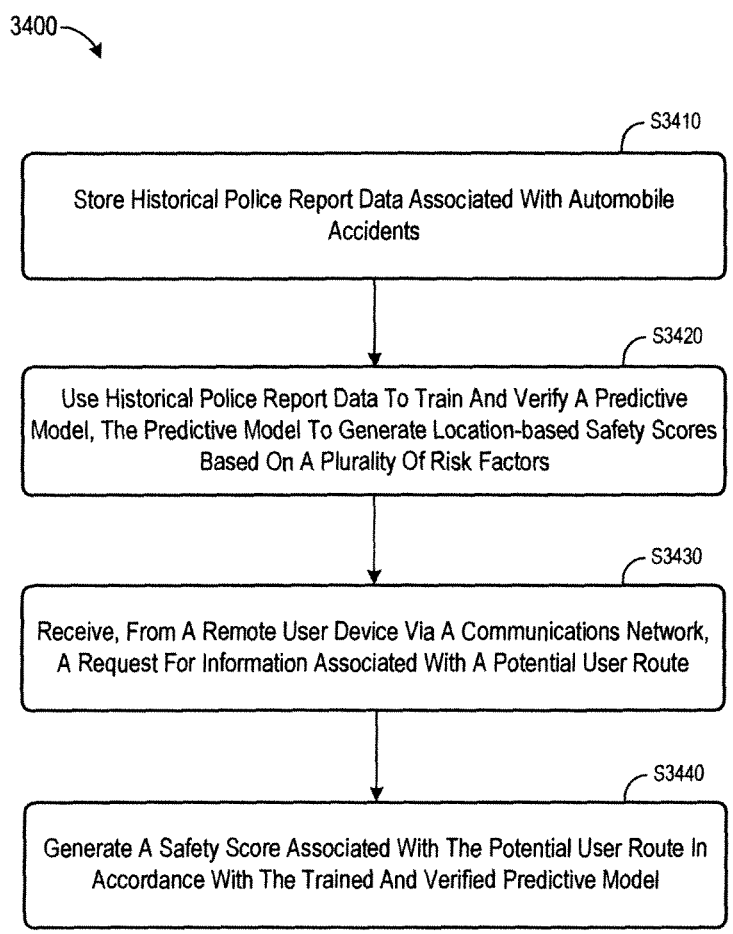
FIG. 34 illustrates a predictive model method according to some embodiments.

FIG. 34 illustrates a predictive model method 3400 according to some embodiments. At S3410, historical police report data associated with automobile accidents may be stored (e.g., in a computer storage unit). The historical police report data may then be used at S3420 to train and verify a predictive model, where the predictive model is to generate location-based safety scores based on a plurality of risk factors. A request for information associated with a potential user route may be received at S3430 from a remote user device via a communications network. At S3440, a safety score associated with the potential user route may be generated in accordance with the trained and verified predictive model. According to some embodiments, a response including the safety score may be transmitted over the communications network to be graphically displayed on the remote user device.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although many embodiments have been described with respect to advising with respect to the safest route for an automobile trip, note that embodiments may be associated with other types of safety information. For example, a person might log onto a website to determine which airline is the safest to fly from New York to Los Angeles. Another person might check the web to decide where to locate their new small business. That is, certain areas might have higher risks of theft and vandalism and may be highlighted by the user interface.

As another example, people might earn points/badges they can post onto a social network (e.g., Facebook or Twitter) for reviewing safety information, posting their own perspectives, blogging, and/or posting information on safety-related conditions. For example, a person might be recognized as the safest driver in the town or state.

As still another example, a government might use safety scoring to increase (or decrease) police patrol or to route ambulances safely to and from hospitals. Safety scores might also identify where dangerous road conditions exist (so that road crews can fix them).

An automobile Original Equipment Manufacturer (OEM) might use safety scoring to identify which cars and/or models have relatively dangerous aspects in certain geographies and specific events. This information could then be used to improve future models and/or to issue recalls.

A safety score might simply be utilized as a "value add" service for insurance customers. For example, they may receive a discount based solely on the fact that they are using a safety score product. In other cases, no discount might be offered and the service itself may simply be a value added service that an insurance company provides to customers.

Further note that information other than location information may be used to generate safety score information. Consider, for example, the fact that some drivers have uninsured motorist/underinsured motorist (UM/UIM) coverage on their policies in case they get into an accident with someone without any or enough insurance. According to some embodiments, the system maps nearby motorists who have (or do not have) insurance. In this case, a safety score might assess an insured's UM/UIM risk. Such information might, for example, be received from a state's department of motor vehicles or from other insurance companies. If insurance information is transmitted out via telematics, that data could be used to create a safety map (either real-time or historically). According to other embodiments, as cars become more networked, the system may look at the distribution of cars transmitting data and those that are not (e.g., because they were hacked or modified) and use that information to adjust a safety score. Note that drivers may be provided with maps of areas where they usually drive to help them understand more about where they drive, including the composition of cars with and without insurance. According to still other embodiments, details about another vehicle's coverage (e.g., a collision coverage limit) and/or the driver or vehicle's entire loss experience could be mapped in substantially real-time and/or used to adjust safety scores.

Thus, embodiments of the present invention may improve the information available to vehicle operators to alert them of higher risk areas as well as the information available to insurers to allow them to price, analyze and underwrite policies. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A vehicle navigation enhancement computer system, comprising:
   one or more data storage devices storing geocoded historical vehicle accident data and associated location data and geocoded historical test data associated with locations, the geocoded historical vehicle accident data and the geocoded historical test data corresponding to historical accidents that occurred before the request from the user device;
   a predictive modeling computer system coupled to the one or more data storage devices and including one or more predictive models trained and verified with the stored geocoded vehicle accident data and associated location data and geocoded test data associated with locations to determine a kriging surface map overlay of geocoded vehicle accident risk factors and associated weights for determining a predicted safety score, an expected accident score, and a confidence band, for each point on the surface of the kriging surface map overlay based upon geocoded vehicle accident data at the each point and at surrounding points;
   one or more computer processors of a safety scoring engine coupled to the predictive modeling computer system; and
   a memory coupled to the one or more computer processors storing computer-readable program instructions, which instructions, when executed by the one or more computer processors of the safety scoring engine, cause the one or more computer processors to:
      receive, from a remote user device via a communications network, a request for information associated with a proposed route;
      apply at least one of the one or more trained and verified predictive models including at least the kriging surface map overlay, to data associated with the proposed route, to generate a safety score associated with the proposed route;
      render, for transmission over the communications network and display on the remote user device, a safety score user preferences interface which includes selectable icons for selecting a level of warnings to be displayed and types of safety symbols to be displayed;
      receive, from the remote user device, the selected level of warnings to be displayed and the selected types of safety information to be displayed;
      output for transmission, by an application programming interface (API) over the communications network to the remote user device based on the selected level of warnings to be displayed and the selected types of safety information to be displayed, a safety data overlay including the safety score, the depictions of warnings, and the safety symbols, wherein the API is configured to integrate the safety overlay with external mapping services data generated by an external mapping services server and received by the remote user device to provide, on the remote user device, a graphical map display of the proposed route which includes a depiction of the safety overlay including the safety score, the warnings, and the symbols on the graphical map display.

2. The computer system of claim 1, wherein the stored vehicle accident data comprises police report data.

3. The computer system of claim 1, wherein the vehicle accident risk factors comprise one or more of time of day, visibility data, road condition information, and a driver age.

4. The computer system of claim 1, wherein the vehicle accident risk factors comprise real time weather information and current traffic information.

5. The computer system of claim 1, wherein the request for information associated with a proposed route comprises data indicative of a route.

6. The computer system of claim 1, wherein the request for information associated with a proposed route comprises data indicative of a current user location based on Global Position Satellite (GPS) data and destination data.

7. The computer system of claim 1, wherein the request for information associated with the proposed route comprises a request for information associated with a plurality of proposed routes; and further comprising:
   wherein applying the at least one of the one or more trained and verified predictive models including at least the kriging surface map overlay, comprises applying the at least one of the one or more trained and verified predictive models to the data associated with each of the plurality of proposed routes, to generate a safety score for each of the plurality of proposed routes; and
   wherein outputting for transmission, by the API, the safety data comprises outputting, by the API based on the selected level of warnings to be displayed and the selected types of safety information to be displayed, the safety data overlay including the safety score, the depictions of warnings, and the safety symbols, for each of the plurality of proposed routes, wherein the API is configured to integrate the safety overlay including the safety data for each of the plurality of proposed routes with external mapping services data to provide, on the remote user device, a graphical map display of each of the plurality of proposed routes which includes a depiction of the corresponding safety score, the warnings, and the symbols on the graphical map display.

8. The computer system of claim 7, wherein the safety score for each of the plurality of proposed routes is updated in real time.

9. The computer system of claim 7, wherein the API is configured to integrate the safety data with the external mapping data by outputting a depiction of the plurality of proposed routes in a plurality of different colors on the graphical map display, wherein each different color corresponds to a relative safety score for a corresponding one of the plurality of proposed routes.

10. The computer system of claim 1, wherein the one or more safety symbols comprise one or more of a construction zone symbol, a weather alert symbol, a traffic hazard symbol, and a pothole symbol.

11. The computer system of claim 1, wherein the memory further includes instructions which cause the one or more computer processors to apply the at least one of the one or more trained and verified predictive models at least the kriging surface map overlay, to the data associated with the proposed route, to generate a plurality of safety sub-scores for different legs of the proposed route; and
    wherein the API is configured to integrate the safety data with the external mapping data by outputting a depiction of each of the plurality of safety sub-scores on the graphical map display.

12. The computer system of claim 1, wherein the stored geocoded vehicle accident data and associated location data for training and verifying the predictive modeling computer system comprises weather data, time data, road conditions data, intersections data, stop signs data, speed limits data, and traffic data.

* * * * *